United States Patent [19]
Hosoya et al.

[11] Patent Number: 5,724,493
[45] Date of Patent: Mar. 3, 1998

[54] METHOD AND APPARATUS FOR EXTRACTING 3D INFORMATION OF FEATURE POINTS

[75] Inventors: Eiichi Hosoya, Zama; Takeshi Ogura, Atsugi; Mamoru Nakanishi, Isehara, all of Japan

[73] Assignee: Nippon Telegraph & Telephone Corporation, Tokyo, Japan

[21] Appl. No.: 571,272

[22] Filed: Dec. 12, 1995

[30] Foreign Application Priority Data

| Dec. 13, 1994 | [JP] | Japan | 6-309007 |
| Mar. 9, 1995 | [JP] | Japan | 7-050197 |
| Jul. 5, 1995 | [JP] | Japan | 7-192550 |
| Sep. 12, 1995 | [JP] | Japan | 7-259440 |

[51] Int. Cl.$^6$ ................................................ G06T 17/00
[52] U.S. Cl. ................................................ 395/124; 395/123
[58] Field of Search ................................ 395/118, 119, 395/120, 123, 124, 127, 121

[56] References Cited

U.S. PATENT DOCUMENTS

| 5,381,518 | 1/1995 | Drebin et al. | 395/121 |
| 5,412,763 | 5/1995 | Knoplioch et al. | 395/119 X |
| 5,515,484 | 5/1996 | Sfarti et al. | 395/124 |
| 5,553,207 | 9/1996 | Sekiguchi et al. | 395/124 |
| 5,566,282 | 10/1996 | Zuiderveld | 395/124 |

Primary Examiner—Heather R. Herndon
Assistant Examiner—Cliff N. Vo
Attorney, Agent, or Firm—Pollock, Vande Sande & Priddy

[57] ABSTRACT

The positions where back-projection lines from a plurality of images pass through a predetermined voxel slice of a 3D space are calculated. Letting a predetermined one of the plurality of images be defined as a basic image and the other remaining images as reference images, information about back-projection lines from the basic image is stored in a basic back-projection line information storage part and information about the back-projection lines from the reference images are stored, as information associated with voting, in a voting information storage part. A count is taken of reference back-projection lines which pass through the same passing position of each basic back-projection line, and this count value is used to update the information about the basic back-projection line. After execution of each processing in all voxel slices of the 3D space, the information about the basic back-projection line information is read out of the basic back-projection line information storage part.

31 Claims, 31 Drawing Sheets

FIG. 9A

Z=5 (BEFORE UPDATE)   34

|      | $X_M$ | $Y_M$ | $Z_M$ | $V_M$ | $X_t$ | $Y_t$ |
|------|-------|-------|-------|-------|-------|-------|
| $L_{00}$ | 1 | 4 | 0 | 1 | 2 | 2 |
| $L_{01}$ | 3 | 4 | 3 | 5 | 3 | 5 |
| $L_{02}$ | 5 | 4 | 1 | 5 | 5 | 6 |
| $L_{03}$ | 4 | 3 | 1 | 3 | 6 | 4 |

|   | 0 | 1 | 2 | 3 | 4 | 5 | 6 | 7 |
|---|---|---|---|---|---|---|---|---|
| 0 |   |   |   |   | 4 |   |   |   |
| 1 |   | 1 | 1 |   |   |   |   | 5 |
| 2 |   |   | 5 | 2 |   | 1 |   |   |
| 3 |   | 2 |   |   |   |   |   |   |
| 4 |   |   |   |   | 1 |   | 1 |   |
| 5 | 1 |   |   | 2 | 1 | 3 | 4 |   |
| 6 |   | 3 |   | 1 |   | 6 | 1 | 2 |
| $Y_t$ 7 |   |   |   |   |   |   | 1 |   |

FIG. 9C

Z=5 (AFTER UPDATE)   34

|      | $X_M$ | $Y_M$ | $Z_M$ | $V_M$ | $X_t$ | $Y_t$ |
|------|-------|-------|-------|-------|-------|-------|
| $L_{00}$ | 2 | 2 | 5 | 5 | 2 | 2 |
| $L_{01}$ | 3 | 4 | 3 | 5 | 3 | 5 |
| $L_{02}$ | 5 | 6 | 5 | 6 | 5 | 6 |
| $L_{03}$ | 4 | 3 | 1 | 3 | 6 | 4 |

4A    4B    4C

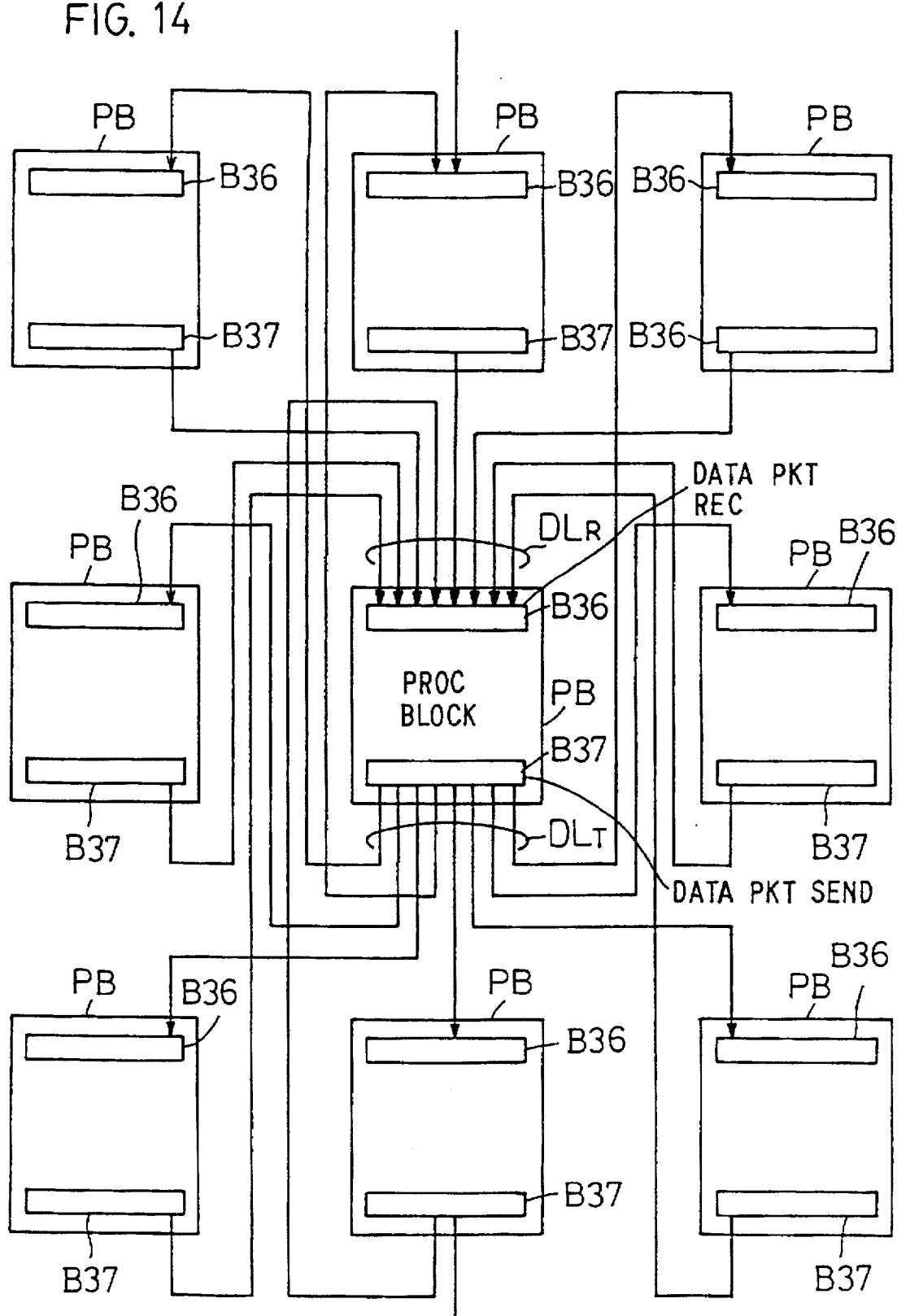

FIG. 25A

| $x_t$ | $y_t$ | $\Delta x$ | $\Delta y$ | $X_M$ | $Y_M$ | $Z_M$ | $V_M$ | $V$ |
|---|---|---|---|---|---|---|---|---|

FIG. 25B

| $x_t$ | $y_t$ | $\Delta x$ | $\Delta y$ |
|---|---|---|---|

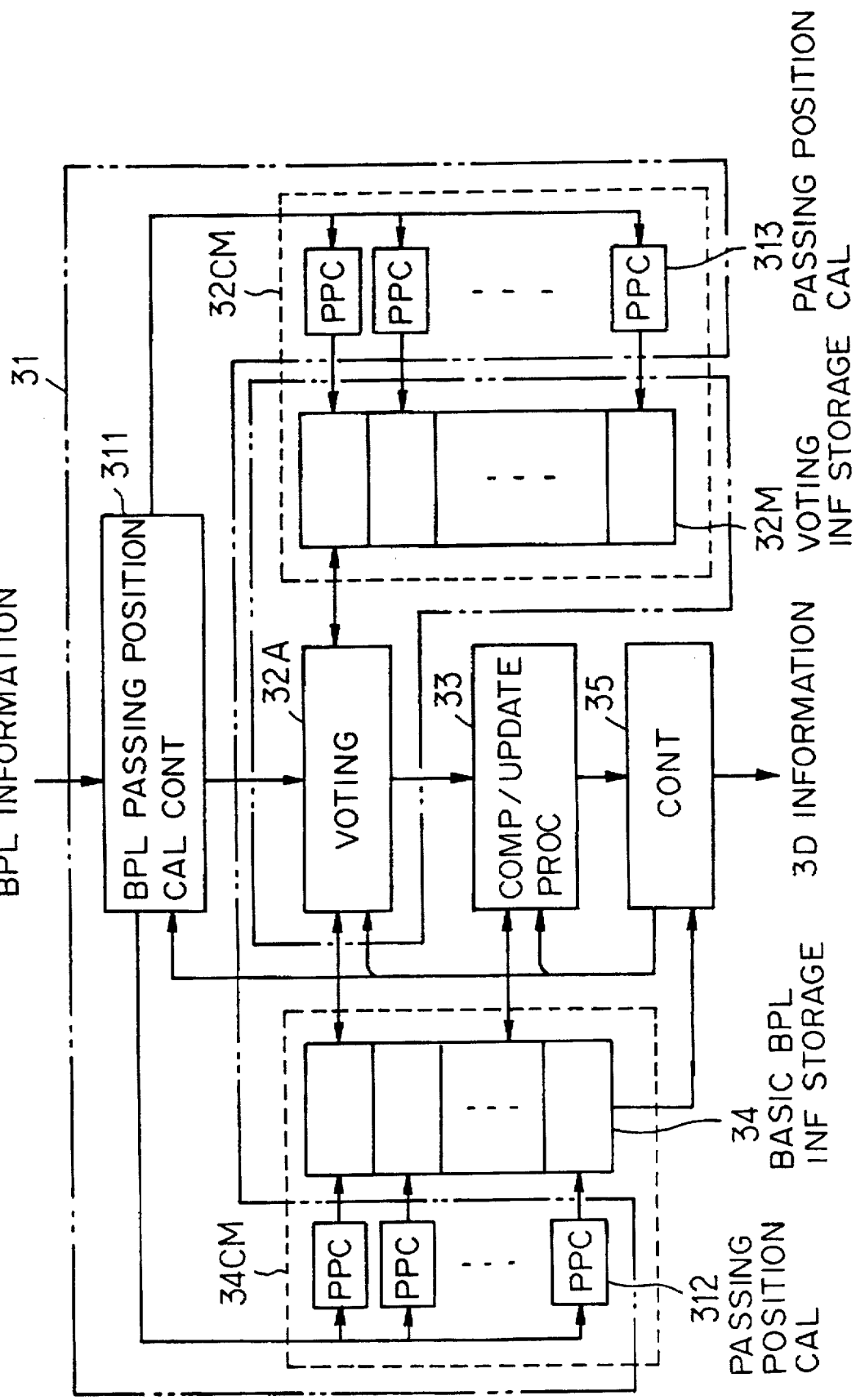

METHOD AND APPARATUS FOR EXTRACTING 3D INFORMATION OF FEATURE POINTS

BACKGROUND OF THE INVENTION

The present invention relates to a method and apparatus for extracting 3 dimension information that represents the shape of a 3 dimensional object.

With a conventional 3D (three-dimension) information extracting technique, a plurality of 2D (two-dimension) images of the same object are taken from different viewpoints in their individual sight-lines directions; straight lines are drawn from the respective viewpoints toward feature points of the object appearing in the 2D images and passed over the 3D space where the object exists; a "1" is voted for each voxel in the 3D space through which one of the straight lines passed; and highly voted voxel positions (the coordinates in the 3D space) are extracted as positions where feature points of the object are likely to exist. Incidentally, the straight lines, which are extended from the viewpoints toward the feature points appearing in the 2D images of the same object picked up from different viewpoints, are hereinafter called "back-projection lines" and simply abbreviated as "BPLs" in the drawings.

FIG. 1 schematically illustrates the configuration of a conventional 3D information input device using such a 3D information extracting method as referred to above.

The prior art 3D information input device comprises an image inputting part 10, a back-projection line generating part 20 and a 3D information extracting device 30. In the image inputting device 10, cameras $11_0$ to $11_{R-1}$ are used to simultaneously pick up images of a 3D object from R (R being a predetermined integer equal to or greater than 2)—for example, R=5 cameras are provided. The plurality of analog images thus picked up by the cameras are simultaneously converted by A/D converters $12_0$ to $12_{R-1}$ into digital images, which are input into image memories $13_0$ to $13_{R-1}$, respectively.

A plurality of image $I_r$ (r=0, 1, . . . , R-1) read out of the image memories $13_0$ to $13_{R-1}$ are fed to feature extracting parts $14_0$ to $14_{R-1}$, wherein feature points on the images (hereinafter referred to as 2D feature points) are detected at the same time. Let the number of feature points in the image $I_r$ be represented by $F_r$. The feature points are, for example, edges, straight lines and areas on the object. The plurality of images, from which the feature points have thus been extracted, are input into image memories $15_0$ to $15_{R-1}$. The back-projection line information generating part 20 is to generate back projections, using the input image having their feature points extracted in the image inputting part 10.

FIG. 2 is a diagram for explaining back-projection lines L in a 3D voxel space VS and voting. The back projection-lines L are straight lines which are each extended from the lens center of each camera $11_r$ (a viewpoint) across one feature point $P_f$ on the 2D image Ir picked up by the camera $11_r$ and pass through the 3D voxel space VS.

The back-projection line information generating part 20 requires information about the back-projection lines L such as world coordinates of the feature points on the images and world coordinates of the viewpoints. The "voxel" is a unit 3D picture element or pixel, and the "3D voxel space" is a space fully filled with a large number of voxels divided from the 3D space where the object to be processed exists. Let the coordinate of each voxel be represented by (X,Y,Z); the coordinate values X, Y and Z take integer values so that they are expressed by X=0, 1, . . . , $N_X$-1, Y=0,1, . . . , $N_Y$-1, Z=0, 1, . . . , $N_Z$-1. Incidentally, $N_X$, $N_Y$ and $N_Z$ represent the numbers of voxels in the X-, Y and Z-axis directions in the voxel space VS, respectively.

Where the same 3D feature point on a 3D object OB is observed through a plurality of cameras, the images picked up by the plurality of cameras respectively contain corresponding 2D feature points Pf and back-projection lines from such 2D feature points intersect at the position of the original 3D feature point. Hence, the number of back-projection lines that pass through the voxel containing the intersecting point is larger than the numbers of back-projection lines that pass through other voxels on such back-projection lines. The 3D information extracting device 30 is supplied with the back-projection information from the back-projection information generating part 20, casts a vote for every voxel on each back-projection line where a 3D feature point is likely to exist in correspondence with the feature point $P_f$ of the object appearing on the image, then calculates and outputs, as the 3D position of the feature point of the object, the position of the voxel that has the maximum voting score. That is, the number of votes cast for each voxel indicates the number of back-projection lines passing through the voxel.

With a first conventional 3D information extraction method, storage means is used to store voting scores corresponding to all voxel positions in the 3D voxel space VS, and as described above, voting is done for all the voxel positions through which the respective back-projection lines L pass, followed by locating voxel positions of the maximum voting score in the 3D voxel space VS and extracting the located voxel positions as 3D positions of feature points. This traditional method is disclosed in T. HAMANO et al. "Direct Estimation of Structure from Non-linear Motion by Voting Algorithm without Tracking and Matching", Proc. of ICPR, 1, pp.505–508, 1992.

That is, according to the first conventional method, storage means is prepared to store voting scores corresponding to all the voxel positions in the 3D voxel space VS, and based on the information obtained in the back-projection lines information generating part 20, back-projection lines are drawn from all the 2D feature points in all the images into the 3D voxel space where the 3D object OB exists. Since there always exist on the respective back-projection lines the 3D feature points in the real space corresponding to the 2D feature points appearing in the images, it can be said that there is the possibility of the 3D feature points existing at all the voxel positions through which the back-projection lines pass. Then, the contents of the storage means corresponding to all the voxel positions through which the back-projection lines pass are incremented (voting process). After this voting process is performed for all the back-projection lines, the voxel positions of the maximum voting score in the 3D voxel space are located and these voxel positions are all output as 3D coordinates of the feature points.

In the first conventional method, however, a plurality of maximum values may sometimes exist on one back-projection line, in which case it is judged that 3D feature points exist at all coordinates corresponding to the maximum values, and at least one of them is a "false 3D feature point" $P_{f3d}$' as shown in FIG. 2. Hence, the first conventional method has the defect of the possibility of such a false 3D feature point being extracted.

As a solution to this problem, there has been proposed a second 3D information extraction method (S. KAWATO, "3D Shape Recovery by Octree Voting Technique,"

Videometrics, SPIE Vol. 1820, pp. 40–49, 1992). This second method performs voting for all voxel positions through which all back-projection lines pass, as is the case with the above-mentioned first method, and then performs second voting through utilization of the existence of only one feature point on each back-projection line, thereby suppressing the extraction of the false feature point.

That is, according to the second method, two storage means (hereinafter referred to as first and second voting score storage means, which are identical with that used in the first conventional method) are prepared for storing voting scores of all voxel positions in the 3D voxel space and voting for the voxels on all the back-projection lines is done in the same manner as in the case of the first method. Let the voting score or count, which is stored in the first storage means for each voxel as the result of the first voting, be represented by $K_1$. After this, all the back-projection lines are drawn again, then the voting scores K1 corresponding to the voxels on each back-projection lines are read out of the first storage means and checked for the positions of the voxels with the highest vote count, and voting is done for the voxel positions with the maximum voting score $K_1$ and stored in the corresponding locations of the second voting score storage means.

Let the voting score, which is stored in the second storage means as the result of the maximum voting score search and the second voting for all the back-projection lines, be represented by $K_2$. Finally, a ratio $K_2/K_1$ is calculated for each voxel and the voxel positions with the ratio above a certain threshold value are extracted and output as 3D coordinates of feature points. Thus, the second traditional method ensures the extraction of the maximum voting score for the voxels on each back-projection line, and hence precludes the possibility of the false 3D feature points being extracted.

The first conventional method described above requires the preparation of the storage means for storing the voting scores corresponding to all the voxel positions in the 3D voxel space, and hence the method possesses shortcomings that an enormous amount of hardware is needed and that false 3D feature points are readily extracted. Moreover, according to the first prior art method, the maximum voting scores in the 3D voxel space needs to be found to locate the voxel positions with the maximum voting scores after the voting for all the back-projection lines in the 3D voxel space—this inevitably increases the processing time. Furthermore, since false feature points are prone to extraction, the 3D information extraction performance diminishes accordingly.

On the other hand, the second traditional method is free from the likelihood of extraction of false 3D feature points but requires a larger amount of hardware than does the first method because of the necessity of preparing two storage means for storing voting scores corresponding to all the voxel positions in the 3D voxel space. Besides, it is necessary that the formation of back-projection lines and the voting for the 3D voxel space be carried out twice for all the feature points—this also introduces the problem of increased processing time.

In addition, according to the first and second conventional method, there is a possibility that back-projection lines from different images do not cross the same voxel corresponding to feature points in the images under the influence of an error in imaging the object OB or quantization (voxelization) error, or by selecting resolution of the 3D voxel space finer than image resolution; hence, both methods are low in the 3D information extraction performance.

To solve the above-mentioned problem common to the first and second methods, there has been proposed a method (referred to as a third conventional method). According to the third conventional method, the back-projection lines are drawn in the form of pyramids of sights and voting is done for such back-projection lines having certain widths. This is disclosed in the aforementioned literature by T. HAMANO et al.

As is the case with the first method, the above-mentioned third method also prepares for storing voting scores corresponding to all voxel positions in the 3D voxel space and draws back-projection lines onto the 3D voxel space on the basis of the information provided in the back-projection line information generating part 20. In this instance, as shown in FIG. 3, pyramidal back-projection lines L are drawn from viewpoints 11 in such a manner as to pass along edges of pixels where the feature points $P_f$ exist on images I, and voting is done for voxels included in the pyramids. After execution of the voting for all back-projection lines, the center-of-gravity position $(X_w, Y_w, Z_w)$ of an area A is computed where the pyramidal back-projection lines L intersect, and the thus computed center-of-gravity position is output as 3D coordinates of the feature point.

Since the back-projection lines L each have a width as mentioned above, the third conventional method settles the problem of nonintersecting back-projection lines, but this scheme causes a significant increase in the processing time.

Further, the first, second and third conventional methods possess a common defect that the maximum voting scores may sometimes take the same value continuously on back-projection lines of a basic image when the resolution of the 3D voxel space is lower than the image resolution.

SUMMARY OF THE INVENTION

It is therefore an object of the present invention to provide a 3D information extracting method and apparatus which permit a scale-down of hardware needed for voting of back-projection lines and reduction of the processing time.

A 3D information extracting apparatus according to a first aspect of the invention comprises:

basic back-projection line information storage means which, letting at least predetermined one of a plurality of images be defined as a basic image and each back-projection line from the basic image as a basic back-projection line, have an area for storing maximum point information about each basic back-projection line, the maximum point information containing maximum value of a voting score on the basic back-projection line in the past and the voxel position where the maximum value was obtained;

voting means which counts the number of back-projection lines projected back from the other images and passing through that one of the voxels through which each basic back-projection line passes, and calculates a voting score corresponding to the count value;

compare/update means which compares the voting score calculated by said voting means with said maximum value of the maximum point information stored in the storage area of the basic back-projection line information storage means corresponding to each basic back-projection line and, if the former is larger than the latter, updates the maximum point information in the corresponding area of the basic back-projection line information storage means with new maximum point information consisting of the voting score and the voxel position where that voting score is obtained; and control means which controls the voting means and the compare/update means to repeat processing of obtaining the voting score and processing of comparing/updating the maximum point information for each voxel on each basic back-projection line in the 3D space and, after completion of that processing, reads out of the storage area of the basic back-projection line information storage means the voxel position where the maximum value of voting score is obtained and outputs it as the 3D information of the feature points on the object.

According to a second aspect of the present invention, in the apparatus of the first aspect of the invention, the voting means includes voting information storage means composed of storage areas each corresponding to one of all voxels forming each voxel slice of the 3D space, for storing as a voting score the number of back-projection lines passing through each voxel, and voting score update means which reads out the voting score stored in the storage area of the voting information storage means corresponding to the voxel of each of the passing positions calculated by the passing position calculating means, then adds "1" to the read-out voting score and writes it again in the same area, and the control means includes means for clearing all the storage areas of the voting information storage means upon each completion of the processing by the voting means and the compare/update means for each voxel slice of the 3D space.

According to a third aspect of the present invention, in the apparatus of the first aspect of the invention, passing position calculating means is provided for calculating the passing positions of the respective back-projection lines in each voxel slice of the 3D space; letting the other images be defined as reference images and the back-projection lines coming therefrom as reference back-projection lines, the voting means includes: voting information storage means which stores, as information associated with voting, passing position information about all of the reference back-projection lines calculated by the back-projection line passing position calculating means for each voxel slice of the 3D space; and reference back-projection line counting means which searches the voting information storage means for the reference back-projection line passing information corresponding to the passing position of each basic back-projection line, then counts the number of detected information and calculates therefrom the number of reference back-projection lines passing through the voxel corresponding to the passing position of each basic back-projection line.

According to a fourth aspect of the present invention, in the apparatus of the first aspect of the invention, an array of processing blocks is provided corresponding to an array of all the voxels forming the voxel slice and the processing blocks are each connected to adjacent ones of them;

wherein the voting means includes first data packet storage part and a counting part provided in each of the processing blocks, and the first data packet storage part of each of the processing blocks holds information about each back-projection line passing through the corresponding voxel as a first data packet, the information about each back-projection line containing the world coordinate of the position where each back-projection line passes the corresponding voxel and the direction vector of each back-projection line, and the counting part of each processing block counts the number of all first data packets written in the first data packet storage part of each processing block and generates a voting score corresponding to the count value;

wherein the basic back-projection line information storage means has, as a second data packet storage part provided in each processing block, the storage area for storing as a second data packet the maximum point information about each basic back-projection line passing through the voxel corresponding to each processing block;

wherein the compare/update means has a second data packet updating part provided in each processing block, and the second data packet updating part of each processing block compares the voting score generated by the counting part of each processing block and the maximum value of the maximum point information stored in the second data packet storage part of each processing part and, if the former is larger than the latter, updates the maximum point information in the second data packet storage part with the voting score and the position of the voxel corresponding to each processing block;

wherein each processing block further includes: a data packet receiving part which writes the first data packet input thereinto in the first data packet storage part and the second data packet in the second data packet storage part; a first data packet updating part which, after the operation of the second data packet updating part, adds the passing position world coordinate of each first data packet in the first data packet storage part to the direction vector of the corresponding back-projection line to generate a passing position world coordinate in the next voxel slice of the 3D space and combines it with the direction vector to generate an updated first data packet; and a data packet transfer part which, when the back-projection line corresponding to the updated first data packet is the basic back-projection line, transfers the updated first data packet, together with the second data packet, to the processing block corresponding to the passing position world coordinate of the basic back-projection line; and wherein the control means includes: initial data input means which inputs into the first data packet storage part of each processing part, as an initial data packet, the initial passing position world coordinate of the back-projection line passing through the voxel corresponding to each processing block and the direction vector of the back-projection line; a transfer control part which instructs the operations of the counting part and the second data packet updating part of each processing part; and a second data packet readout part which, after repeating the processing by each processing part in each voxel slice of the 3D space, reads out the maximum point information from the second data packet storage parts of all of the processing blocks and outputs it as the 3D information about feature points of the object.

A 3D information extracting method according to a fifth aspect of the present invention comprises the steps of:

(a) calculating passing positions of back-projection lines passing through a selected one of the voxel slices of the 3D space;

(b) letting at least one of the plurality of images defined as a basic image and each back-projection line from the basic image as a basic back-projection line, counting, on the basis of the calculated passing positions, back-projection lines projected back from the other images and passing through that one of the voxels through which each of the basic back-projection lines passes, and calculating a voting score corresponding to the count value;

(c) referring to maximum point information containing a voting score of the maximum value in the past and the voxel position corresponding thereto and stored in basic back-projection line information storage means in correspondence with each basic back-projection line, comparing the voting score obtained in step (b) and the maximum value and, if the voting score is larger than the maximum value, updating the corresponding maximum point information stored in the basic back-projection line information storage means with new maximum point information containing the voting score and the voxel position where it was obtained; and (d) repeating the processing of steps (a), (b) and (c) for all voxels on each basic back-projection line in the 3D space and thereafter outputting from the basic back-projection line information storage means, as 3D information of a feature point on the object, the voxel position where the voting score was obtained.

BRIEF DESCRIPTION OF THE DRAWINGS

FIG. 9A is a table showing, by way of example, maximum point coordinate data and passing coordinate data stored in a basic back-projection line information storage part 34;

FIG. 9B is a table showing, by way of example, the voting score distribution when voting is done on the voting information storage part 32M on the basis of the data shown in FIG. 9A;

FIG. 9C is a table showing the contents of the storage part 34 after updating the data of FIG. 9A with the voting scores in FIG. 9B;

FIG. 14 is a diagram illustrating part of an array of 8 neighbor mesh-networked processing blocks;

FIG. 25A is a diagram showing the structure of data that is stored in the basic back-projection line information storage part 34 in the FIG. 24 embodiment;

FIG. 25B is a diagram showing the structure of data that is stored in a voting information storage part 32M in the FIG. 24 embodiment;

FIG. 26 is a block diagram illustrating a 3D information extracting apparatus according to a ninth embodiment of the present invention;

DESCRIPTION OF THE PREFERRED EMBODIMENTS

Figure 4:
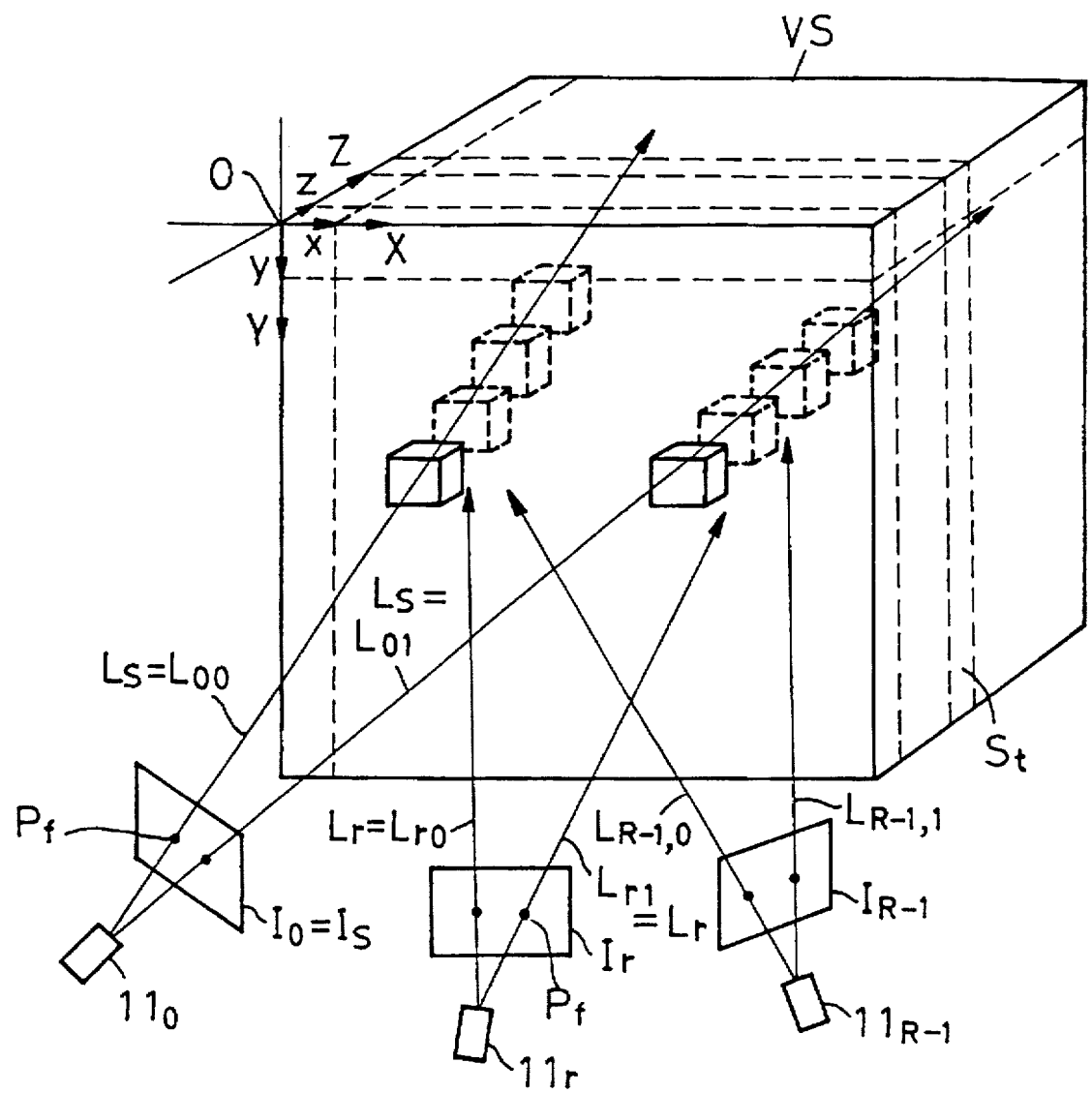
FIG. 4 is a diagram for explaining back-projection lines for a voxel space according to the present invention.

To explain the principles of operation of the 3D information extracting apparatus according to the present invention, there are shown in FIG. 4 back-projection lines $L_{00}$, $L_{01}$, ... , $L_{R-1,0}$, $L_{R-1,1}$ from viewpoints $11_0$ to $11_{R-1}$ that pass through respective feature points $P_f$ on images $I_0$ to $I_{R-2}$ and through voxels in the voxel space VS. Coordinate axes X, Y and Z, which define the voxel coordinates (X,Y,Z) representing the positions of voxels in the voxel space VS, are set along three intersecting sides of the voxel space VS as shown, and world coordinate axes x, y and z are set in agreement with the voxel coordinate axes X, Y and Z, respectively, for the sake of brevity. Accordingly, these voxel and world coordinate systems are assumed to have the common origin O. Assuming, for instance, that [x], [y] and [z] are respectively maximum integers smaller than x, y and z, the voxel coordinates (X,Y,Z) and the world coordinates (x,y,z) bear such relationships as X=[x], Y=[y] and Z=[z]. That is, integer parts of the world coordinate values x, y and z are used as voxel coordinate values X, Y and Z, respectively. The voxel space VS is defined by X=0,1, ..., $N_x$-1, Y=0,1, ..., $N_y$-1, and Z=0,1, ..., $N_z$-1. In the present invention, at least one predetermined image $I_0$, for instance, selected from among the images $I_0$ to $I_{R-1}$, is set as a basic image $I_s$ and the other images as reference images $I_r$. Further, the straight lines $L_{00}$, $L_{01}$, ..., which are projected through the feature points $P_f$ on the basic image $I_s$, will hereinafter be referred to specifically as basic back-projection lines and identified by $L_a$, and straight lines $L_{r0}$, $L_{r1}$, ..., which are projected through the feature points $P_f$ on the reference images $I_r$, will hereinafter be referred to specifically as reference back-projection lines and identified by $L_r$.

Figure 5:
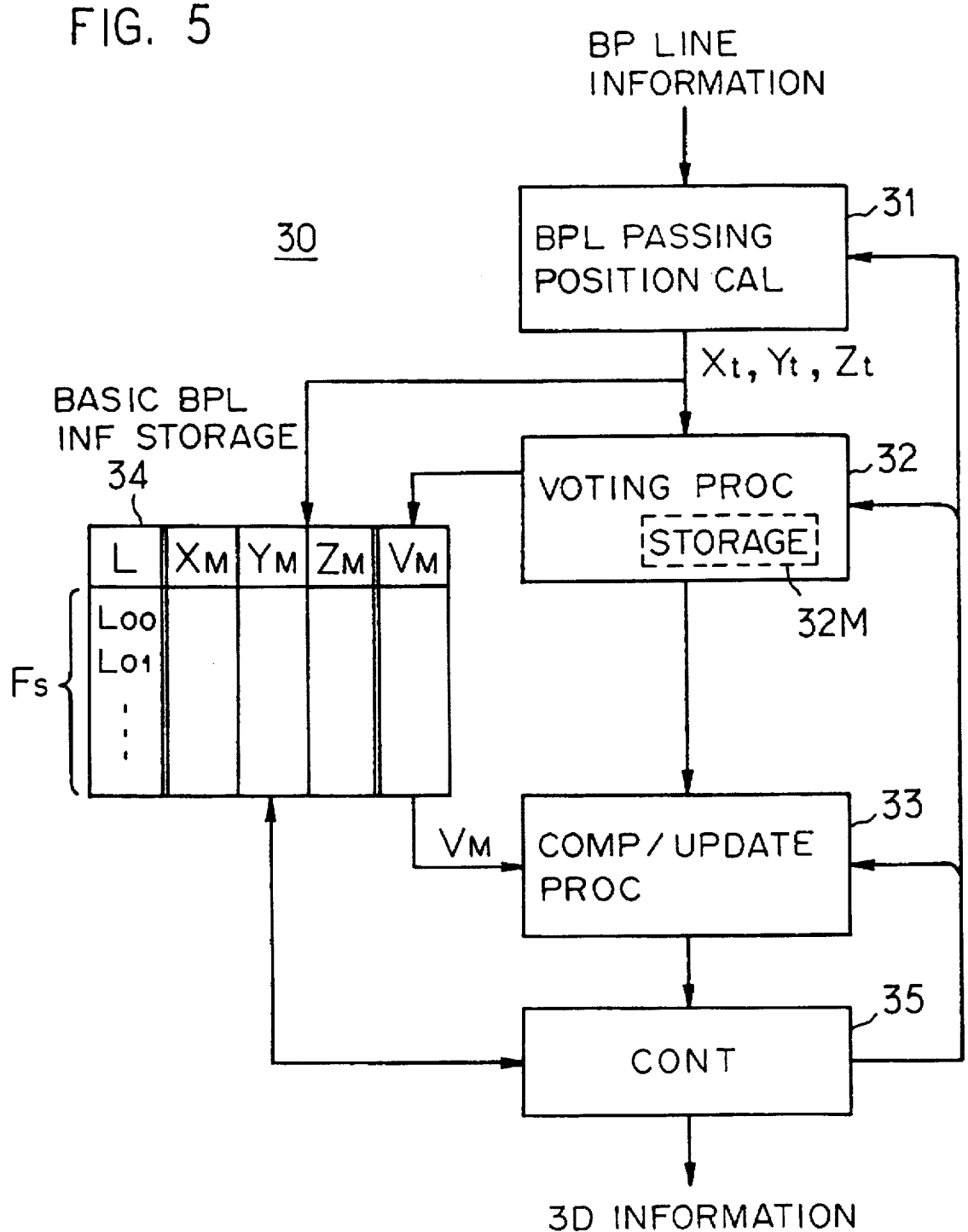
FIG. 5 is a block diagram illustrating the basic configuration of the 3D information extracting apparatus according to the present invention.

FIG. 5 illustrates the basic configuration of the 3D information extracting apparatus 30 according to the present invention, which is provided with a back-projection line passing position calculating part 31, a voting processing part 32, a compare/update processing part 33, a basic back-projection line information storage part 34 and a control part 35. The back-projection line passing position calculating part 31 is supplied with position information of all feature points (2D feature points) in the respective images $I_0$ to $I_{R-1}$ from the back-projection line information generating part 20 described previously with respect to FIG. 1, calculates back-projection lines passing through the feature points and calculates positional coordinates $(X_t, Y_t, Z_t)$ of voxels through which the back-projection lines pass in the voxel space VS. The voting part 32 performs voting for each voxel at every voxel position $(X_t, Y_t, Z_t)$ on each basic back-projection line with back-projection lines that come from the reference images $I_r$, and counts the voting score V for each voxel. The compare/update processing part 33 reads out of the basic back-projection line information storage part 34 the maximum voting score $V_M$ of voxels selected until then, in correspondence with the voting scores V counted by the voting processing part 32 for a series of voxels selected in an arbitrary sequence on each basic back-projection line, and the compare/update processing part 33 compares the readout maximum voting score $V_M$ with each of the voting scores V of the currently selected voxels. If $V_M > V$, then the voting score V of the currently seleced voxel and its position $(X_t, Y_t, Z_t)$ are used as a new maximum voting score $V_M$ and a new maximum point position $(X_M, Y_M, Z_M)$ to update information about the corresponding basic back-projection line in the basic back-projection line information storage part 34.

After execution of the voting and the compare/update processing has been completed for all the voxels on one basic back-projection line ($L_{00}$, for instance), the maximum voting score in the storage area for the back-projection line $L_{00}$ and the position $(X_M, Y_M, Z_M)$ of the voxel given the maximum voting score $V_M$ are obtained in the basic back-projection line information storage part 34. This position represents the position of one 3D feature point. By performing the same processing for the other basic back-projection lines $L_{01}$, as well, the positions $(X_M, Y_M, Z_M)$ of voxels each given the maximum voting score $V_M$ are respectively obtained as the positions of 3D feature points. The control part 35 controls the sequence and iteration or repetition of the above-described processing for the respective basic back-projection lines in the parts 31, 32 and 33 and, after completion of the processing for all basic back-projection lines, reads out and outputs the positions of 3D feature point from the basic back-projection line information storage part 34.

In the apparatus of FIG. 5, either of the following cases is possible: (a) All the basic back-projection lines are selected one by one, the positions of voxels through which the selected basic back-projection line pass are calculated, the voting for the voxels and compare/update processing therefor are repeated for all of the passing voxels, and similar processing is repeated for all the basic back-projection lines. (b) Alternatively, letting voxel slices $S_t$ be defined as those obtained by slicing the voxel space VS at equal intervals of the voxel length in parallel to a plane where the basic back-projection lines are incident to the voxel space VS (i.e. the X-Y plane in FIG. 4), it is also possible to execute the voting and the compare/update processing for those voxels in the same voxel slice through which all basic back-projection lines pass and to repeat such processing for all voxel slices in a desired sequence. In the former case (a), if upon each detection of one 3D feature point the apparatus of FIG. 5 needs to output its positional information, the basic back-projection line information storage part 34 needs only to have an area for storing the maximum voting score $V_M$ on at least one basic back-projection line and the voxel position $(X_M, Y_M, Z_M)$ where the maximum voting score $V_M$ is obtained.

In the latter case (b) where the voting for all voxels through which all the basic back-projection lines pass is done for each voxel slice, it is necessary to hold the maximum voting score $V_M$ obtained until then and its voxel position $(X_M, Y_M, Z_M)$ for every basic back-projection line; hence, the storage area to be prepared in the basic back-projection line information storage part 34 needs only to be large enough to store pairs of maximum voting scores $V_M$ and their voxel positions $(X_M, Y_M, Z_M)$ of the number corresponding to the number $F_S$ of all the basic back-projection lines. In this instance, it is possible to employ a method (b-1) in which the voting and the compare/update processing are carried out for each of the all the voxels through which all the basic back-projection lines in the voxel slice $S_t$ pass, or a method (b-2) in which after completion of the voting for all the voxels, the compare/update processing for all the voxels is carried out on the basis of the voting results. In the latter case (b-2), a voting information storage part 32M may be provided in the voting processing part 32 to hold the voting results until the compare/update processing for all voting results for each voxel slice is completed.

In either case, the storage capacity needed is appreciably smaller than in the prior art. Further, since the voting needs only to be carried out for the voxels on the basic back-projection lines, the amount of processing required and the processing time can be significantly reduced.

Figure 6:
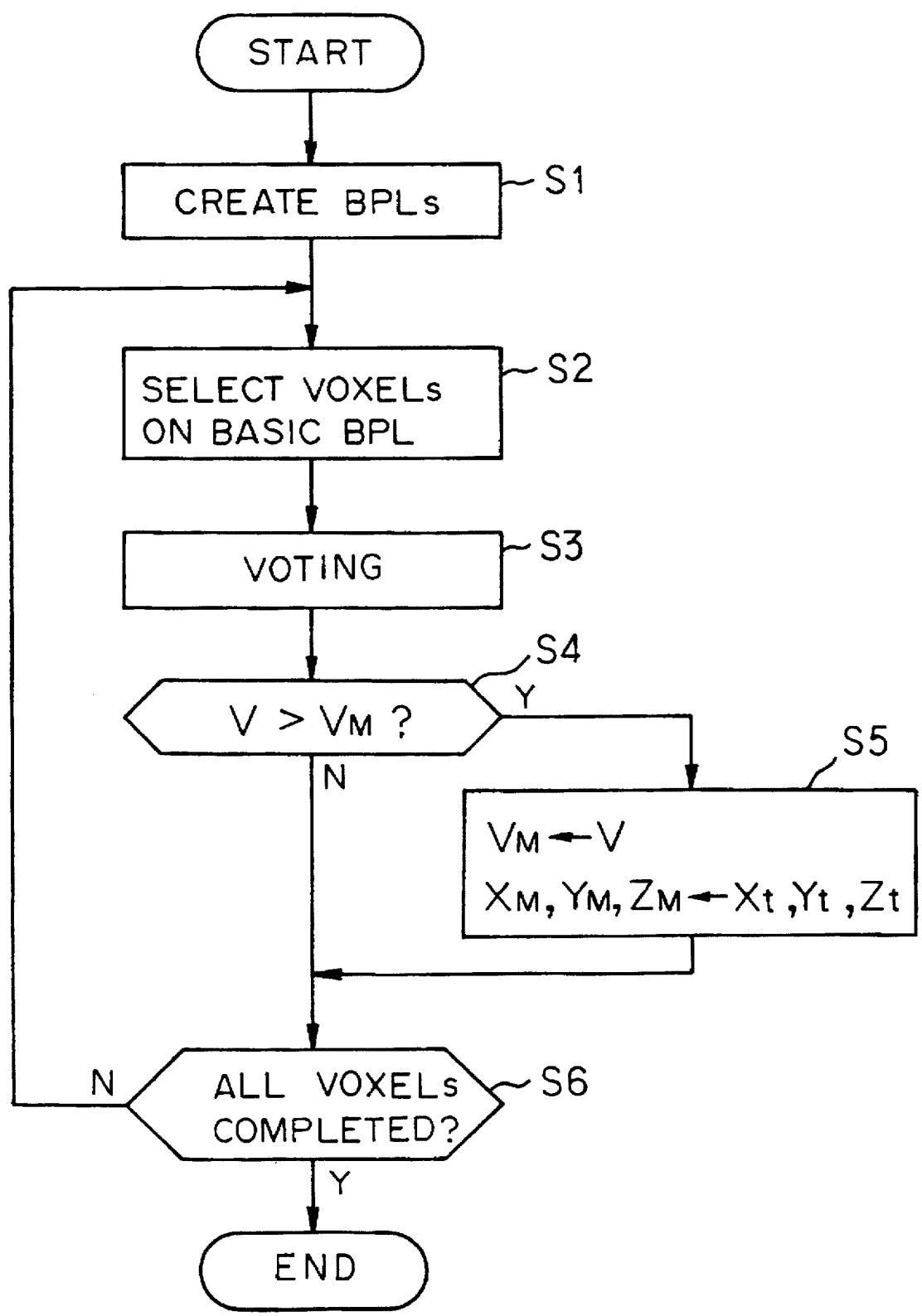
FIG. 6 is a flowchart showing a 3D information extraction procedure by the apparatus of FIG. 5.

FIG. 6 is a flowchart showing the procedure of the 3D feature point extraction by the apparatus of FIG. 5 employing the second method (b) mentioned above. In step S1, all basic back-projection lines and all reference back-projection lines are calculated from input 2D feature point data. In the next step S2, one voxel slice $S_t$ is selected, followed by selecting those voxels in the selected voxel slice through which all the basic back-projection lines pass. In step S3, voting is performed for the selected voxels with the reference back-projection lines. In the next step S4, the maximum voting score $V_M$ obtained on each basic back-projection line until then and the voting scores V obtained in step S3 are compared. If $V>V_M$, then the process goes to step S5, wherein the current voting score V and its voxel position $(X_t, Y_t, Z_t)$ are used to update the corresponding previous pieces of information to provide a new maximum voting score (hereinafter referred to simply as the maximum value) $V_M$ and its voxel position $(X_M, Y_M, Z_M)$ in step S5, after which the process goes to step S6. If not $V>V_M$ in step S4, the process proceeds directly to step S6. It is checked in step S2 whether the processing for all the voxel slices is completed, and if not, the process goes back to step S2, wherein another voxel slice is selected and the same processing as described above is repeated. Also in FIG. 6, a sequence of the selection of a voxel (step S2), the voting (step S3) and the compare/update processing (steps S4, S5) may be repeated for each basic back-projection line as referred to previously.

A description will be given of various embodiments based on the principles of the present invention described above in respect of FIGS. 5 and 6.

FIRST EMBODIMENT

Figure 7:
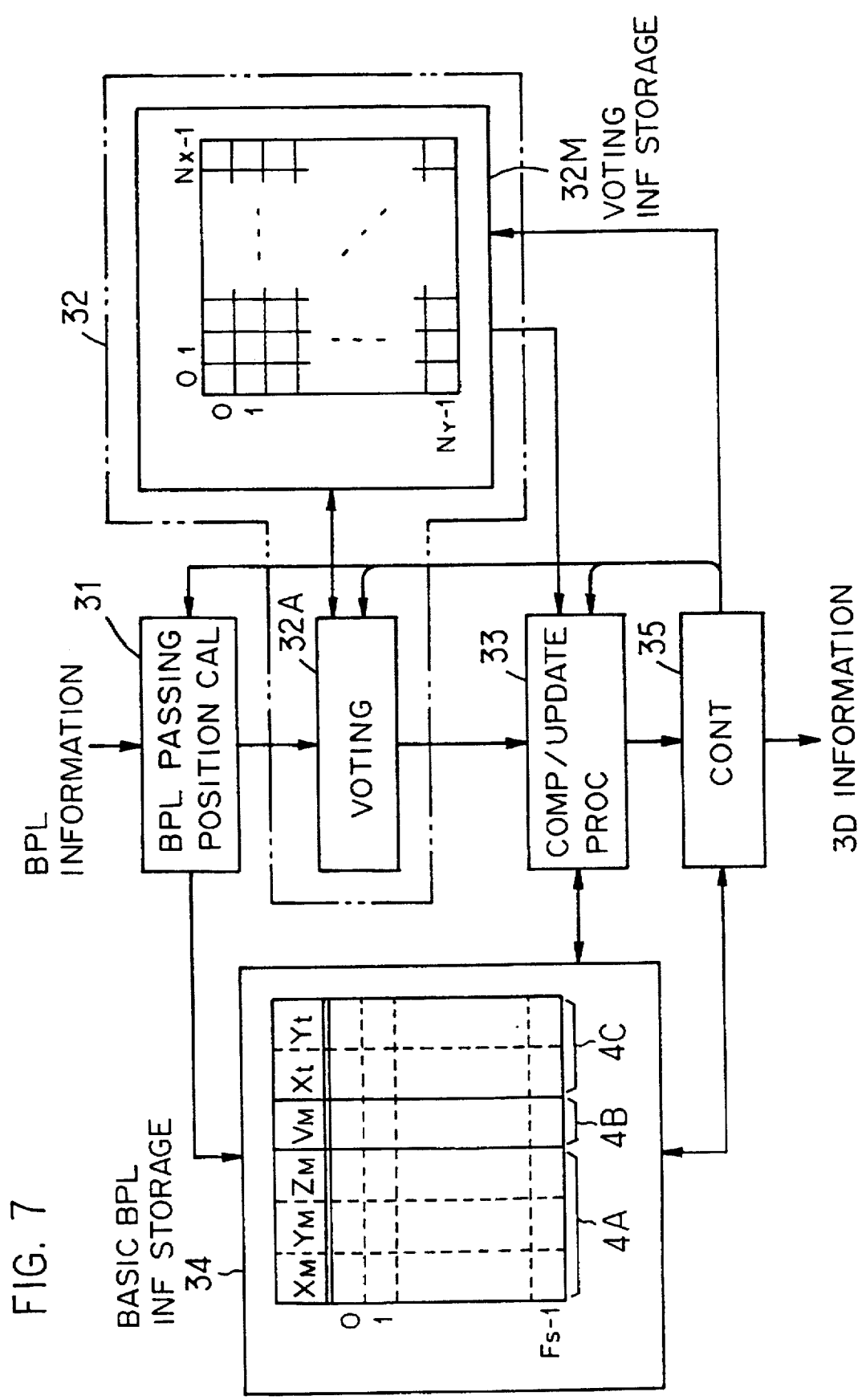
FIG. 7 is a block diagram showing a 3D information extracting apparatus according to a first embodiment of the present invention.

FIG. 7 illustrates in block form the general construction of a first embodiment of the 3D information extracting apparatus based on the principles of the present invention described above with reference to FIG. 5. As is the case with the basic construction depicted in FIG. 5, the apparatus of this embodiment has the back-projection line passing position calculating part 31, the voting processing part 32, the compare/update processing part 33 and the basic back-projection line information storage part 34. A control part 35 is to control operations and procedures of the individual parts 31, 32, 33 and 34. In this embodiment, to perform the voting and the compare/update processing for each voxel slice St, the voting processing part 32 is provided with a voting part 32A and a voting information storage part 32M that has $N_X \times N_Y$ memory areas respectively corresponding to $N_X \times N_Y$ voxels forming one voxel slice. The 3D information extracting apparatus of this embodiment is supplied with the back-projection line information (i.e., 2D feature points positional information) generated by the back-projection line information generating part 20 in FIG. 1 and outputs 3D coordinates of feature points on the 3D object OB. The operation of the 3D information extracting apparatus of this embodiment will be described below.

Figure 8:
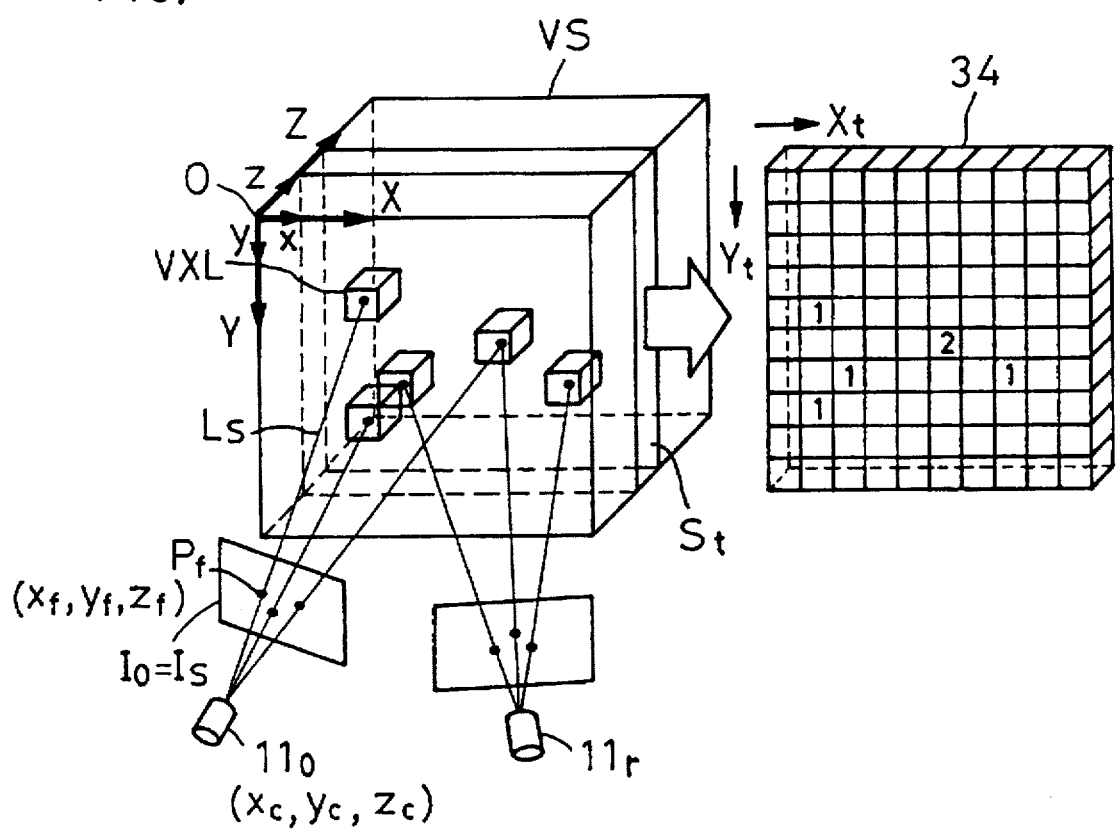
FIG. 8 is a diagram for explaining the correspondence between voxel slices and a voting information storage part 32M.

The whole processing of this apparatus is executed for each voxel slice $S_t$ into which the 3D voxel space VS is sliced with the thickness of the voxel as shown in FIG. 8. The following description will be given of the case where the voxel slice St is perpendicular to the Z axis as depicted in FIG. 4. Furthermore, as is the case with FIG. 1, it is assumed, for brevity's sake, that the voxel coordinates (X,Y,Z) and the world coordinates (x,y,z) have the common origin O and that integral unit lengths of the two coordinate systems are equal. What is meant by the "voxel through which a certain back-projection line passes" is a voxel that has the plane of incidence thereto of the back-projection lines at the side facing the origin O, and the passing position herein mentioned refers to the world coordinates (x,y,z) of the points of incidence of the back-projection lines in the plane of its incidence to the slice containing the voxel. The calculation of the passing positions of all back-projection lines L, the voting for all the back-projection lines L and compare/update processing of maximum point information about all basic back-projection lines of the basic image $I_s$ are carried out for a certain voxel slice $S_t$; these processings are performed for all voxel slices St (t=0,1,2, ..., $N_Z$-1) in a sequential order. A description will be given of these processings that are executed for one voxel slice $S_t$.

Figure 1:
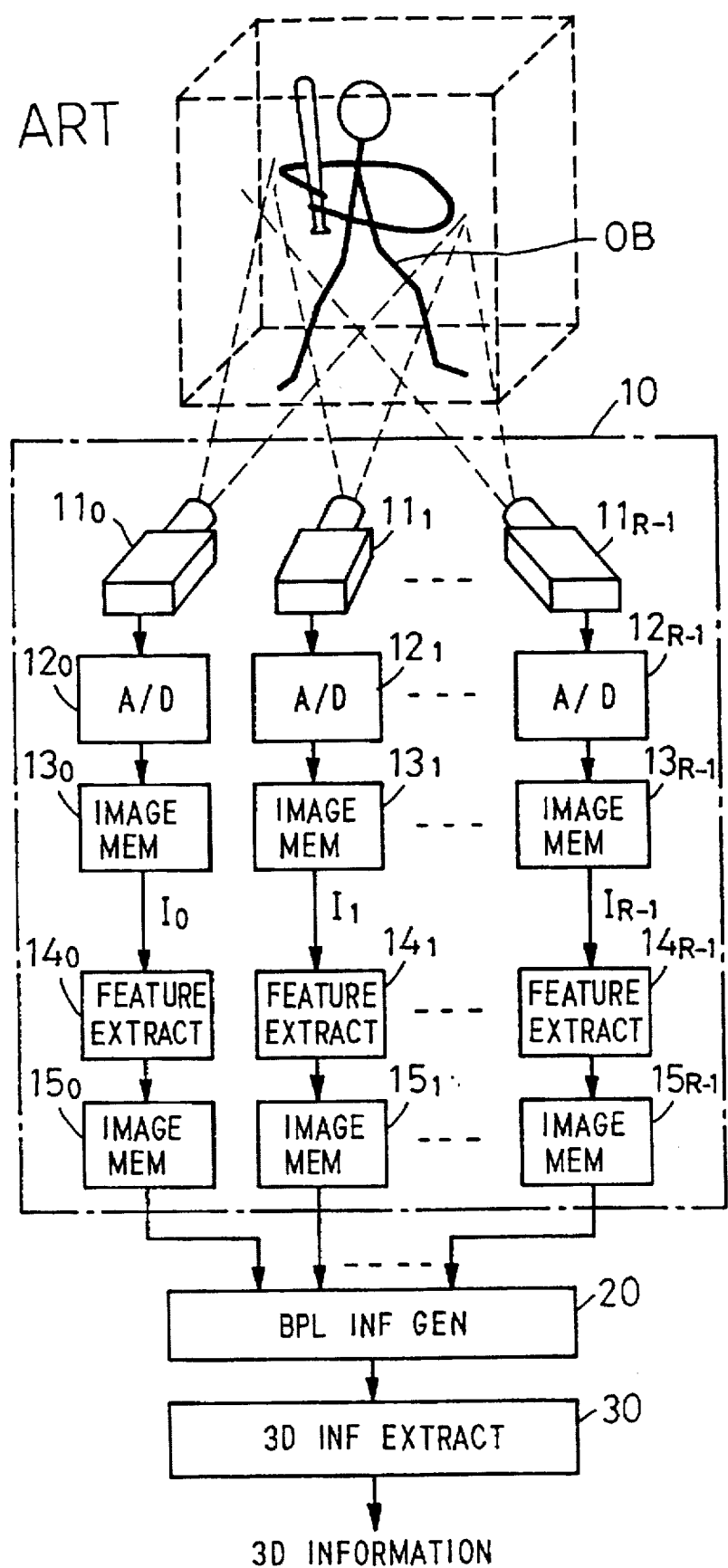
FIG. 1 is a block diagram showing the configuration of a conventional 3D information input device.
Figure 2:
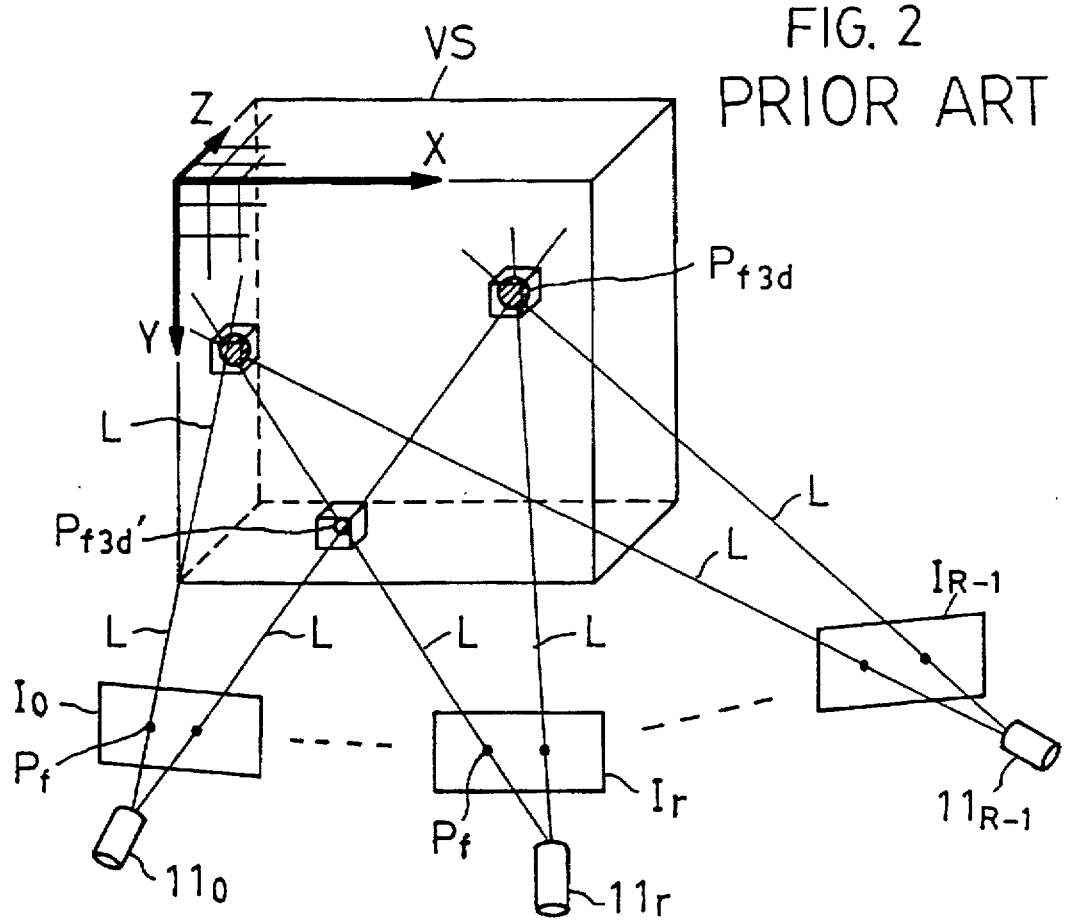
FIG. 2 is a diagram for explaining back-projection lines L in a 3D voxel space and voting therefor.
Figure 3:
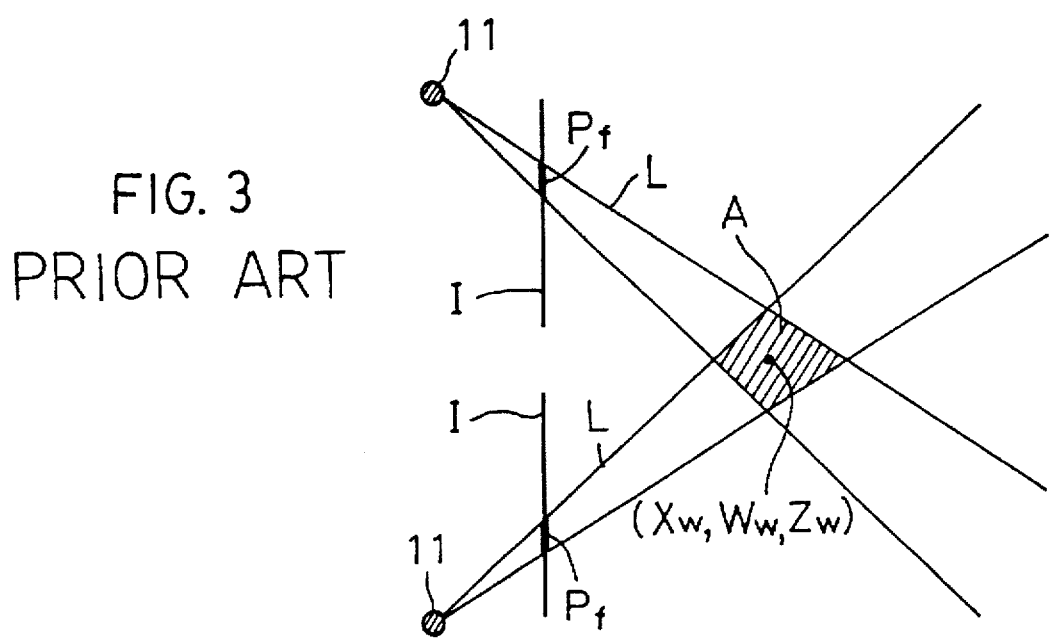
FIG. 3 is a diagram for explaining voting by back projection of pyramids of sights according to a third conventional method.

The back-projection line passing position calculating part 31 is supplied with the back-projection line information from the back-projection line information generating part 20 in FIG. 1 as in the prior art example, then calculates the voxel coordinates $(X_t, Y_t)$ of the positions where all the back-projection lines L pass through the voxel slice $S_t$ (Z=t, where t=0,1, ..., $N_Z$-1) and sequentially provides them to a voting section 32A of the voting part 32. Further, the voxel coordinates $(X_t, Y_t)$ of the passing positions of the back-projection lines $L_s$ from the basic image $I_S$ and the coordinate Z=t of the voxel slice $S_t$, calculated at the same time, are also output to the basic back-projection line information storage part 34. A description will be given of an example of a method for calculating the passing position (x,y).

For example, the back-projection line $L_0$, which is a straight line joining the viewpoint $11_0$ and one feature point $P_f$ in the image $I_0$, can be expressed by the following equation of a straight line on the basis of the world coordinate $(x_c, y_c, z_c)$ of the viewpoint $11_0$ of the image $I_0$ and the world coordinate $(x_f, y_f, z_f)$ of the feature point $P_f$ on the image $I_0$:

$$(x-x_c)/(x_f-x_c)=(y-y_c)/(y_f-y_c)=(z-z_c)/(z_f-z_c) \qquad (1)$$

For brevity's sake, assuming that each voxel is a cube whose one side has a length "1" in the world coordinate system and letting the position of a t-th voxel slice in the z-axis direction of the world coordinate system be represented by $z_t=t$, the world coordinate $(x_t, y_t, z_t)$ of the position where the back-projection line $L_0$ passes through the voxel slice $S_t$ can be calculated by the following equation:

$$x_t=(t-z_c)(x_f-x_c)/(z_f-z_c)+x_c$$
$$y_t=(t-z_c)(y_f-y_c)/(z_f-z_c)+y_c \qquad (2)$$

Letting the maximum integer smaller than a given real number a be represented by [a] as referred to previously, the voxel coordinate $(X_t, Y_t)$ of the voxel through which the back-projection line passes in the voxel slice $S_t$ is given by $X_t=[x_t]$ and $Y_t=[y_t]$. That is, the voxel coordinate values $X_t$ and $Y_t$ are given by the respective integral parts of the world coordinate values $x_t$ and $y_t$.

In this embodiment, the voting information storage part 32M has storage areas ($N_X \times N_Y$ words) having a one-to-one correspondence with all the voxels ($N_X \times N_Y$) in one voxel slice $S_t$; the number of back-projection lines passing through each voxel in the voxel slice $S_t$ (i.e., the voting score) is stored in the storage area corresponding to the voxel. The voting information storage part 32M may be formed by a RAM or the like that has its storage areas addressable just like a 2D arrangement in correspondence with one voxel slice $S_t$ as schematically shown in FIG. 8, for instance. Assume that the contents of the voting information storage part 32M are all preset to "0s."

The voting section 32A, whenever supplied with the passing voxel position $(X_t, Y_t)$ of each back-projection line in the voxel slice $S_t$ calculated by the back-projection line passing position calculating part 31, reads out of the voting information storage part 32M the value stored in the area corresponding to the passing voxel position, then increments the read-out value by one and writes the incremented value again into the same area of the voting information storage part 32M. By performing these operations for all the back-projection lines, the voting section 32A carries out the voting process. In other words, the voting processing part 32 constitutes back-projection line number counting means.

Storage areas of the basic back-projection line information storage part 34, which are specified by addresses 0, 1, . . . , $F_s$-1 corresponding to $F_s$ basic back-projection lines $L_{00}$, $L_{01}$, . . . , each have a field 4A for storing a maximum point coordinate $(X_M, Y_M, Z_M)$ obtained for the corresponding basic back-projection line in a past voxel slice, a field 4B for storing the corresponding maximum voting score $V_M$, and a field 4C for storing the passing voxel coordinate $(X_r, Y_r)$ of the basic back-projection line in the current voxel slice $S_r$. The coordinates $(X_r, Y_r)$ of the voxels through which the basic back-projection lines $L_s$ pass in the current voxel slice $S_t$ are used in the compare/update processing part 33 as addresses to read out of the voting information storage part 32M the voting scores V corresponding to those voxels. The basic back-projection line information storage part 34 is formed by, for example, a RAM which permits the read and write of storage areas specified by addresses respectively corresponding to the basic back-projection lines. The maximum voting scores $V_M$ in the field 4B are all preset to "0s" at the start of the operation throughout the apparatus.

In the processing of the voxel slice $S_t$ at the position zt in the z-axis direction, the compare/update processing part 33 first reads out the voting score V from that area of the voting information storage part 32 which corresponds to the voxel coordinate $(X_r, Y_r)$ of the position of passage of each basic back-projection line $L_s$ stored in the field 4C of the basic back-projection line information storage part 34, and compares the read-out voting score V with the maximum voting score $V_M$ on the basic back-projection line $L_s$ in the past voxel slices stored in the field 4B of the basic back-projection line information storage part 34. If $V > V_M$, the voting score V is used as a new maximum voting score $V_M$ to update the maximum voting score $V_M$ stored for the corresponding basic back-projection line in the field 4B of the basic back-projection line information storage part 34 and, at the same time, uses the voxel coordinate $(X_r, Y_r, Z_t)$ at that time as the most highly voted voxel coordinate $(X_M, Y_M, Z_M)$ to update the contents of the field 4A. A pair of the coordinate of maximum point and the maximum value $(X_M, Y_M, Z_M, V_M)$ will hereinafter be referred to as maximum point information. If $V \leq V_M$, the maximum point information will not be updated.

The control part 35 clears all the contents of the voting information storage part 32M upon each completion of the passing position calculation, the voting process and the compare/update process for each voxel slice $S_t$ and then, for the next voxel slice $S_{t+1}$, effects control to similarly perform the calculation of those voxel coordinates $(X_r, Y_r)$ through which all the basic back-projection lines pass, the voting process and the compare/update process.

After sequential execution of processing for all voxel slices $S_t$ in a given order as mentioned above, the maximum point coordinate $(X_M, Y_M, Z_M)$ on each basic back-projection line $L_s$ stored in the field 4A of the basic back-projection line information storage part 34 indicates the position of the voxel where the number of reference back-projection lines pass therethrough from different reference images. Hence, this is a voxel position where a feature point is most likely to exist in the 3D space. The control part 35 reads out the stored voxel coordinate $(X_M, Y_M, Z_M)$ of the maximum point as the 3D coordinate of the feature point and outputs it after converting it to the world coordinate (x,y,z) from $Z_M$ by the use of Eq. (2), if necessary. To prevent a measurement error or detection error under the influence of a voxel quantization error, the extraction precision may also be increased by performing threshold processing based on the stored maximum value $V_M$.

FIGS. 9A and 9C show the contents of the basic back-projection line information storage part 34 for four basic back-projection lines $L_{00}$, $L_{01}$, $L_{02}$ and $L_{03}$ in a certain voxel slice $S_t$ ($Z_t$=5) before and after the compare/update process in the case where the above-described processes are carried out one after another for each of the voxel slices. FIG. 9B shows the contents of the voting information storage part 32M after the voting process in the voxel slice $S_t$ ($Z_t$=5). While in this example the size $N_X \times N_Y$ of the voxel slice is shown to be 8×8, it is a matter of course that the processing can similarly be done irrespective of the size of the voxel slice. A description will be given of examples of the process flows in FIGS. 9A, 9B and 9C.

At first, the back-projection line passing position calculating part 31 calculates the positions of the voxels through which all the back-projection lines L pass in the voxel slice ($Z_t$=5). In this instance, the passing voxel positions $(X_r, Y_r)$ calculated for the basic back-projection lines ($L_{00}$, $L_{01}$, $L_{02}$, $L_{03}$) from the basic images are written into the field 4C of the basic back-projection line information storage part 34 shown in FIG. 9A. Next, the voting section 32A reads out values stored in those areas of the voting information storage part 32M (FIG. 9B) which correspond to those voxel positions $(X_r, Y_r)$ where all the back-projection lines L pass, then increments the read-out values by one and writes the incremented values again in the same areas. By this, the back-projection lines at the respective passing voxel positions are sequentially counted and the ultimate numbers of back-projection lines, that is, the voting scores V are written in the voting information storage part 32M as depicted in FIG. 9B.

Next, the basic back-projection line information compare/update processing is carried out. A comparison is made, for example, between the past maximum voting score $V_M$=1 of the basic back-projection line $L_{00}$ (FIG. 9A) and the value V=5 of the voting information storage part 32M corresponding to the passing voxel position $(X_r, Y_r)$=(2,2) of the basic back-projection line $L_{00}$. Since 1<5, the maximum value of the basic back-projection line $L_{00}$ in the past is updated with $V_M$=5 and the voxel position of the maximum point at that time is also updated with $(X_M, Y_M, Z_M)$=(2,2,5) (FIG. 9C). The compare/update processing is also performed for the other remaining basic back-projection lines $L_{01}$, $L_{02}$ and $L_{03}$; as the result of this, the maximum value in the past is updated for the basic back-projection line $L_{02}$ but, for the basic back-projection lines $L_{01}$ and $L_{03}$, the maximum values are not updated but kept unchanged, taking values $(X_M, Y_M, Z_M, V_M)$ shown in the fields 4A and 4B of the basic back-projection line information storage part 34 in FIG. 9C. After the above-described processing for each voxel slice $S_t$ is performed for all voxel slices, the voxel coordinate $(X_M, Y_M, Z_M)$ of the ultimately remaining maximum point indicates the position of the voxel where the number of back-projection lines passing therethrough from the reference images is the largest on the basic back-projection line, and consequently, each maximum point voxel coordinate $(X_M, Y_M, Z_M)$ is output as the 3D coordinate of one of the feature points.

In this first embodiment, since ordinary RAMs can be used as the voting information storage part 32M and the basic back-projection line information storage part 34, the 3D information extracting apparatus can be formed using hardware at low cost. Further, the back-projection line passing position calculation processing, the voting and the maximum point information compare/update processing are each performed by iterations of simple processing, and hence are suitable for pipeline processing—this leads to the advantage of the speeding up of the processing. Although in FIG. 7 the basic back-projection line information storage part 34 is shown to include the field 4C for storing the voxel coordinates $(X_r, Y_r)$, calculated in the back-projection line passing position calculated part 31, through which the basic back-projection lines pass in the voxel slice $S_t$ being currently processed, a memory for storing these basic back-projection line passing voxel coordinates $(X_r, Y_r)$ may also be provided in the passing position calculating part 31 or compare/update processing part 33. In the above, by selecting another image as the basic one and performing again the 3D feature extraction processing, it is possible to increase the likelihood of the 3D feature points and to detect 3D feature points not observed in one basic image.

SECOND EMBODIMENT

Figure 10:
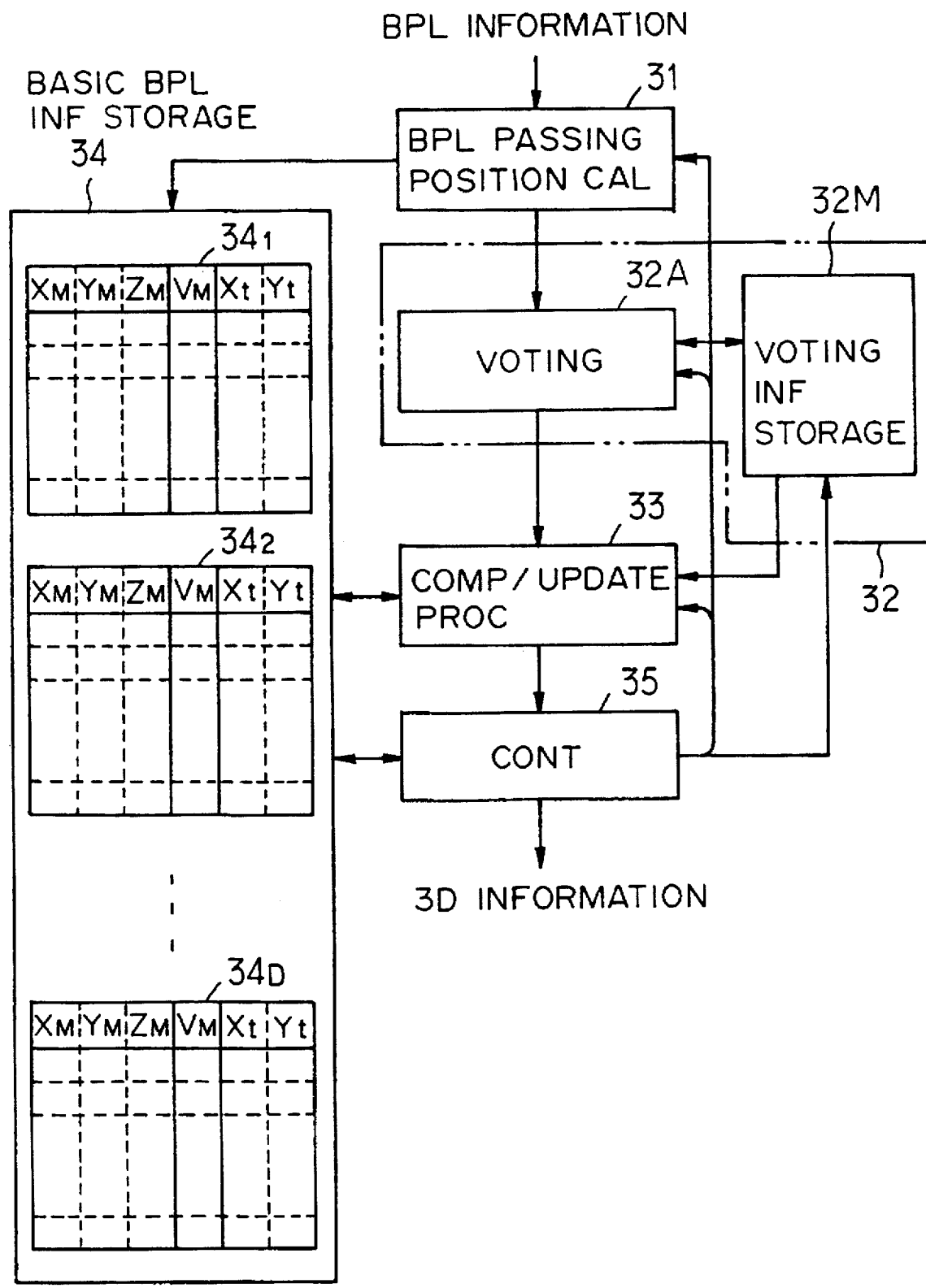
FIG. 10 is a block diagram showing a 3D information extracting apparatus according to a second embodiment of the present invention.

FIG. 10 is a diagrammatic sketch of a second embodiment of the 3D information extracting apparatus according to the present invention. Reference numeral 34 denotes a basic back-projection line information storage part and $34_1$-$34_D$ basic back-projection line information memories, and the parts corresponding to those in the first embodiment are identified by the same reference numerals.

In this embodiment, instead of repeating the processing of the first embodiment for each basic image selected from among R images, D (D>2) images among the R images taken in the first embodiment are simultaneously used as basic images and the other remaining R-D images are used as reference images. This embodiment differs from the first embodiment in that the basic back-projection line information storage part 34 has the basic back-projection line information memories $34_1$ to $34_D$ of the same number as that D of the basic images. The operation of the 3D information extracting apparatus of this embodiment will be described below.

The whole process is executed for each voxel slice as in the first embodiment. The processing for each voxel slice $S_t$ similarly consists of the process of calculating those voxel positions through which all the back-projection lines pass, the process of voting for all the reference back-projection lines and the process of comparing/updating the information of maximum point about all the basic back-projection lines from the basic images (D images in this case). These processes are sequentially performed for each voxel slice $S_t$ ($Z_t$=t, where t=0,1,...,$N_z$-1). These processes can be done for the voxel slice St without any particular need of altering the constructions of the back-projection line passing position calculating part 31, the voting section 32A, the voting information storage part 32M, the compare/update processing part 33 and the control part 35; that is, their constructions may be the same as those used in the FIG. 7 embodiment.

As depicted in FIG. 10, the basic back-projection line information storage part 34 has the memories $34_1$ to $34_D$ corresponding to the D basic images. The memories $34_1$ to $34_D$ each have a field 4A for storing the maximum point voxel coordinates $(X_M, Y_M, Z_M)$ for all the basic back-projection lines, a field 4B for storing the maximum voting scores $V_M$ and a field 4C for storing the passing voxel positions $(X_r, Y_r)$ in the current voxel slice $S_t$ as in the FIG. 7 embodiment.

In the compare/update processing part 33, the same process as in the FIG. 7 embodiment is done for all basic back-projection lines from each of the D basic images. That is, the voting scores V, which are read out of the voting information storage part 32M on the basis of the corresponding basic back-projection line passing voxel coordinates $(X_r, Y_r)$ stored in the basic back-projection line information memories $34_1$ to $34_D$, are each compared with the corresponding maximum voting score $V_M$, and if $V_M < V$, then the maximum voting score $V_M$ and the maximum point voxel coordinate $(X_M, Y_M, Z_M)$ are updated. This processing is carried out for all the basic images.

After execution of the above-described processing for all voxel slices $S_t$, the maximum point voxel coordinates $(X_M, Y_M, Z_M)$ ultimately remaining in the memories $34_1$ to $34_D$ represent the voxel positions on the basic back-projection lines of the D basic images where the numbers of back-projection lines from the reference images passing therethrough are the greatest as in the first embodiment shown in FIG. 7; hence, the voxel coordinates $(X_M, Y_M, Z_M)$ of the positions of such maximum points are read out and output as 3D coordinates of feature points. In this case, the extraction precision could be increased by performing threshold processing based on the prestored maximum values $V_M$ to decrease an erroneous detection under the influence of a measurement error or quantization error as referred to previously with respect to the first embodiment of FIG. 7. Moreover, in this second embodiment, since a plurality of images of different viewpoints are used as basic images, the 3D coordinates of feature points can be extracted as a combination of the maximum point voxel coordinates obtained in the respective images. This can be done, for example, by extracting, as the coordinates of different 3D feature points, all of those pieces of information of maximum points stored in the D memories $34_1$ to $34_D$ which are different in terms of coordinates. In the case of combining pieces of information of maximum points of the same coordinates into single information of maximum point, it is possible to extract, as 3D coordinates of feature points, only the voxel positions where the number of extracted maximum voting scores $V_M$ larger than a predetermined threshold value at the maximum point $(X_M, Y_M, Z_M)$ is in excess of a predetermined number. Various other methods can easily be implemented.

By storing pieces of information of maximum point and performing the compare/update processing for the basic back-projection lines from a plurality of inputted basic images as described above, the second embodiment permits reduction of the influence of occlusion by the shape of the 3D object, making the number of undetected feature points smaller than in the case of using only one basic image.

When only one basic image is used, there is a possibility that true positions of feature points cannot be detected under the direct influence of displacements of back-projection lines that are caused by a displacement of the lens center of the camera for the basic image or displacements of feature points on images due to quantization errors. In the case of using a plurality of basic images, however, the number of undetected true positions of feature points can be reduced through utilization of the information of maximum points for a plurality of basic images that are ultimately obtained.

Further, by properly selecting, as basic images, those input images which are taken by cameras disposed apart, the precision of extraction of the 3D coordinates could be enhanced even if the number of basic images is small.

As will be appreciated from the above, the 3D information extracting apparatuses of the first and second embodiments need not be equipped with storage areas corresponding to those voxels in the 3D voxel space VS as voting score storage means, but they are required only to have storage areas corresponding to all voxels in only one cross section of the 3D voxel space VS. Thus, both embodiments enable significant reduction of the amount of hardware used.

Moreover, the total amount of processing required can be appreciably reduced since the process of counting the number of back-projection lines and the back-projection line compare/update process can be performed in the sequence of processing steps for the voxel slices and since there is no need of performing the complicated process of obtaining the peak point value in the 3D voxel space VS after counting the number of back-projection lines as in the prior art example.

Besides, the 3D information extracting apparatus of the second embodiment permits reduction of the influence of occlusion by the shape of the 3D object and enhancement of the precision of the detected positions of feature points.

THIRD EMBODIMENT

Figure 11:
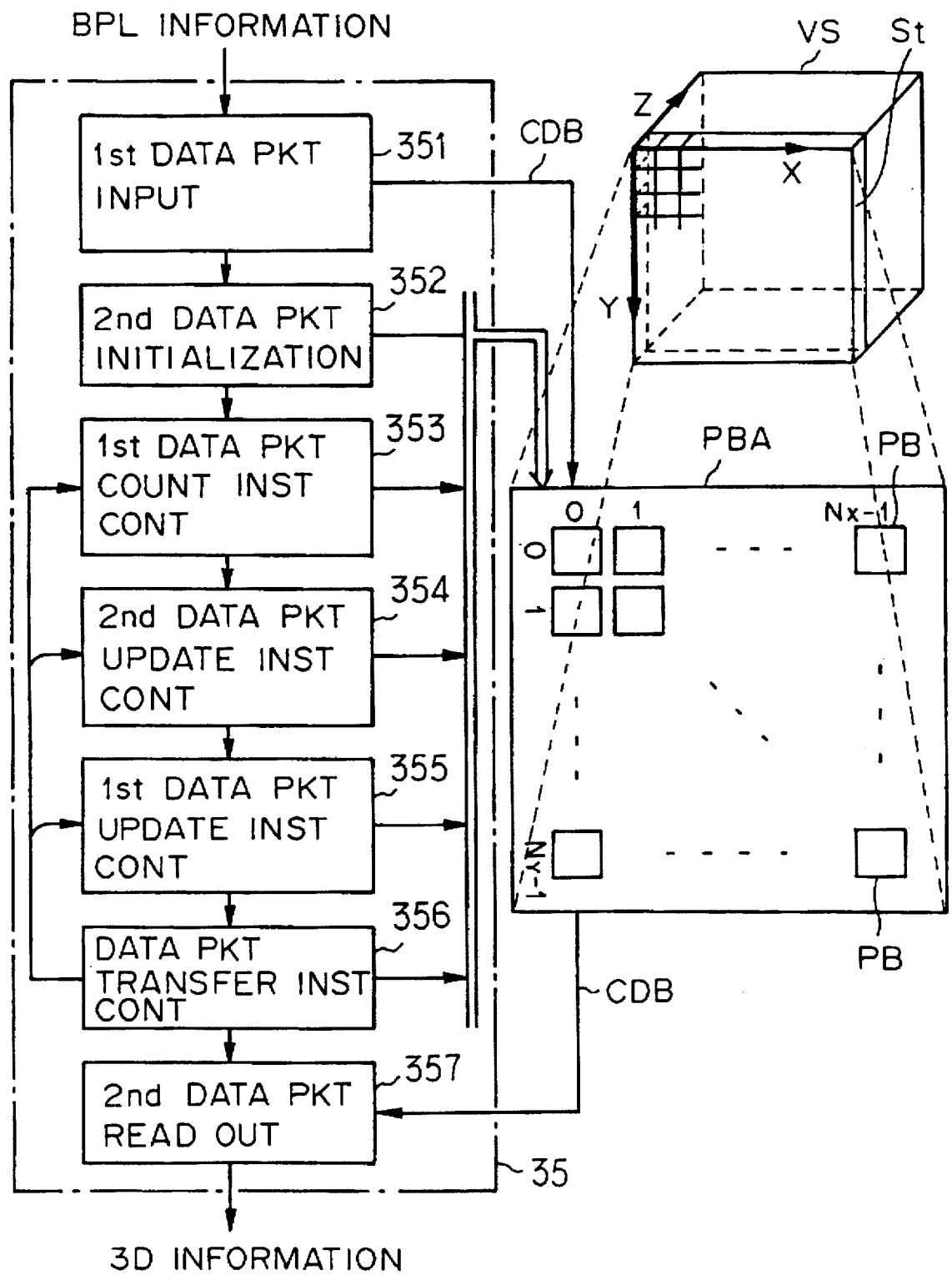
FIG. 11 is a block diagram showing a 3D information extracting apparatus according to a third embodiment of the present invention.

FIGS. 11, 12, 13A and 13B illustrate a third embodiment of the present invention. FIG. 11 is a block diagram of the 3D information extracting apparatus, FIG. 12 a block diagram of one processing block PB of a processing block array PBA with which the apparatus of this embodiment is provided, and FIGS. 13A and 13B diagrams showing examples of data packets.

In the first and second embodiments, the voting process for each voxel on each basic back-projection line is carried out for each voxel slice, and when the voting score V is larger than the past maximum score $V_M$ of the voxel on the basic back-projection line, the maximum voting score $V_M$ and its voxel position $(X_M, Y_M, Z_M)$, stored in the storage part 34, are updated with the current voting score V and its voxel position $(X_t, Y_t, Z_t)$; these processes are repeated for all voxels of the basic back-projection lines to thereby obtain, as the positions of 3D feature points, the voxel positions $(X_M, Y_M, Z_M)$ on the basic back-projection lines where the maximum voting scores $V_M$ are ultimately obtained. This basic idea is also common to the third embodiment. In this embodiment, however, a processing block array is provided corresponding to the voxel array in one voxel slice; in each processing block corresponding to one of the voxels in the voxel slice through which the basic back-projection line passes, the voting process and compare/update process for that voxel are carried out, and the results of the processing are transferred to the processing block corresponding to the voxel in the next voxel slice through which the basic back-projection line passes next. By repeated execution of such processing, the voxel position of the maximum voting score $V_M$ is ultimately detected. This will be described in detail hereunder.

The 3D information extracting apparatus of this embodiment shown in FIG. 11 comprises a controller 35 and a processing block array PBA. The controller 35 is made up of a first data packet input part 351, a second data packet initialization part 352, a first data packet count instruction control part 353, a second data packet update instruction control part 354, a first data packet update instruction control part 355, a data packet transfer instruction control part 356 and a second data packet readout part 357. The processing block array PBA has $N_X \times N_Y$ processing blocks corresponding to $N_X \times N_Y$ voxels in one voxel slice. The initialization part 352 and the readout part 357 are connected via a common data bus CDB to all processing blocks PB, whereas the instruction control parts 353 to 356 are connected via a common control bus CCB to each processing block PB.

Figure 12:
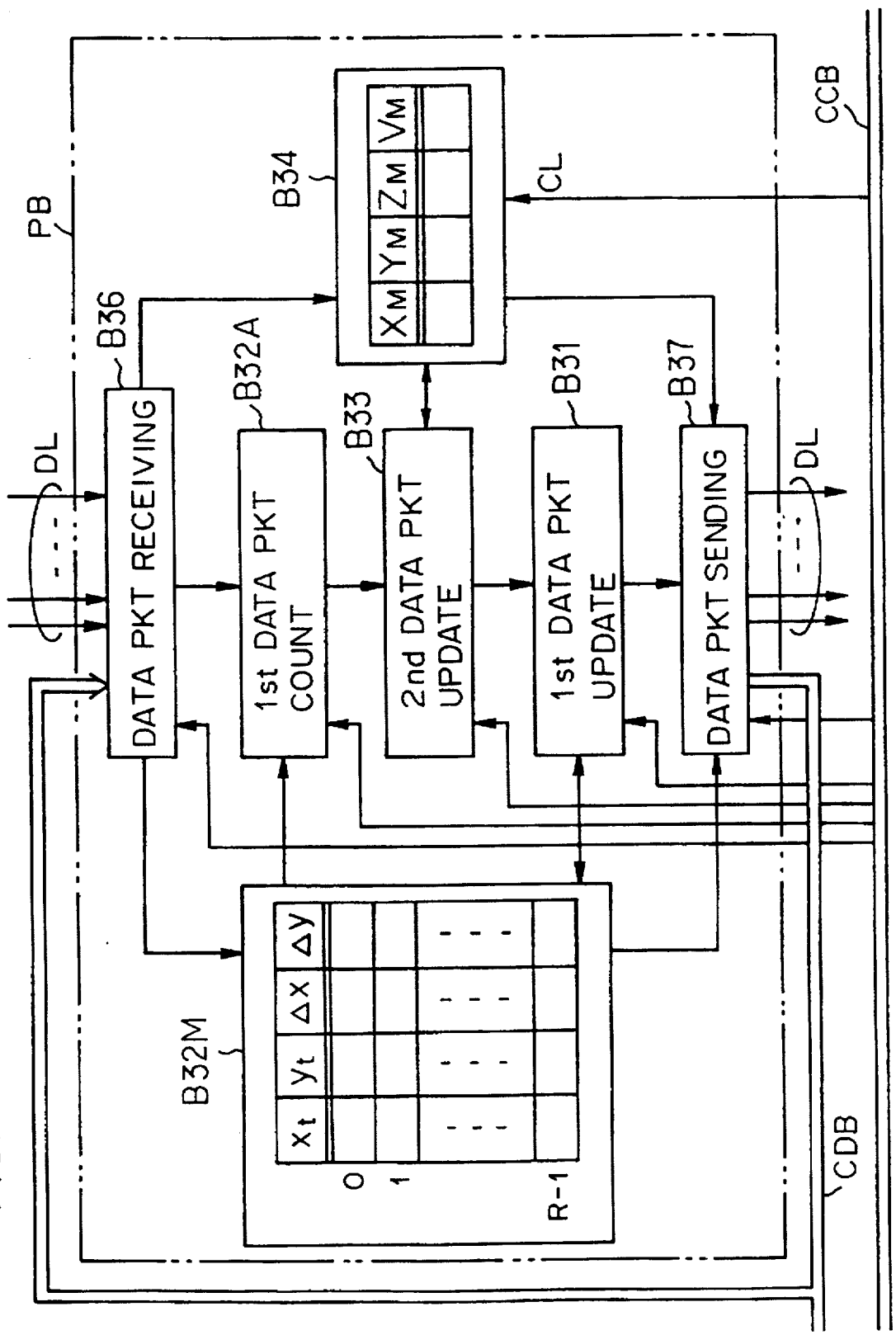
FIG. 12 is a diagram showing one of processing blocks in the apparatus of FIG. 11.

As depicted in FIG. 12, each processing block PB is composed of a data packet receiving part B36, a first data packet counting part B32A, a second data packet update part B33, a first data packet update part B31, a data packet pending part B37, a first data packet storage part B32M and a second data packet storage part B34. The entire processing by this apparatus is executed for the voxel slices $S_t$ of the 3D voxel space VS in sequence as shown in FIG. 11.

The processing blocks PB arranged in the form of a 2D array are interconnected via data transfer lines DL (FIG. 12). The processing blocks PB are connected, for example, as an 8 neighbor mesh network, so that the information about the basic back-projection line can be moved to any of the eight neighboring processing blocks PB, as described later with reference to FIG. 14.

Figure 13A:
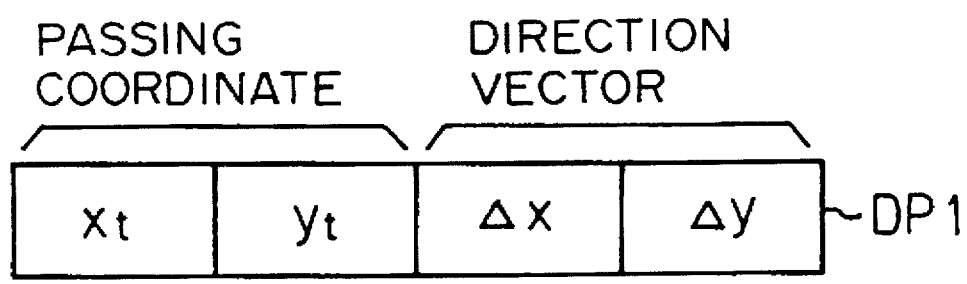
FIG. 13A is a diagram showing an example of a first data packet configuration.
Figure 13B:
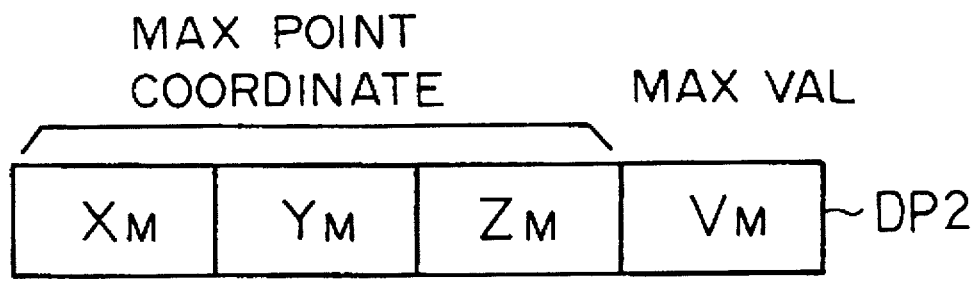
FIG. 13B is a diagram showing an example of a second data packet configuration.

There are provided two types of data packets dealing with information about the back-projection lines: first and second data packets DP1 and DP2 of such configurations as shown in FIGS. 13A and 13B. The first data packets DP1 are each composed of the world coordinate $(x_t, y_t)$ of the position where a certain basic back-projection line passes through a certain voxel slice $S_t$ (Z=t) and a direction vector $(\Delta x, \Delta y)$ that is the difference between the passing position coordinate $(x_t, y_t)$ and the world coordinate $(x_{t+1}, y_{t+1})$ of the position where the basic back-projection line passes through the next voxel slice. The second data packets DP2 are each associated with one of the first data packets DP1 corresponding to all basic back-projection lines of the basic image and composed of the maximum voting score (the maximum value) $V_M$ counted in the past on the basic back-projection line and the voxel coordinate (the maximum point coordinate) $(X_M, Y_M, Z_M)$ of that maximum point. Further, an arbitrary one or more of the R (where $R \geq 3$) inputted images are predetermined as basic images as in the first and second embodiments.

The first data packet storage part B32M has areas 0, 1, . . . R-1 corresponding to all the images used and stores first data packets DP1 $(x_t, y_t, \Delta x, \Delta y)$ about back-projection lines, transferred thereto from the processing block PB of its own or neighboring processing block PB, into the areas corresponding to the images from which those back-projection lines are projected, respectively. In this example, let it be assumed that a zeroth area is allocated to the first data packet concerning the back-projection line from the basic image and that first data packets concerning back-projection lines from other reference images are allocated to predetermined ones of first to (R-1)th areas. The maximum number of first packets that are sent to one processing block PB corresponding to one feature point, that is, the number of back-projection lines that pass through one voxel, changes with resolution of the 3D voxel space VS or resolution of the input image, but assuming that two or more back-projection lines from different feature points in the same image do not pass through the same voxel, the maximum number of first data packets DP1 that are sent to one processing block PB is ideally R equal to the number of images; hence, the number of areas of the first data packet storage part B32M needs only to be equal to that R of the images used.

The second data packet storage part B34 is to store second data packet concerning the basic back-projection line transferred to the processing block. As in the above, provided that two or more basic back-projection lines projected from different feature points in the same basic image do not pass through the same voxel, only one second data packet is sent to one processing block PB. Accordingly, only one area is needed to store the second data packet DP1.

Next, a description will be given of the operation of the apparatus shown in FIGS. 11 and 12.

Step S1:

In the first data packet input part 351, as the initialization of the processing block array PBA, information about back-projection lines input into the apparatus for all images, that is, information composed of the world coordinates $(x_0, y_0)$ of initial passing positions in a voxel slice $S_0$ through which all the back-projection lines pass first and the direction vectors $(\Delta x, \Delta y)$, is transferred as first data packets DP1 via the common data bus CDB to the processing blocks PB of the voxel coordinates $(X_0, Y_0)$ corresponding to the passing world coordinates $(x_0, y_0)$. Since straight lines projected back from a plurality of different feature points on the same image do not pass through the same voxel, a plurality of back-projection lines passing through the same voxel are those projected from different images. Each processing block PB having received one or more first data packets writes the received first packets $(x_0, y_0, \Delta x, \Delta y)$ in the storage areas respectively corresponding to the images from which the back-projection lines concerning the first data packets DP1 originate.

Step 2:

Next, the second data packet initialization part 352 sends an initialization instruction (clear signal) CL of the second data packet storage part B34 to each processing block PB, which responds to the initialization instruction CL to initialize the maximum point information $(X_M, Y_M, Z_M)$ of the second data packet storage part B34 to all zeros, for instance. In the alternative, the second data packets DP2 may also be transferred from the second data packet initialization part 352 to the processing blocks PB corresponding to the voxels through which the basic back-projection lines pass. By the above initialization, one second data packet DP2 and at least one first data packet DP1 are transferred to the processing block PB corresponding to the voxel through which each basic back-projection line passes, and at least one first data packet DP1 is transferred to the processing block PB corresponding to each voxel through which only the reference back-projection lines pass. The processing blocks PB each store all the first data packets DP1 received in the data packet receiving part B36 into the first data packet storage part B32M and the received second data packets DP2 into the second data packet storage part B34.

Step S3:

After the initialization of the processing block array PBA, the first data packet counting instruction control part 353 provides to each processing block PB an instruction to count the first data packet DP1. Each processing block PB responds to the counting instruction to count the number of first data packets DP1 in the first data packet storage part B32M, thereby counting the number of back-projection lines (the voting score V) passing through the position of that processing block PB. That is, in the processing block PB shown in FIG. 12, the first data packet counting part B32A counts the number of all the first data packets DP1 written by the data packet receiving part B36 into the first data storage part B32M.

Step S4:

Next, the second data packet update instruction control part 354 provides to each processing block PB an instruction of compare/update processing of the second data packet DP2. In response to the compare/update instruction, the second data packet update part B33 of the processing block PB, which has the first data packet $(x_r, y_r, \Delta x, \Delta y)$ concerning the basic back-projection line in the zeroth area of the first data packet storage part B32M, compares the first data packet number V counted by the first data packet counting part B32A and the maximum voting score $V_M$ held in the second data packet storage part B34. If the former is larger than the latter, then the second data packet update part B33 updates the maximum voting score $V_M$ in the second data packet storage part B34 with the count value V and the maximum point coordinate $(X_M, Y_M, Z_M)$ with the passing coordinate $(x_r, y_r)$ of the basic back-projection line held in the zeroth area of the first data packet storage part B32M and $X_M = [x_r]$, $Y_M = [y_r]$ and $Z_M = t$ calculated from the coordinates (Z=t) of the voxel slice.

Step 5:

The first data packet update instruction control part 355 provides a first data packet update instruction to each processing block PB. The first data packet update part B31 of the processing block PB, which has first data packets concerning back-projection lines in the first data packet storage part B32M, responds to the update instruction. For the first data packet of each back-projection line, the first data packet update part B31 uses the passing position world coordinate $(x_r, y_r)$ and the direction vector $(\Delta x, \Delta y)$ of that data packet to calculate the passing position world coordinate $(x_{t+1}, y_{t+1})$ in the next voxel slice $S_{t+1}$ (Z=t+1) by the following equation (3) and updates the passing position world coordinate $(x_r, y_r)$ in each storage area of the first data packet storage part B32M.

$$x_{t+1} = x_t + \Delta x, \quad y_{t+1} = y_t + \Delta y \qquad (3)$$

This calculation could easily be implemented, for example, by providing an adder in the first data packet update part B31.

Step 6:

The data packet transfer instruction control part 356 provides to all the processing blocks PB a data packet transfer timing signal by the same number of times as the number R of images used.

In synchronization with the data packet transfer timing signal applied thereto R times, the data packet output part B37 of each processing block PB sequentially reads out R areas 0 to R-1 in the first data packet storage part B32M and, if the first data packet DP1 is found, sends it out to the processing block PB of the voxel coordinate $(X_{t+1}, Y_{t+1}) = ([x_{t+1}], [y_{t+1}])$ corresponding to the passing position world coordinate $(x_{t+1}, y_{t+1})$ in the next voxel slice $S_{t+1}$ calculated by Eq. (3) in the first data packet update part B31. In this instance, the first data packet in the zeroth storage area is sent out together with the second data packet DP2 in the storage part B34. The destination of the data packet is, for example, any one of eight neighboring processing blocks PB and the processing block PB that sends out the data packet. When the destination is the processing block PB that sends out the data packet, no data packet transfer is needed.

Upon completion of the processing for the first voxel slice $S_t$ (t=0), the apparatus returns to step S3 and similarly starts the processing for the second voxel slice St+1. That is, the first data packet count instruction control part 353 instructs all the processing blocks PB to count the number of first data packets. Each processing block PB responds to the instruction to count the number of the first data packets DP1 transferred thereto from the neighboring processing blocks; in step S3 the processing block PB responds to the second data packet compare/update instruction to compare the maximum voting score $V_M$ in the storage part B34 and the voting score V and, if the latter is larger than the former, it updates the maximum point information $(X_M, Y_M, Z_M, V_M)$; in step S5 the processing block PB responds to the update instruction to update the stored contents $(x_r, y_t)$ of all the areas in the storage part B32M on the basis of the corresponding direction vector $(\Delta x, \Delta y)$ by Eq. (3); and in step S6 the processing block PB transfers the updated data packet to the processing block corresponding to the back-projection line passing voxel in the next voxel slice. Similarly, each processing block executes steps S3 to S6 one after another for each of the remaining voxel slices.

In this way, the processing block PB allocated to the voxel position on a certain voxel slice executes the process of receiving the data packets DP1 and DP2, the process of storing the data packets DP1 and DP2, the process of counting the first data packets DP1, the process of comparing/updating the second data packet DP2, the process of updating the first data packets and the process of transferring the data packets. Each of these processes is simultaneously carried out in all the processing blocks PB. Further, these processes which are performed on the voxel slice are executed for all voxel slices $(Z=0,1,\ldots, N_z-1)$ in a sequential order.

Upon completion of the processes in all the voxel slices, the second data packets DP2 are all output via the second data packet readout parts 357. The second data packet information at this time represents the voxel positions on the back-projection lines from the basic image where the numbers of back-projection lines passing therethrough are maximum. Since these voxel positions can be said to be the positions where feature points are most likely to exist in the 3D space, the maximum point coordinates $(X_M, Y_M, Z_M)$ of the second data packets DP2 are output as the 3D coordinates of the feature points. In this case, to reduce erroneous detections under the influence of measurement errors or quantization errors, the extraction precision could be increased by performing threshold processing based on the maximum values $V_M$ of the maximum point information.

As described above, according to the 3D information extracting apparatus of this embodiment, the processing to be performed at respective voxel positions on the voxel slice can be executed simultaneously through the use of the 2D processing block array PBA corresponding to the voxel slice—this permits substantial speeding up of the 3D information extraction. Moreover, by assigning all back-projection lines to data packets and by performing the voting for the 3D voxel space VS and the maximum value compare/update process while allowing the data packets to autonomously move on the 2D processing block array PBA, the processing time does not ever depend on the number of back-projection lines or the number of feature points in the input images; hence, the 3D information extraction processing for an object with any number of feature points less than number of processing blocks PB can be done without changing the processing time. In addition, as compared with the use of a single basic image, the use of plural basic images brings the advantage of lessening the influence of occlusion by the shape of the 3D object, and hence preventing true feature points from being left undetected.

Next, a description will be given of an example of the interconnection of the processing blocks in the above-described processing block array PBA.

FIG. 14 illustrates an example of an 8 neighbor block mesh network in connection with one processing block PB and the eight adjacent ones. For the sake of simplicity, those parts other than the data packet receiving part B36 and the data packet sending part B37 are not shown in each processing block PB. The common control bus CCB for control signals and the common data bus CDB between the controller 35 and each processing block PB are not shown either. In a predetermined order of the R images $I_0, I_1, \ldots, I_{R-1}$ used, each processing block PB performs the transfer process simultaneously with all the other processing blocks PB that have the data packets of back-projection lines concerning the same image. Consequently, R transfer cycles are sequentially executed in the processing of each voxel slice $S_r$.

Each processing block PB has its data packet receiving part B36 connected via eight data transfer lines $DL_R$ to the data packet sending parts B37 of the eight neighboring processing blocks PB, respectively, and has its data packet sending part B37 connected via eight data transfer lines $DL_T$ to the data packet receiving parts B36 of the eight neighboring processing packets PB. With this network, the destination processing block PB of the first data packet (added with the second packet when the first data packet is a packet concerning the basic back-projection line) to be transferred is determined by $X_{r+1}=[X_{r+1}], Y_{r+1}=[y_{r+1}]$ on the basis of the updated data $x_{r+1}$ and $y_{r+1}$ of the first data packet to be transferred, so that the data packet needs only to be output onto that one of the eight data transfer lines $DL_T$ that corresponds to the destination processing block PB. This 8 neighbor block mesh network has the advantages of simple data packet transfer control and short processing time required but has the disadvantage of complicated interconnection of the processing blocks PB.

Figure 15:
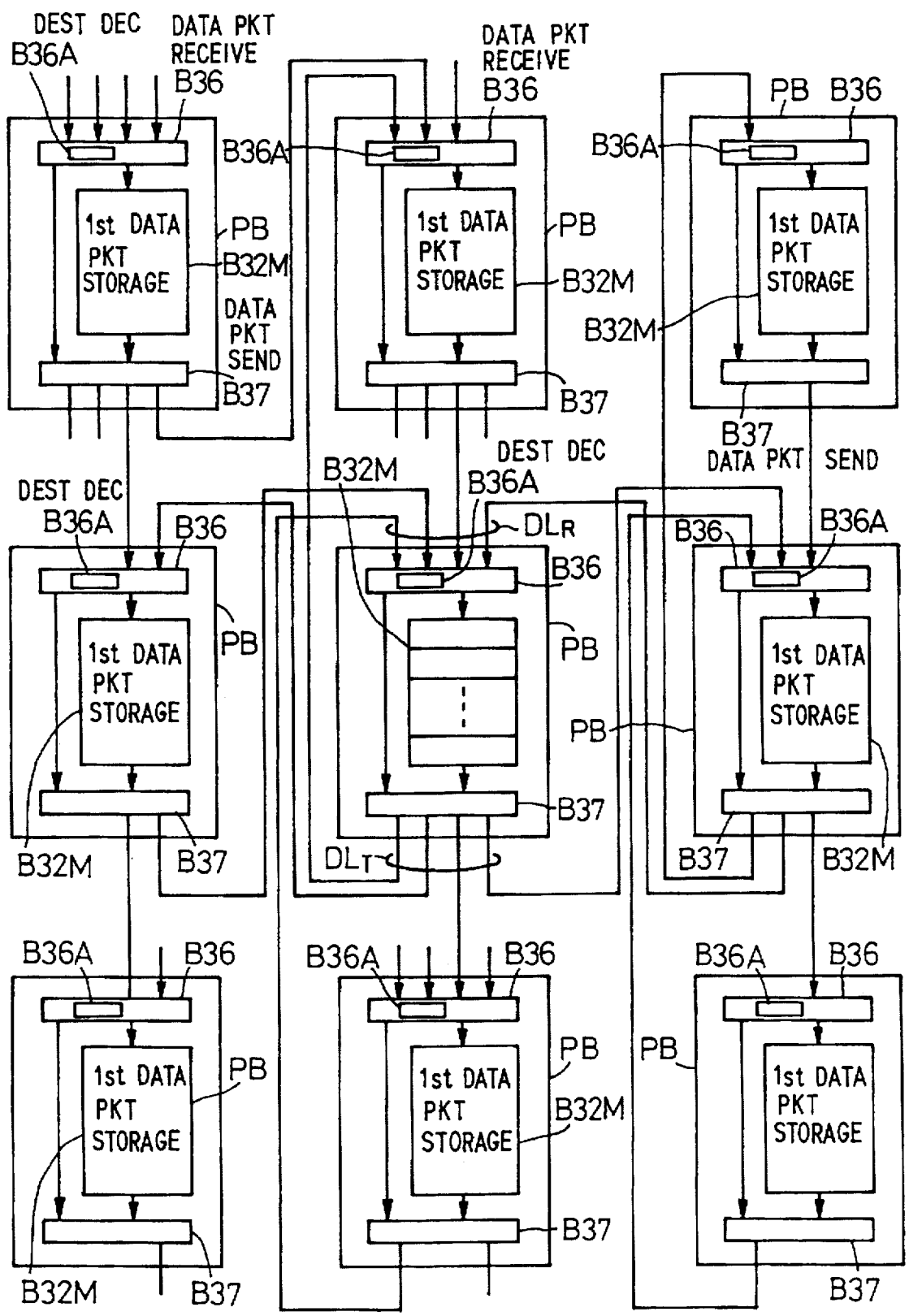
FIG. 15 is a diagram illustrating part of an array of 4 neighbor mesh-networked processing blocks.

FIG. 15 illustrates an example of a 4 neighbor block mesh network. Also in this case, the data packet transfer in the processing for each voxel slice $S_t$ takes place simultaneously in all the processing blocks PB in the order of corresponding images. In this example, the data packet receiving part B36 of each processing block PB is connected via four data transfer line $DL_R$ to the data packet sending parts B37 of four processing blocks PB adjacent thereto in horizontal and vertical directions, respectively, and the data packet sending part B37 of each processing block PB is connected via four data transfer lines $DL_T$ to the data packet receiving parts B36 of four processing blocks PB adjacent thereto in the horizontal and vertical directions, respectively.

Each data packet receiving part B36 has a destination decision part B36A, which decides whether the data $(x_r, y_t)$ in the received first data packet is destined for the processing block of its own or another processing block. When the received data is destined for the processing block of its own, the data packet receiving part B36 writes the received data packet DP1 (and DP2) in an area of the storage part B32M corresponding to the current transfer cycle (that is, an area corresponding to an image). When the data $(x_r, y_t)$ is destined for another processing block, the data packet receiving part B36 sends the data packet to the data packet sending part B37, from which it is provided on one of four data transfer lines $DL_T$ corresponding to the destination processing block PB. Accordingly, only one transfer cycle is enough for the data packet transfer from each processing block to any of four blocks directly connected thereto in the vertical and horizontal directions, but two transfer cycles in the horizontal and vertical directions are needed for the data transfer from each processing block to any of the four adjacent processing blocks diagonal but not directly connected thereto. Thus, in the example of FIG. 15 two cycles are assigned to the transfer of the data packet corresponding to any image.

Figure 16A:
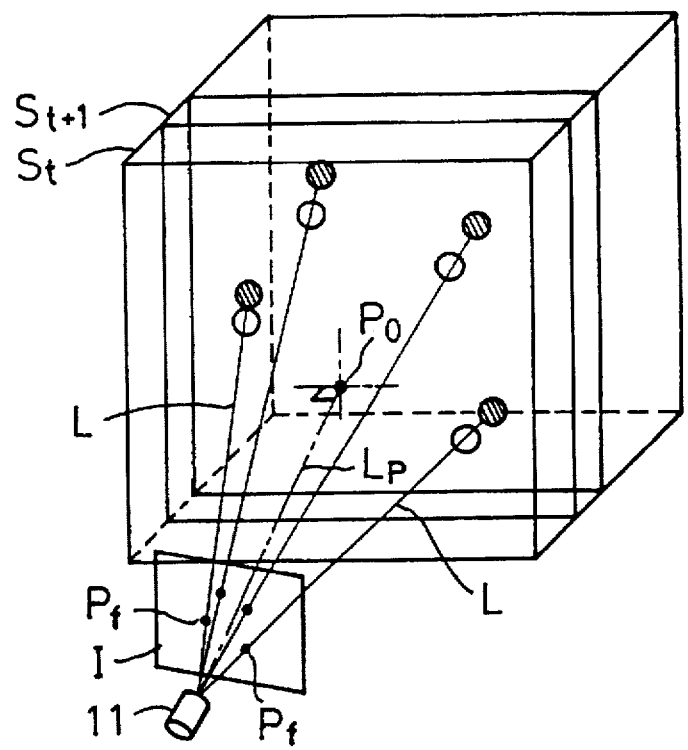
FIG. 16 is a diagram schematically showing the voxel positions through which basic back-projection lines pass in the 3D voxel space.
FIG. 16B is a diagram schematically showing the movement of passing voxels in accordance with the movement of a voxel sliced position.
FIG. 16C is a diagram schematically showing the movement of a data packet on the processing block array in accordance with the movement of the passing voxel positions.
Figure 16B:
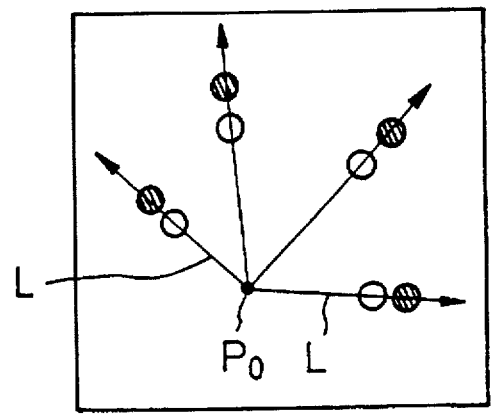
Figure 16C:
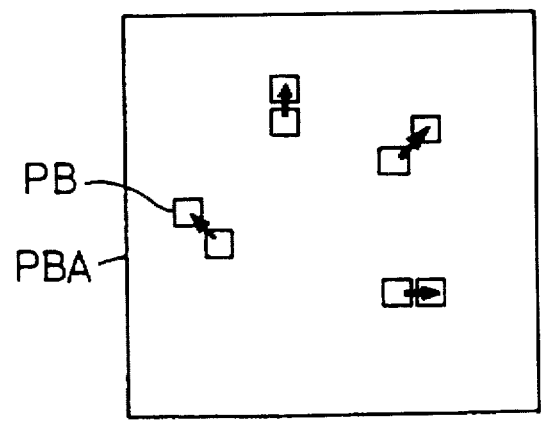

Incidentally, all back-projection lines L which come from the same viewpoint 11 but pass through different feature points $P_f$ in the same image I are projected radially so that they spread out or diverge into the 3D voxel space with distance from the viewpoint 11 as depicted in FIG. 16A. Therefore, if the intersection of the perpendicular $L_p$ to the voxel slice $S_r$ from the common viewpoint 11 be represented by $P_0$, the voxel positions (indicated by black circles) through which the back-projection lines L pass in the next voxel slice $S_{r+1}$ spread out in directions in which they diverge about the intersection $P_0$ from the voxel positions (indicated by white circles) through which the back-projection lines L pass in the voxel slice $S_r$ as shown in FIG. 16B. Thus, the data packets of the same image which are to be transferred on the processing block array PBA are also transferred only in the direction in which they diverge from one another as depicted in FIG. 16C. On this account, the data packets in each processing block PB are sequentially transferred to the blocks adjacent thereto, for example, in a predetermined order of images, and even if all the processing blocks PB simultaneously transfer the data packets concerning the same image, no data packet collision will occur. In this instance, the sequential order of images need not always be fixed, that is, it is necessary that only the data packets of back-projection lines from the same image be transferred between the processing blocks PB in the same one of the transfer cycles. As described above, even if the data packets of back-projection lines from one image are all transferred in the same cycle time, they will not collide; hence it is possible to implement collision-free, extremely efficient transfer of data packets between processing blocks PB.

FOURTH EMBODIMENT

Figure 17:
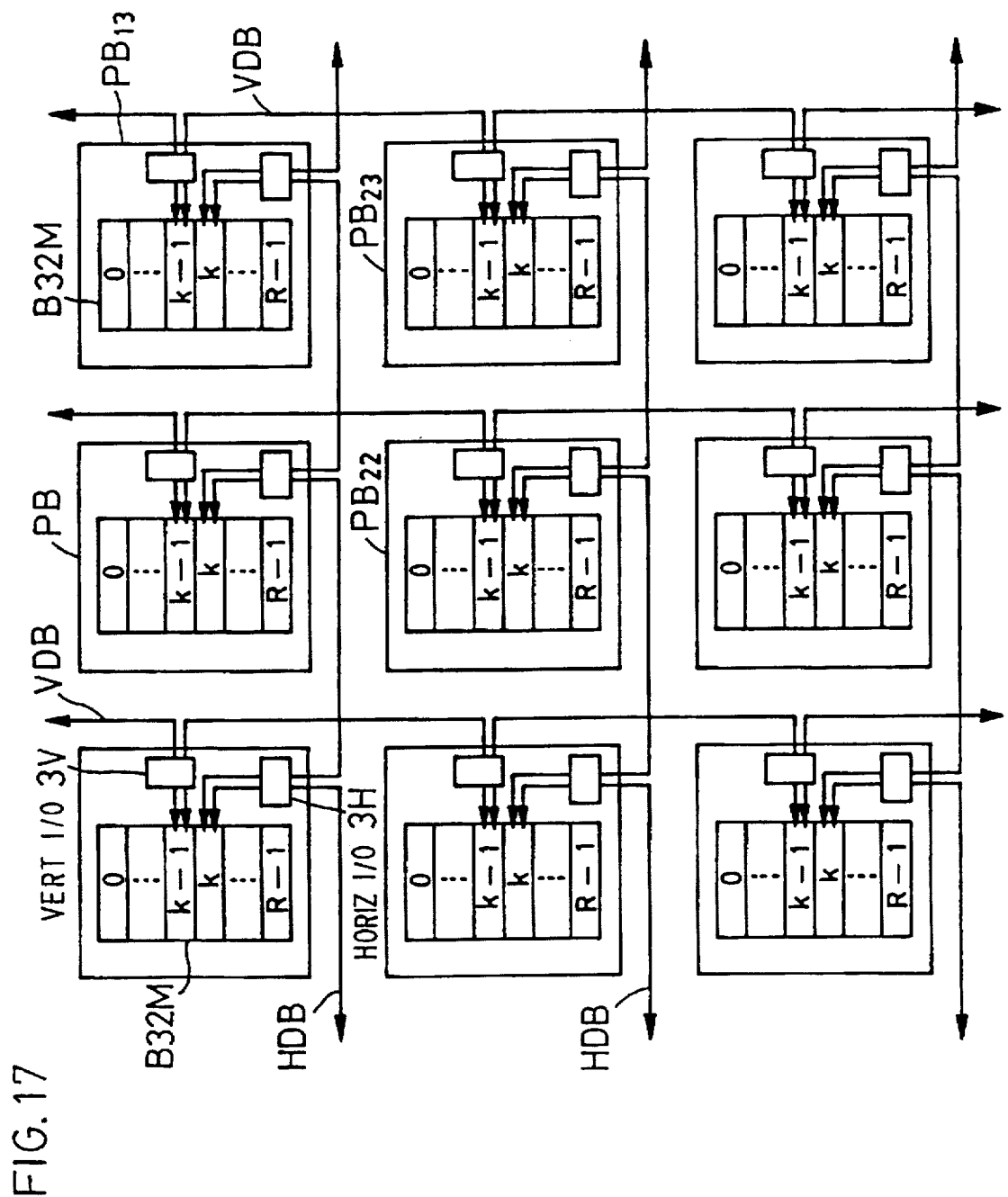
FIG. 17 is a diagram illustrating a networked structure of processing blocks according to a fourth embodiment of the present invention.

FIG. 17 illustrates an embodiment of the 4 neighbor mesh-networked processing block array PBA of the type that performs the above-described data packet transfer by the pipeline system. For the sake of brevity, each processing block PB is shown to have the storage areas 0 to R-1, corresponding to respective images, of the first data packet storage part B32M shown in FIG. 12, and the storage area 0 is assumed to include the second data packet storage part B34 for convenience. In this embodiment, a horizontal input/output part 3H and a vertical input/output part 3V are provided in each processing block PB in place of the data packet receiving part B36 and the data packet sending part B37 in FIG. 12, and they are connected in series to a horizontal data bus HDB and a vertical data bus VDB, respectively. In this embodiment, the horizontal data bus HDB and the horizontal input/output part 3H form a horizontal transfer means for transferring the data packet in the horizontal direction, and the vertical data bus VDB and the vertical input/output part 3V form a vertical transfer means for transferring the data packet in the vertical direction. The horizontal data bus HDB sequentially interconnects the horizontal input/output parts 3H of all processing blocks PB adjoining in the horizontal direction, and the vertical data bus VDB sequentially interconnects the vertical input/output parts 3V of all processing blocks PB adjoining in the vertical direction.

When updated data $(x_{r+1}, y_{r+1})$ in the first data packet DP1 in the storage area B32M of the processing block PB is destined for another processing block PB, the horizontal input/output part 3H outputs the first data packet DP1 to the horizontal data bus HDB that transfers it to the right or left, depending on whether the destination block is on the right or left of the column containing the originating processing block PB. Further, the horizontal input/output part 3H writes in the storage part B32M the first data packet DP1 received from the adjacent processing block PB on the right or left. Similarly, when the updated data $(x_{r+1}, y_{r+1})$ in the first data packet DP1 stored in the storage part B32M of the processing block PB is destined for another processing block PB, the vertical input/output part 3V similarly outputs the data packet DP1 to the vertical data bus VDB that transfers it downward or upward, depending on whether the destination processing block is above or below the row containing the originating processing block PB. The vertical input/output part 3V also writes into the storage part B32M the first data packet received from upper or lower adjacent processing block PB.

In the above, the horizontal transfer and the vertical transfer can similarly be made even if reversed in order. Also in the FIG. 17 embodiment, the data packet transfers, which are performed after the compare/update processing for each voxel slice $S_r$, are performed sequentially for R images in a predetermined order such that the transfers of the data packets concerning the same image are simultaneously carried out in all the processing blocks PB having the first data packets of that same image. In this embodiment, especially it is arranged such that during the same transfer cycle in which the horizontal input/output parts 3H of all the processing blocks PB transfer first data packets DP1 concerning the back-projection lines from a certain image $(I_k)$ in the horizontal direction from areas k of the storage parts B32M, the vertical input/output parts 3V of all the processing blocks PB also transfer in the vertical direction first data packets DP1 from the previous data packet areas (k-1, for instance) into which the horizonal input/output parts 3H wrote the received first data packets in the previous transfer cycle. Similarly, in the next transfer cycle in which the horizontal input/output part 3H of every processing block PB transfers the first data packet in the next area (k+1, for instance) of the storage part B32M in the horizontal direction, the vertical input/output part 3V transfers the first data packet in the area k in the vertical direction. Each of the horizontal and vertical input/output parts 3H and 3V transfers the first data packet only when its updated data $(x_{r+1}, y_{r+1})$ in the area to be transferred is destined for a processing block other than that to which they belong. Further, the horizontal and vertical input/output parts 3H and 3V each writes the received first data packet DP1 into the area that is currently subjected to processing.

Suppose, for instance, that the transfer destination represented by the updated data $(x_{r+1}, y_{r+1})$ of the updated first data packet DP1 stored in the area k of the storage part B32M of a processing block PB22 at the center of FIG. 17 is the position (1,3) of the upper right processing block PB13. In the case where the horizontal and vertical input/output parts 3H and 3V of all processing blocks PB are in the state of selecting the areas k and k-1 of their storage parts B32M, respectively, and the first data packets exist in those areas and are destined for other processing blocks, the horizontal and vertical input/output parts 3H and 3V output the first data packets in the areas k and k+1 to the horizontal and vertical data buses HDB and VDB in the same transfer cycle. As a result, the first data packet PD1 in the area k of the storage part B32M of the processing block PB22 is transferred via the horizontal data bus HDB to the horizontal input/output part 3H of the processing block PB23 on the right and is written into the area k of its storage part B32M. In the next cycle of operation, the horizontal and vertical input/output parts 3H and 3V of each processing block PB select the areas k+1 and k of its storage part B32M, respectively, and if the first data packets stored therein are destined for other processing blocks PB than itself, the first data packet DP1 is output to the horizontal and vertical data buses HDB and VDB. As the result of this, since its destination is (1,30), the first data packet DP1 in the area k of the storage part B32M of the processing block PB23 is transferred via the vertical input/output part 3V and the vertical data bus VDB to the vertical input/output part 3V of the processing block $PB_{13}$ and written into the area k of its storage part B32M.

As described above, in the FIG. 17 embodiment, the data packet transfer from each processing block to the adjacent one is assigned two cycles of horizontal and vertical transfer operations. If the first data packet DP1 to be transferred from each processing block PB is destined for any one of the adjacent processing blocks PB, the transfer takes place in one of the two cycles. If the first data packet DP1 to be transferred from each processing block PB is destined for the processing block diagonal thereto, the transfer is carried out in two cycles. In either case, the horizontal transfer cycle and the vertical transfer cycle are simultaneously executed in this embodiment; hence, the time required for the transfer of the data packets in all the areas 0 to R-1 of the storage part B32M is (R+1) cycles.

Figure 18:
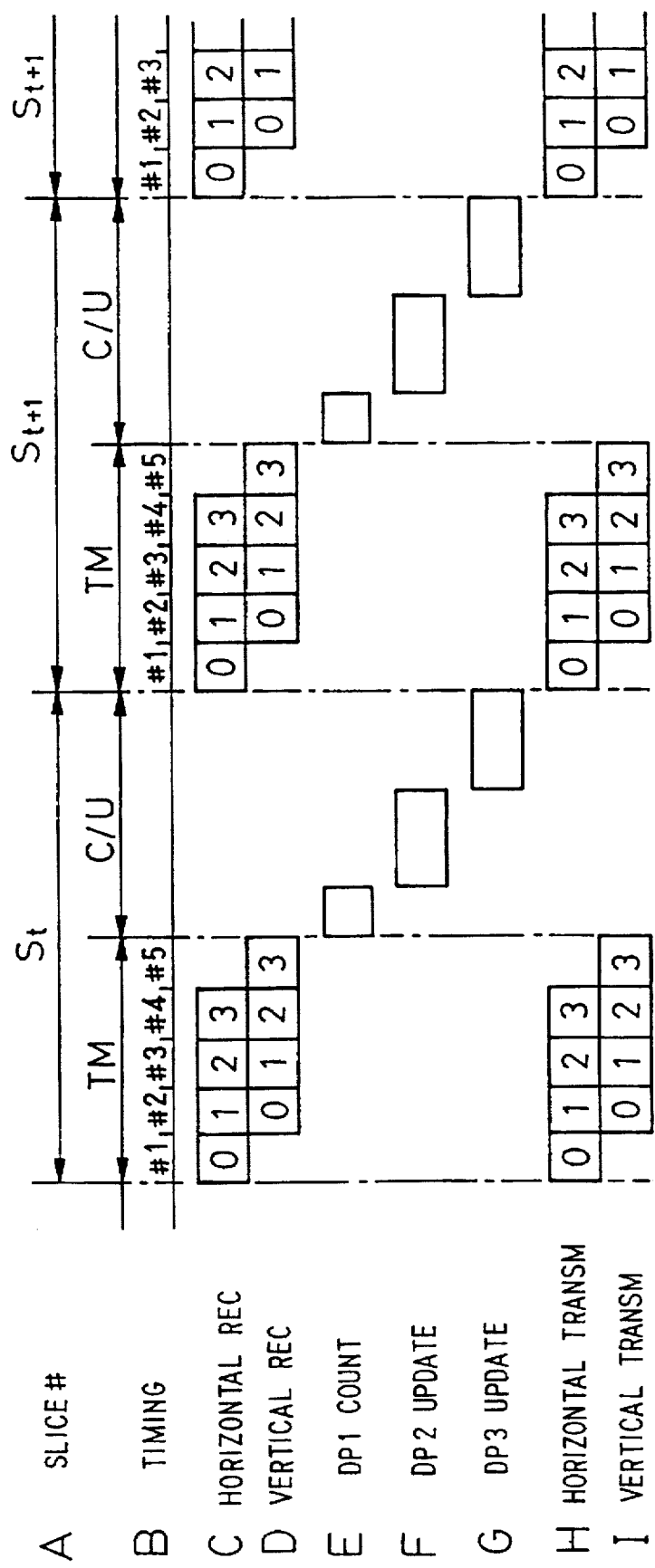
FIG. 18 is a timing chart for explaining a pipeline operation of the apparatus of FIG. 17.

In FIG. 18 there is shown a timing chart for executing, by pipeline processing, the 3D feature point extracting operation of the 3D information extracting apparatus employing the parallel processing of the horizontal transfer and the vertical transfer and the structures of FIGS. 11, 12 and 17. In this instance, four images are assumed to be used. Row A shows periods in which the processing for the voxel slices $S_t$, $S_{t+1}$, ... takes place, respectively. Row B shows operation modes and the timing for processing. Rows C and D show the processing for data packet reception from the horizontal and vertical directions, respectively, and Rows H and I the processing for outputting data packets to the horizontal and vertical directions, respectively. The four consecutive numerals 0, 1, 2, 3 in the boxes represent the area numbers k in the storage part B32M which contain the information to be processed; hence, the area numbers k respectively correspond to the four images to which the back-projection line information written in these areas belong. Row E shows the timing for the counting of the first data packets DP1, Row F the second data packet compare/ update timing and Row G the first data packet compare/ update timing.

In a first cycle #1 in each voxel slice processing period, the horizontal input/output part 3H of each processing block PB selects the zeroth area of its storage part B32M and, if the destination of the read-out first data packet DP1 is another processing block PB, outputs the first data packet to the rightward or leftward horizontal data bus HDB in accordance with the destination (Row H). The first data packets DP1 thus output from the respective processing blocks PB are simultaneously received in the horizontal input/output parts 3H on the right or left (Row C) and are each written into the same area 0 of the respective storage part B32M. In the next cycle #2 the horizontal and vertical input/output parts 3H and 3V of each processing block PB selects the areas 1 and 0 of the storage part B32M, respectively, and read out therefrom the first data packets DP1. If these first data packets DP1 are destined to other processing blocks PB, the horizontal and vertical input/ output parts 3H and 3V simultaneously send them via the horizontal and vertical data buses HDB and VDB to the horizontal and vertical input/output parts 3H and 3V of the right or left and upper and lower adjacent processing blocks PB (Rows H and I). The horizontal and vertical input/output parts 3H and 3V of the adjacent processing blocks PB having received the two first data packets DP1 write them in the areas 1 and 0 of their storage parts B32M, respectively (Rows C and D).

In the next cycle #3 the horizontal and vertical input/ output parts 3H and 3V of each processing block PB select the areas 2 and 1 of the storage part B32M, respectively, and transmits the first data packets DP1 stored therein (Rows H and I) and, at the same time, write the first data packets DP1 received from the adjacent processing block PB into the corresponding areas 2 and 1 of the storage part B32M (Rows C and D). Likewise, in the next cycle #4 the horizontal and vertical input/output parts 3H and 3V transfer the first data packets DP1 in the areas 3 and 2 of the storage part B32M to the adjoining processing blocks PB in the horizontal and vertical directions, respectively (Rows H and I), and write the first data packets DP1 received from the horizontal and vertical adjacent processing blocks PB into the areas 3 and 2 of the storage part B32M (Rows A and D). In the next cycle #5 the vertical input/output part 3V transfers the first data packet DP1 in the area 3 of the storage part B32M to the vertical adjacent processing block (Row D) and writes the first data packet DP1 received from the vertical adjacent processing block PB into the area 3 (Row I). Thus, the packet transfer mode TM finishes, followed by a count/ update mode C/U.

The count/update mode C/U begins with counting the number of first data packets DP1 in the storage part B32M by the first data packet counting part B32A (FIG. 12) of each processing block PB. Next, the count value V is compared with the maximum voting score $V_M$ held in the second data packet storage part B34 (described previously with respect to FIG. 17 to be added to the area 0 of the storage part B32M), and if the former is larger than the latter, the second data packet $(X_M, Y_M, Z_M, V_M)$ DP2 stored in the second data packet storage part B34 is updated (Row F), after which all the first data packets DP1 in the areas 0 to R-1 of the first data packet storage part B32M are updated by Eq. (3) (Row G). Thus, the processing for the voxel slice $S_t$ is completed, after which the transfer mode TM and the count/update mode C/U are repeated for each of the voxel slices $S_{t+1}$, $S_{t+2}$, ... in the same manner as described above.

As described above, according to the FIG. 17 embodiment, the horizontal and the vertical transfer can be done by pipeline processing, and even if the processing block array PBA is formed as a 4 neighbor mesh network, the entire data packet transfer between the processing blocks PB can be achieved in the same processing time as in the case where the processing block array PBA is formed as a direct 8 neighbor mesh network. Hence, it is possible to implement efficient data packet transfer between the processing blocks PB with a far smaller amount of wiring needed than in the case of the 8 neighbor mesh network.

As will be appreciated from the above, according to the 3D information extracting apparatus of the FIG. 17 embodiment, since the voting process and the maximum point information compare/update process, which are executed at one coordinate point in a certain voxel slice of the 3D space, can be assigned to one processing block PB on the processing block array PBA, these processes can be executed simultaneously at all coordinate points in a certain voxel slice; hence, the processing time can be significantly reduced. Further, since the voting process and the maximum point information compare/update process can be performed at one time for each voxel slice, there is no need of performing a complicated process wherein the voting for the 3D space is followed by the calculation of the peak point value again in the 3D space as in the prior art—this reduces the amount of processing required and hence permits substantial reduction of the processing time. Besides, since all back-projection lines passing through a certain voxel slice can be processed at the same time, the processing time is not dependent on the number of back-projection lines or the number of feature points in the inputted image, making it possible to deal with a given number of feature points without changing the processing time.

Even if the entire back-projection line information on one image is transferred at the same time, no collision of the information arises during the transfer between the processing blocks PB, so that collision-free, efficient information transfer can be implemented between the processing blocks by simultaneous transfer of the back-projection line information about the same image throughout the processing block array.

In addition, according to the 3D information extracting apparatus of FIG. 17, the pipeline processing is introduced into the horizontal and the vertical transfer of the back-projection line information to, for example, eight neighboring processing blocks; even if the processing block array PBA is formed as a 4 neighbor mesh network requiring less wiring between the processing blocks PB, the processing time for the information transfer between the processing blocks PB is substantially equal to the processing time needed in the case of the 8 neighbor mesh network. Accordingly, efficient information transfer between the processing blocks PB can be implemented by the 4 neighbor mesh-networked processing block array PBA.

FIFTH EMBODIMENT

Figure 19:
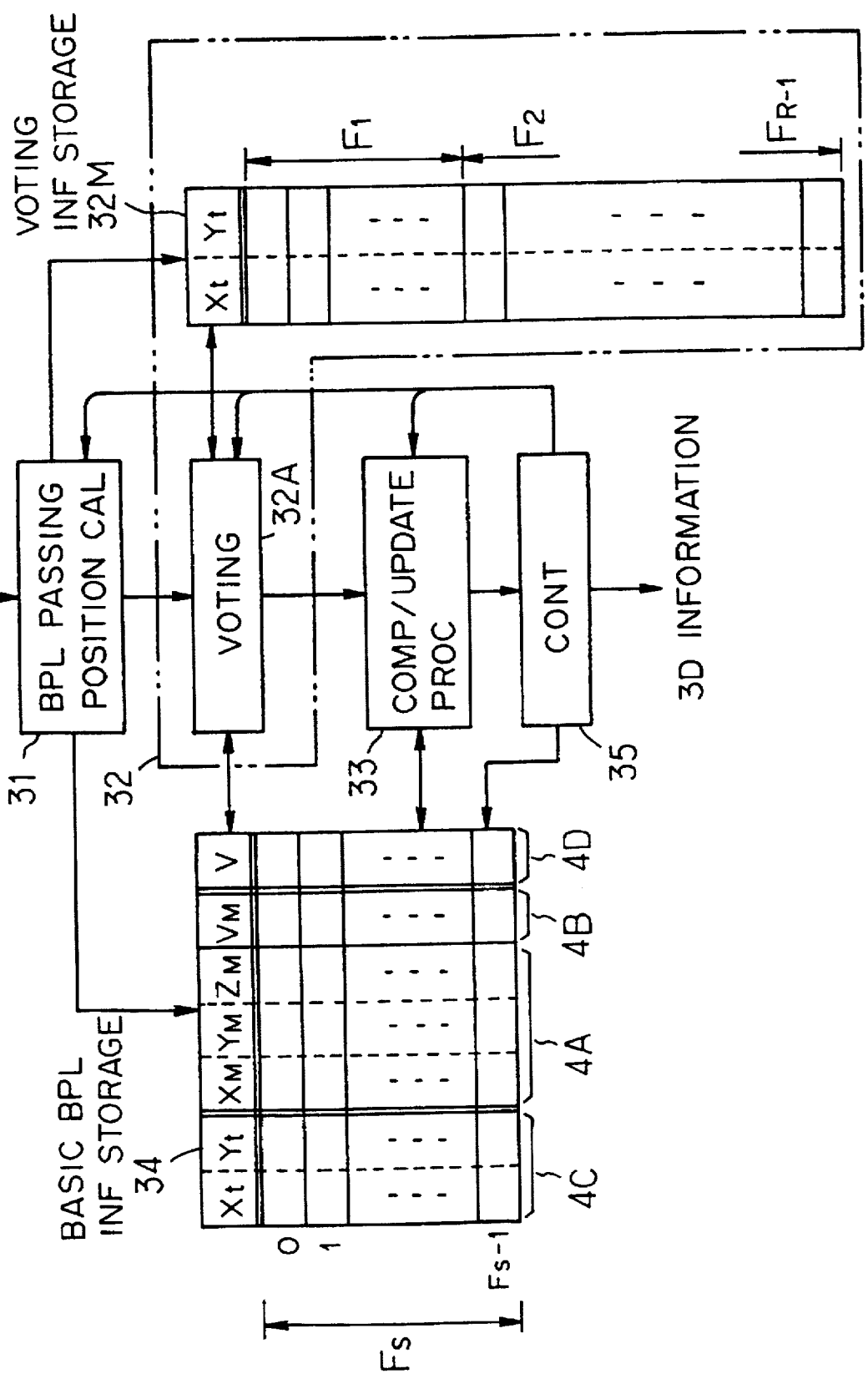
FIG. 19 is a block diagram illustrating a 3D information extracting apparatus according to a fifth embodiment of the present invention.

FIG. 19 is a block diagram illustrating a fifth embodiment of the 3D information extracting apparatus according to the present invention.

This embodiment is a modified form of the FIG. 7 embodiment and differs from the configuration of FIG. 7 with respect to the following points. First, in FIG. 7 the voting information storage part 32M has areas for storing voting scores in correspondence with the total of $N_x \times N_y$ voxels in the voxel slice, whereas in FIG. 19 the voting information storage part 32M has areas for storing only voxel positions through which all the reference back-projection lines pass in the processing of each voxel slice. Second, a field 4D for storing the voting scores V in the processing of each voxel slice is added to each storage area j (where j=0,1, . . . , $F_s$-1) corresponding to each basic back-projection line L0j in the basic back-projection line information storage part 34 in FIG. 7. In terms of operation, this embodiment differs from the FIG. 7 embodiment in that in the latter the contents of the respective areas in the voting information storage part 32M corresponding to the voxels in a voxel slice through which the back-projection lines pass are incremented by "1", whereas in FIG. 19 all reference back-projection line passing coordinates written in the storage part 32M in the processing of each voxel slice are searched for those which agree with each basic back-projection line passing voxel coordinate and the number of reference back-projection line passing voxel coordinates detected to agree with the basic back-projection line passing voxel is used as the voting score V for the basic back-projection line coordinate, and the voting score V is stored in the field 4D in correspondence with the basic back-projection line.

The back-projection line passing position calculating part 31 receives therein the back-projection line information from the back-projection line information generating part 20 in FIG. 1 and calculates all back-projection line passing voxel coordinates $(X_r, Y_r)$ in the voxel slice $S_r$ (Z=t, where t=0,1, . . . , $N_z$-1). Among thus calculated voxel coordinates $(X_r, Y_r)$, those coordinates of the voxels through which the basic back-projection lines $L_s$ from the basic image pass are written into the field 4A of the basic back-projection line information storage part 34 and those coordinates of the voxels through which the reference back-projection lines $L_r$ pass are written into the voting information storage part 32M.

The basic back-projection line information storage part 34 is a memory wherein the basic back-projection line passing voxel coordinates $(X_r, Y_r)$, the maximum point coordinates $(XM, Y_M, Z_M)$, the maximum voting score $V_M$ and the count value V in the voxel slice $S_t$ are stored for each basic back-projection line $L_s$. This memory is formed by a RAM, for instance. The number of the passing voxel coordinates $(Y_r, Y_r)$ in the storage part 34 is equal to at least the number $F_s$ of basic back-projection lines $L_s$. The voting information storage part 32M stores all passing voxel coordinates in the voxel slice $S_t$ through which the reference back-projection lines $L_r$ pass, and this storage part is formed by a RAM, for instance.

The voting section 32A sequentially reads out the basic back-projection line passing voxel coordinates $(X_r, Y_r)$ stored in the basic back-projection line information storage part 34, then searches the reference back-projection line passing voxel coordinates $(X_r, Y_r)$ in the voting information storage part 32M for those which agree with each of the read-out basic back-projection line passing voxel coordinates, and counts the number of such reference back-projection line passing voxel coordinates (i.e., voting is done). The count values (that is, voting scores) obtained for the respective basic back-projection line passing voxel coordinates are stored in the field 4D of the basic back-projection line information storage part 34 as the count values (voting scores) V corresponding to the basic back-projection line passing voxel coordinates, respectively.

Thereafter, the compare/update processing part 33 makes a comparison, for each basic back-projection line passing voxel coordinate, between the count value V currently stored in the basic back-projection line information storage part 34 and the maximum value $V_M$ in the past and, if V>$V_M$, writes the count value V as the maximum value $V_M$ in the field 4B to thereby update the maximum value $V_M$ and writes the voxel coordinate $(X_r, Y_r)$ and the voxel slice coordinate Z=t at that time as the maximum point coordinate $(X_M, Y_M, Z_M)$ in the field 4A to thereby update the maximum point coordinate $(X_M, Y_M, Z_M)$. If V≤$V_M$, the maximum point $(X_M, Y_M, Z_M)$ will not be updated. Incidentally, in the case where the apparatus is configured so that the processing of the comparison between the voting score V and the maximum value $V_M$ and the updating by the compare/update processing part 33, which is performed upon each calculation of the voting score by the voting processing part 32 through voting for each basic back-projection line passing voxel coordinate in the storage part 34, is repeated for each of the basic back-projection line passing voxel coordinates in a sequential order, the field 4D for storing the voting score V need not be provided in the basic back-projection line information storage part 34.

The passing position calculation process, the voting process and the comparison/update process described above are executed for all the voxel slices of the voxel space VS in a predetermined order of the slices. Upon completion of these processes for all the voxel slices, the control part 35 outputs, as the 3D coordinates of feature points, the maximum point coordinates $(X_M, Y_M, Z_M)$ stored in the basic back-projection line information storage part 34. In other words, the maximum point coordinates $(X_M, Y_M, Z_M)$ stored in the basic back-projection line information storage part 34 indicate the positions of the voxels where the numbers of reference back-projection lines passing therethrough from different reference images are the greatest on the respective basic back-projection lines $L_r$, and since they are considered to be positions where the feature points are most likely to exist, the stored maximum points coordinate are output as the 3D coordinates of the feature points. In this instance, to prevent an erroneous detection under the influence of a measurement or quantization error, the extraction precision may also be increased by threshold processing based on the stored maximum value $V_M$.

As described above, according to the 3D information extracting apparatus of FIG. 19, the storage parts 32M and 34 need only to have the areas corresponding to the back-projection lines, so that there is no need of providing the storage areas corresponding to all the quantization points (i.e. voxels) in the 3D voxel space. Hence, the amount of hardware used in this embodiment is appreciably smaller than in the prior art example. The voting information storage part 32M requires less storage capacity than does the voting information storage part 32M in FIG. 7 embodiment which has the areas corresponding to the $N_X \times N_Y$ voxels in the voxel slice. Further, by executing the voting process and the maximum point information compare/update process for each voxel slice, it is not necessary to perform complicated processing of calculating the peak point value in the 3D space after the voting as in the first conventional method; hence the total processing time can be reduced. Besides, the execution of the voting process and the maximum point information compare/update process for each voxel slice eliminates the necessity of performing the voting process twice as in the second conventional method, that is, the voting process needs to be carried out only once for all the back-projection lines—this also contributes to reduction of the processing time.

SIXTH EMBODIMENT

In the embodiment of FIG. 19 described above, the voting score V at each basic back-projection line passing voxel coordinate is obtained by counting the number of reference back-projection lines passing through the voxel, but even if the voxel is the position of a true 3D feature point, there are cases where the reference back-projection lines, which should primarily pass through that voxel (hereinafter referred to as a center voxel), go through a neighboring voxel instead of passing through the center voxel due to a quantization error by the dividing up of the object space into voxels, an error in the measurement of the positions of 2D feature points in the image which define the back-projection lines and an error in the measurement of the viewing points. In such a situation, the voting score V counted at the center voxel becomes smaller than the theoretical value and in some cases the center voxel is not extracted as a feature point.

With a view to solving such a problem as mentioned above, the embodiment of FIG. 20 is adapted so that the number of reference back-projection lines passing through voxels adjacent the center one are also counted as the voting score V. The 3D information extracting apparatus of this embodiment is basically identical in construction with the FIG. 19 embodiment, but the function of the voting processing part 32 in this embodiment is improved as compared with that of the voting processing part 32 in the apparatus of FIG. 19. The voting section 32A is formed by a passing coordinate search part 32a, neighboring coordinate search part 32b and a voting score calculating part 32c.

The passing coordinate search part 32a searches the voting information storage part 32M for the same passing voxel coordinates as those $(X_r, Y_r)$ for the noted basic back-projection line. In the FIG. 19 embodiment the number of thus searched reference back-projection line passing voxel coordinates is counted to obtain the voting score V, but as described below, in the FIG. 20 embodiment the voting score V is determined taking into account the number of reference back-projection lines passing through the neighboring voxels as well.

Figure 21A:
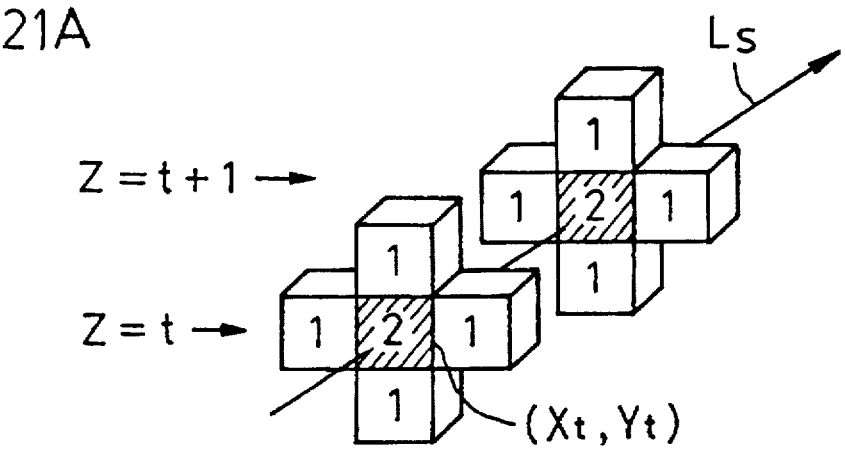
FIG. 21A is a schematic diagram showing examples of passing voxels and neighboring voxels in the FIG. 20 embodiment.
Figure 21B:
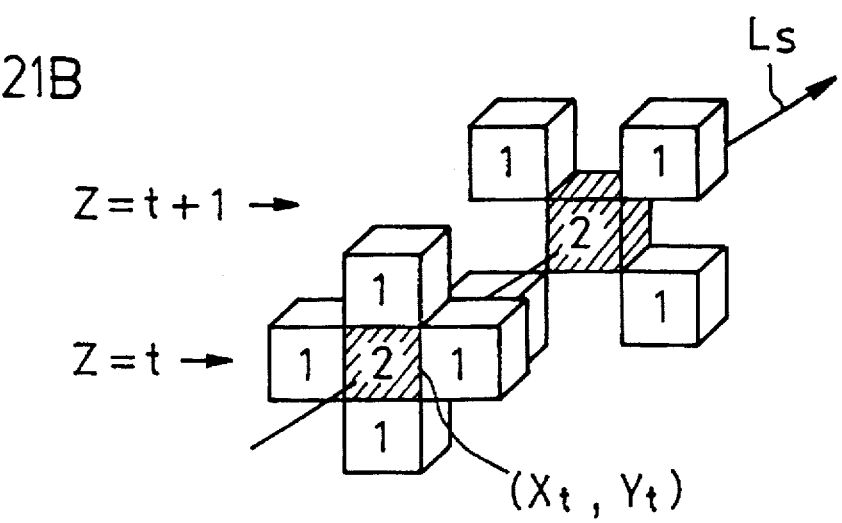
FIG. 21B is a schematic diagram showing another example of passing voxels and neighboring voxels.
Figure 21C:
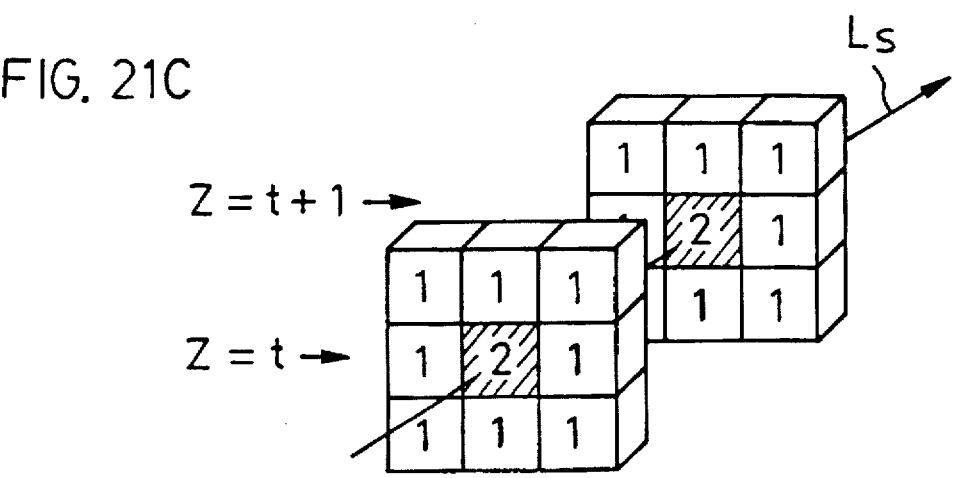
FIG. 21C is a schematic diagram showing a still other example of passing voxels and neighboring voxels.

The neighboring coordinate search part 32b is to count the number of reference back-projection lines that pass through voxel coordinates adjacent the basic back-projection line passing voxel coordinate $(X_r, Y_r)$. FIGS. 21A, 21B and 21C show examples of the bounds of neighborhood in search for neighboring voxel coordinates. In FIG. 21A the adjacent voxel coordinates to be searched are those $(X_{r-1}, Y_r)$, $(X_{r+1}, Y_r)$, $(X_r, Y_{r-1})$ and $(X_r, Y_{r+1})$ adjacent the passing voxel coordinate $(X_r, Y_r)$ in the horizontal and vertical directions. In the case of FIG. 21B, the voxel coordinates $(X_{r-1}, Y_r)$, $(X_{r+1}, Y_r)$, $(X_r, Y_{r-1})$, $(X_r, Y_{r+1})$ adjacent the passing voxel coordinator $(X_r, Y_r)$ in the horizontal and vertical directions and the voxel coordinates $(X_{r-1}, Y_{r-1})$, $(X_{r+1}, Y_{r-1})$, $(X_{r-1}, Y_{r+1})$, $(X_{r+1}, Y_{r+1})$ adjacent the passing voxel coordinate $(X_r, Y_r)$ diagonal thereto are alternately searched for each voxel slice. In the case of FIG. 21C, eight voxel coordinates adjacent the passing voxel coordinate $(X_r, Y_r)$ are searched. Other bounds of search can be chosen as desired.

The voting score calculating part 32c calculates the voting score at the passing coordinate $(X_r, Y_r)$ on the basis of the number of back-projection lines obtained with the search by the passing coordinate search part 32a and by the neighboring coordinate search part 32b. In this instance, the voting score V may be calculated by a simple addition or weighted addition of the count values obtained at the passing voxel coordinate (the center voxel coordinate) and at those adjacent thereto. The weighted addition of such count values may be implemented for example, as shown in FIG. 21A, 21B or 21C, where the count values at the coordinates adjacent the passing voxel coordinate $(X_r, Y_r)$ are held intact and the count value at the passing voxel coordinate $(X_r, Y_r)$ is doubled, for instance, then these weighted counted values are summed up to obtain the voting score V as a whole.

As described above, by counting (voting) the number of reference back-projection lines passing through the coordinates adjacent the basic back-projection line $L_s$ passing voxel coordinate $(X_r, Y_r)$ in the voxel slice $S_r$ as well as by counting (voting) the reference back-projection lines passing through exactly the same coordinate as the basic back-projection line passing voxel coordinate $(X_r, Y_r)$, the basic back-projection line $L_r$ is equivalently made to have a desired thickness. By this, it is possible to lessen the severity of the problem that the back-projections do not cross the same voxel owing to such as errors as those in the voxel quantization and position measurement.

Furthermore, since a secondary filter effect can be produced on the voxel slice by weighting the count values in dependence on whether it is obtained at the passing voxel coordinate $(X_r, Y_r)$ or those at neighboring coodinates, the extraction performance can be enhanced.

SEVENTH EMBODIMENT

Figure 20:
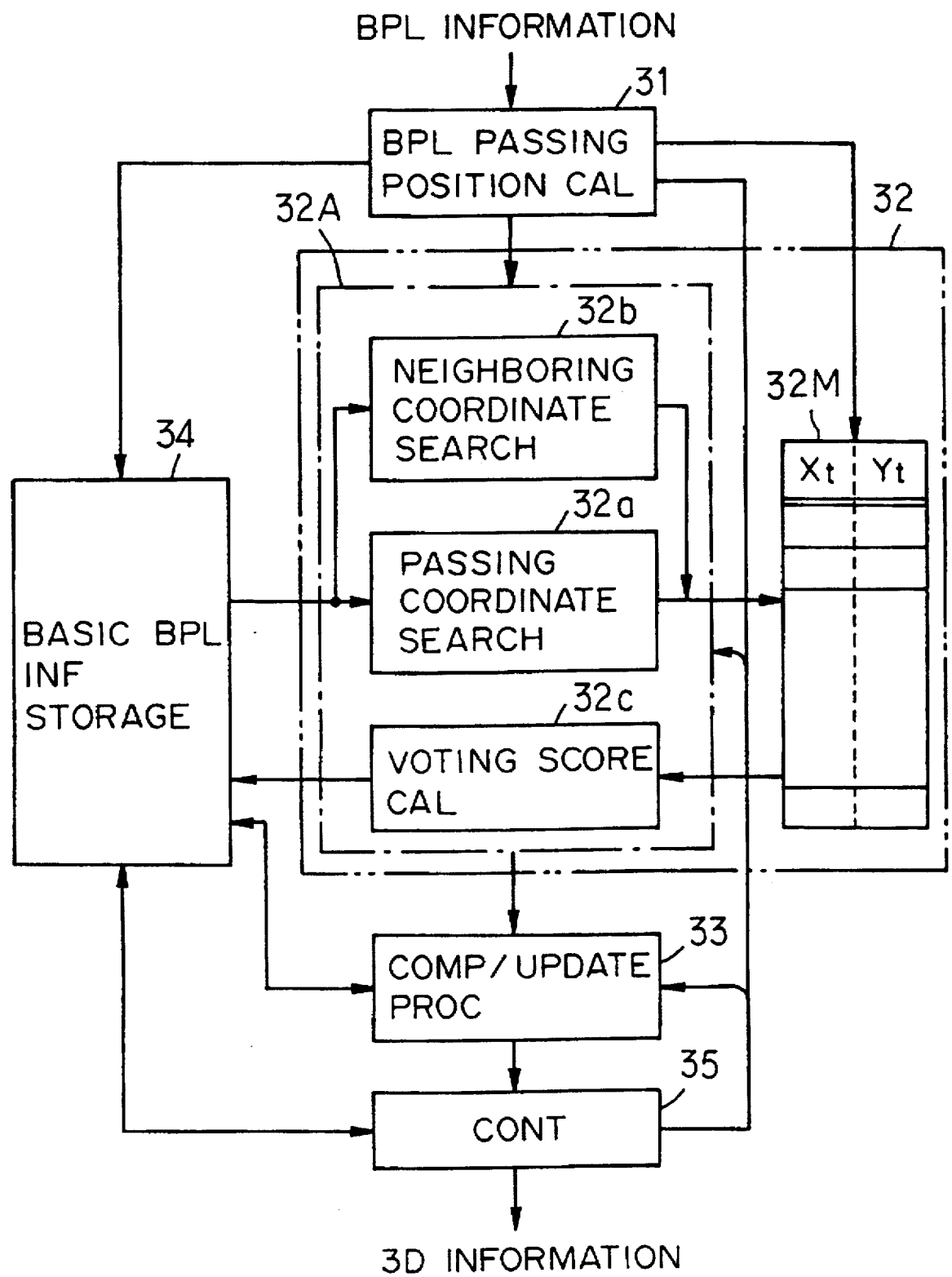
FIG. 20 is a block diagram illustrating a 3D information extracting apparatus according to a sixth embodiment.
Figure 22:
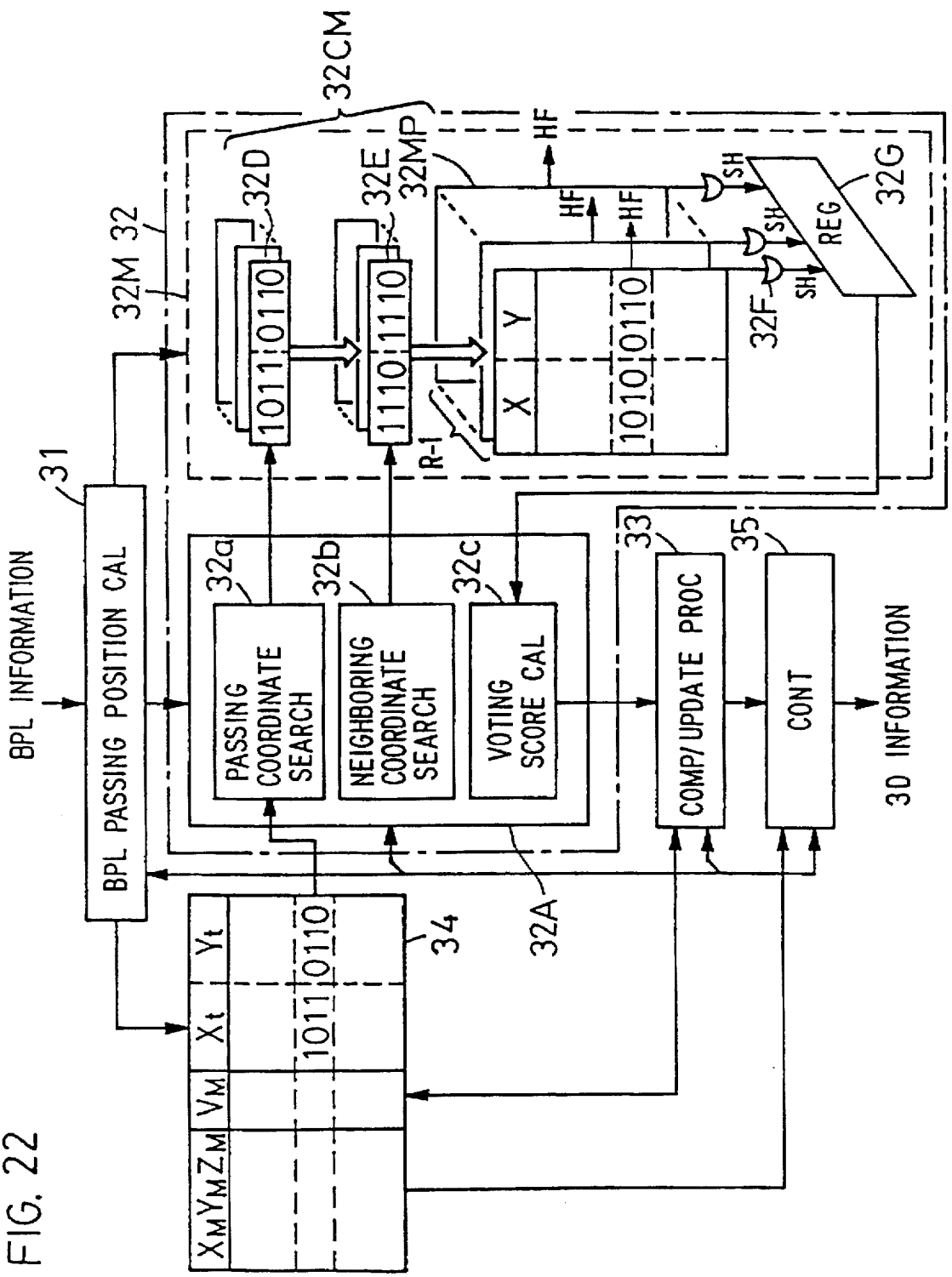
FIG. 22 is a block diagram illustrating a 3D information extracting apparatus according to an eighth embodiment of the present invention.

FIG. 22 illustrates a modified form of the FIG. 20 embodiment. This embodiment is common to the embodiment of FIG. 20 in the calculation of the voting score V by counting the number of reference back-projection line passing voxel coordinates in the voting information storage part 32M which are identical to each basic back-projection line passing voxel coordinate. This embodiment is also adapted to count the number of reference back-projection lines passing voxels surrounding the basic back-projection line passing voxel. This embodiment has its feature in that the voting information storage part 32M is formed by a CAM (Content-Addressable Memory) having a parallel search function so as to simplify the configuration for voting.

As introduced, for example, in IEEE COMPUTER, pp.12–16, Nov. 1994, the CAM is capable of parallel search of all word data stored therein for words containing the same bit train as a desired one and has a function of outputting hit flags HF corresponding to the searched words. Moreover, the CAM has a function of outputting the logical sum of the hit flags HF as a single hit flag SH; hence, when even one word in the stored word data is retrieved, the CAM outputs the single flag SH="1".

In the FIG. 22 embodiment, the voting information storage part 32M has R-1 CAMs 32CM corresponding to the R-1 reference images, and in a memory part 32MP of each CAM 32CM there is written by the back-projection line passing position calculating part 31 the voxel coordinates $(X_t, Y_t)$ on the voxel slice $S_t$ through which reference back-projection lines of the corresponding reference image pass. Each CAM 32CM has comparison pattern register 32D for holding a comparison pattern and mask register 32E for holding a mask pattern which selectively masks the comparison with the comparison pattern for each bit. Common comparison and mask patterns are set in the registers 32D and 32E, respectively, and the passing voxel coordinates in the storage part 32M are simultaneously searched for the same bit strings as unmasked bit strings of the comparison patterns. The output from a hit flag ORing part 32F of each CAM 32M is fed to an output register 32G and its contents are provided to the voting score calculating part 32c of the voting processing part 32. The passing coordinate search part 32a of the voting processing part 32 sets a passing voxel coordinate $(X_t, Y_t)$ from the basic back-projection information storage part 34 as a comparison pattern $X_t Y_t$ in the comparison pattern registers 32D, and the neighboring coordinate search part 32b presets in the mask registers 23E a mask pattern that masks the least significant bits of the coordinate values $X_t, Y_t$ in this example.

Figure 23:
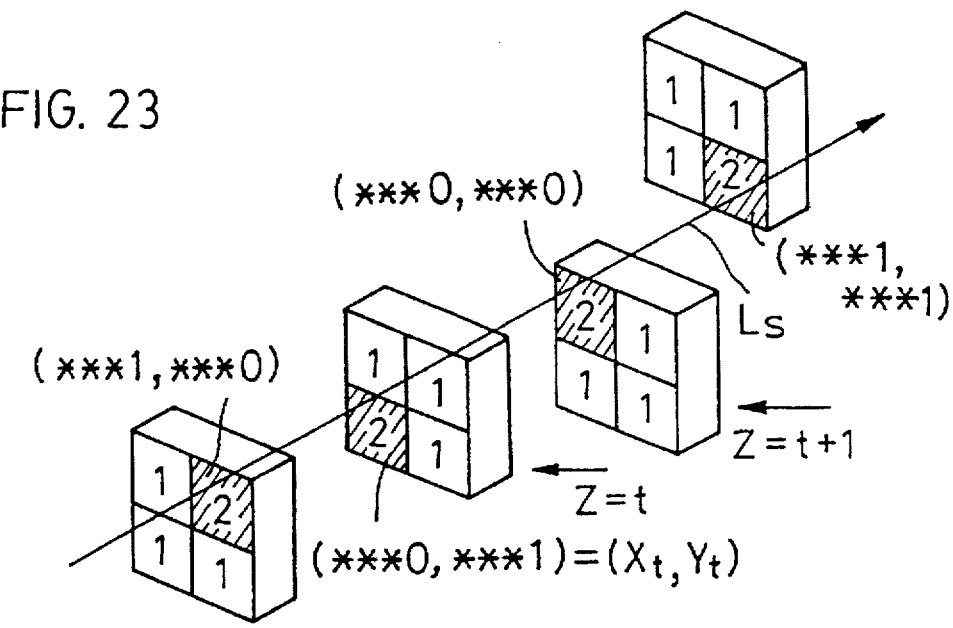
FIG. 23 is a schematic diagram showing, by way of example, neighboring voxels in the FIG. 22 embodiment.

FIG. 23 shows each passing voxels indicated by hatched and three neighboring voxels that are specified when a bit string "11101110" corresponding to a total of eight bits of the coordinate values $X_t, Y_t$ is set as a mask pattern in the mask register 32E by the neighboring coordinate search part 32B. Since the least significant bits of the coordinate values $X_t, Y_t$ as a comparison pattern $X_t Y_t$ are masked by the mask pattern, there are four sets of three neighboring voxels, as shown, that are specified when pairs of the least significant bits of the coordinate values $X_t, Y_t$ are (0,0), (0,1), (1,0) and (1,1).

To facilitate a better understanding of the invention, let it be assumed that each of the coordinate values $X_t, Y_t$ of the passing voxel coordinate $(X_t, Y_t)$ is represented by four bits as mentioned above and that the mask register 32E has set therein "11101110" as the mask pattern. Consequently, in this case, the least significant bits in the four-bit groups representing the coordinate values $X_t, Y_t$ of the passing voxel are masked and the other remaining three-bit groups are fed as comparison data to the memory parts 32MP of the CAMs 32CM.

At first, the passing coordinate search part 32a reads out of the basic back-projection line information storage part 34 one basic back-projection line $L_s$ passing voxel coordinate $(X_t, Y_t)$, then sets it as a comparison pattern $X_t Y_t$ in the comparison pattern register 32D and searches all the reference back-projection lines $L_r$ for the same coordinate $(X_t, Y_t)$ and its neighboring coordinates.

FIG. 22 shows the case where the basic back-projection line passing coordinate $(X_t, Y_t)$ selected from the storage part 34 is (101,0110). The respective least significant bits of the coordinate values $X_t, Y_t$ are masked by the mask pattern set by the neighboring coordinate search part 32b in the mask register 32E. The memory parts 32MP of the R-1 CAMs 32CM are simultaneously searched for coordinates (101*, 011*) (where * is 0 or 1) given by the coordinate values having their least significant bits masked.

That is, reference back-projection lines Lr passing through the voxels of the coordinates (101*,011*) are all detected by one parallel search. Hit flags HF are set corresponding to the detected reference back-projection lines and the number of reference back-projection lines can be counted by counting the number of all the bit flags HF. In this embodiment, however, the logical OR of hit flag for each CAM 32CM corresponding to one of the reference images is outputted as the single hit flag SH from the ORing part 32F and set in the register 32G, and the voting score calculating part 32c obtains the voting score V by counting the number of bits "1" indicating the single hit flags SH=1 in the register 32G.

With such a parallel search function of the CAMs, all the reference back-projection lines, which pass through the passing voxel and the neighboring ones, can be detected by making only one search for the passing voxel coordinate $(X_t, Y_t)$ and the adjoining ones. Thus, it is possible to achieve, with practically no increase in the processing time, the voting process that produces the same effect as that in the case where the basic back-projection line is made to have a thickness.

The bits of the passing coordinate values to be masked are not limited specifically to the least significant bits but instead a plurality of more significant bits may also be masked—this permits setting of a wider range of neighboring voxel coordinates, and hence making it possible to count, as effective voting score, the number of reference back-projection lines that do not cross the basic back-projection line on a single voxel owing to the aforementioned errors. Even if the range of neighboring voxel coordinates is extended like this, one search is enough for the required detection because of the parallel search function of the CAMs, preventing a substantial increase in the processing time.

That is, when storage part 32M for storing the reference back-projection line passing coordinates as individual votes is formed by the CAMs wherein one word is allocated to the information about each back-projection line, the parallel search function of the CAMs can be utilized. Further, since it is possible to detect, by only one search, all the reference back-projection lines that pass through one basic back-projection line $L_s$ passing voxel and a plurality of voxels within a certain area around it, the processing time for search in the voting process can be reduced.

It is also possible to employ the weighted voting described previously with respect to the FIG. 20 embodiment. Let it be assumed, for example, that the basic back-projection line $L_s$ passing voxels (hatched) are each weighted by a factor 2 and the neighboring voxels with a factor 1 as depicted in FIG. 23. In this case, the search is made twice. In the first search, by setting "11111111" as the mask pattern in the mask register 32E for the search, single hit flags SH are outputted to the register 32G from only those CAMs in the storage part 32M, where there are stored reference back-projection line passing voxels which are identical to the basic back-projection line passing voxel coordinate $(X_r,Y_t)$. The number of single hit flags SH in the register 32G is counted by the voting score calculating part 32c, and the count value is set as $V_1$. In the second search, "11101110" is similarly set as the mask pattern in the mask register 32E and the number of single hit flags SH is counted in the same manner as in the first search and the count value is set as $V_2$. Then, the voting score V is obtained by the addition $2V_1+V_2$.

EIGHTH EMBODIMENT

Figure 24:
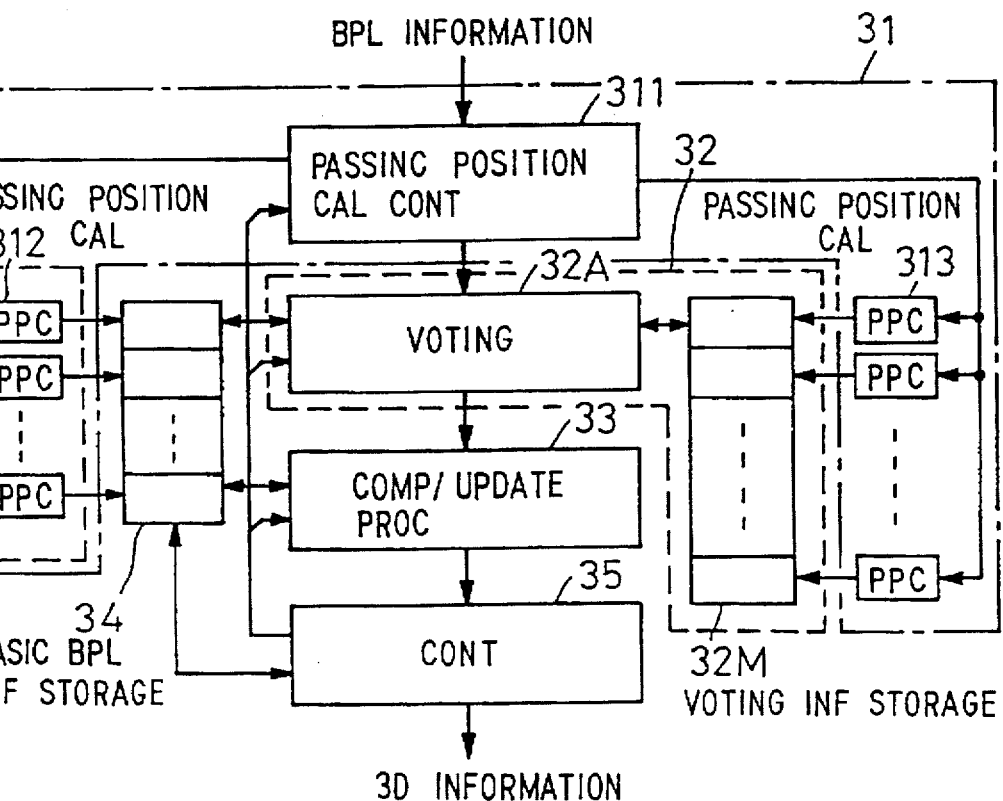
FIG. 24 is a block diagram illustrating a 3D information extracting apparatus according to a ninth embodiment of the present invention.

FIG. 24 illustrates in block form an eighth embodiment of the present invention.

The illustrated 3D information extracting apparatus is basically identical in construction with the apparatus of the FIG. 19 embodiment but differs from the latter in that the back-projection line passing position calculating part 31 in FIG. 19 is formed by a passing position calculation control part 311 and passing position calculation processing parts 312 and 313. The back-projection line passing position calculating part 31 forms one passing position calculation processing means corresponding to each back-projection line and, for all back-projection lines from all images, the passing position calculations are all executed in parallel. The passing position calculation processing parts 312 and 313 are provided corresponding in number to the basic back-projection lines $L_s$ and the reference back-projection lines $L_r$, respectively, and the passing position calculations are all executed in parallel under the control of the passing position calculation control part 311.

Figures 25A, 25B:
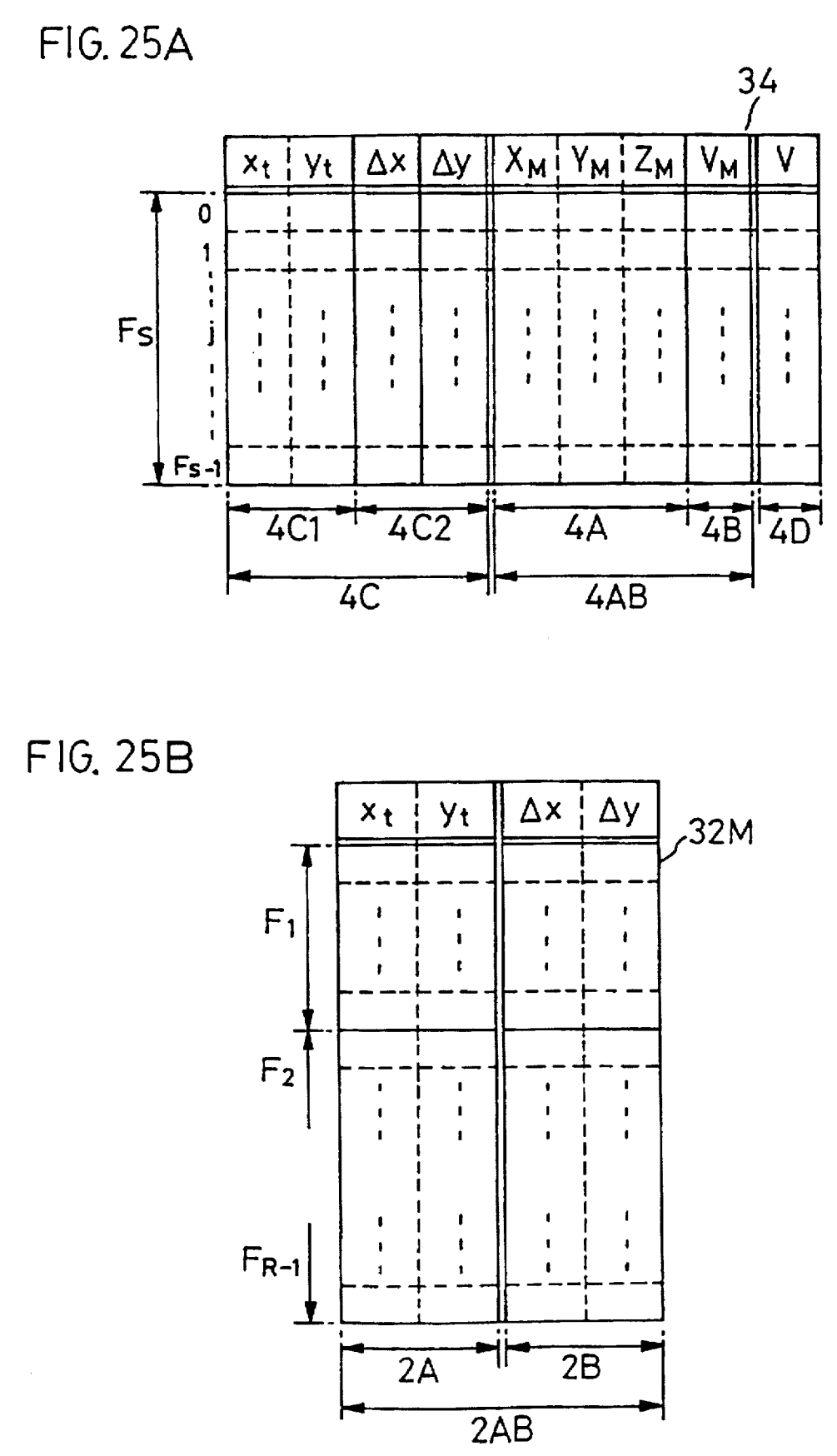

FIGS. 25A and 25B illustrate the constructions of the basic back-projection line information storage part 34 and the voting information storage part 32M in the FIG. 24 embodiment. The basic back-projection line information storage part 34 comprises, as shown in FIG. 25A, a passing position field 4C which is formed by fields 4C1 and 4C2 for storing, in each area j (where j=0,1, ..., $F_s$-1) corresponding to one basic back-projection line, the world coordinate $(x_t,y_t)$ where the basic back-projection line passes through the voxel slice $S_t$ (Z=t) and the direction vector ($\Delta x, \Delta y$) which is the difference between the passing world coordinate $(x_t,y_t)$ in the current voxel slice St and the passing world coordinate $(x_{t+1}, y_{t+1})$ in the next voxel slice $S_{t+1}$; a maximum point information field 4AB which is formed by fields 4B and 4A for storing the maximum number $V_M$ of reference back-projection lines (the maximum voting score) counted on each of the basic back-projection lines in the past and the voxel coordinate $(X_M,Y_M,Z_M)$ of the position of that maximum point; and a voting score field 4D for storing the count value V of the reference back-projection lines having the same passing voxel coordinate as that of each basic back-projection line, calculated by the voting processing part 32.

The voting information storage part 32M comprises, as shown in FIG. 25B, a passing position field 2AB which is formed by fields 2A and 2B for storing the reference back-projection line passing world coordinates $(x_t,y_t)$ and direction vectors ($\Delta x, \Delta y$) similar to those mentioned above.

Next, a description will be given of the operations of the passing position calculation processing parts 312 and 313. At first, the back-projection line information obtained in the back-projection line information generating part 20 in FIG. 1 is used to calculate all initial passing world coordinates $(x_0,y_0)$ and all direction vectors ($\Delta_x,\Delta_y$) in the voxel slice $S_t$ (t=0) through which the basic and reference back-projection lines pass first, and the world coordinates and the direction vectors are written as initial values in the basic back-projection line information storage part 34 and the voting projection line information storage part 32M, respectively. At this time, the maximum values $V_M$ in the basic back-projection line information storage part 34 are set to all ones, for instance. In the processing in the succeeding each voxel slice $S_t$ (t≧1), the passing world coordinate $(x_{t+1},y_{t+1})$ in the next voxel slice $S_{t+1}$ (Z=t+1) can be calculated by the additions of the aforementioned equation (3) on the basis of the world coordinate $(x_t,y_t)$ and the direction vector ($\Delta x, \Delta y$).

$$x_{t+1}=x_t+\Delta x, \quad y_{t+1}=y_t+\Delta y \tag{3}$$

All the passing position calculating parts 312 and 313 corresponding to the respective back-projection lines simultaneously execute the additive operation of Eq. (3), which the passing positions (world coordinates) of all the basic and reference back-projection lines can be calculated in parallel. Further, the voxel coordinate $(X_t,Y_t)$ of the passing position $(x_t,y_t)$ in each voxel slice $S_t$ can be obtained as $X_t=[x_t]$ and $Y_t=[y_t]$, that is, as integer parts of $x_t$ and $y_t$, respectively.

Next, a description will be given of the operation of the 3D feature point extracting apparatus after the initialization of the storage parts 34 and 32M.

After the initialization of the storage parts 34 and 32M by the passing position calculating parts 312 and 313, the voting section 32A reads out of the basic back-projection line information storage part 34 the first basic back-projection line passing world coordinate $(x_t,y_t)$ among $F_s$ ones and obtains integer part of the coordinate values $x_t,y_t$ as a passing voxel coordinate values $X_{st},Y_{st}$. Further, the voting section 32A reads out the reference back-projection passing world coordinates $(x_t,y_t)$ of the R-1 reference images in a sequential order from the voting information storage part 32M, then converts them to voxel coordinates $(X_{rt},Y_{rt})$ and makes a check to determine if $(X_{st},Y_{st})=(X_{rt},Y_{rt})$; if they equal, the content V (the initial value being zero) of the corresponding voting score field 4D of the storage part 34 is incrementd by one (voted). Upon completion of the voting for all the reference back-projection lines, the voting section 32A reads out the next basic back-projection line passing world coordinate from the storage part 34 and repeats the same voting process as described above. Thereafter, upon completion of the voting process for all of the $F_s$ basic back-projection lines, the compare/update processing part 33 compares the first voting score V stored in the field 4D of the storage part 34 for the first basic back-projection line with the corresponding maximum value $V_M$ and, if the voting score V is larger than the maximum value $V_M$, updates the maximum point information $(X_M,Y_M,Z_M,V_M)$ in the field 4D with $(X_{st},Y_{st},Z_t,V)$ as in the case of the afore-described embodiments. Thereafter, the same compare/update processing as described above is repeated for the rest of the basic back-projection lines in the voxel slice $S_t$. This is followed by the processing in the next voxel slice $S_{t+1}$. In the processing for the voxel slice $S_{t+1}$, the passing position calculating parts 312 and 313 calculate again the passing world coordinates $(x_{t+1},y_{t+1})$ of all back-projection lines by Eq. (3) and update the contents of the fields 4C1 and 2A of the storage parts 34 and 32M with them. After this, the voting processing part 32 performs the voting process and the compare/update processing part 33 performs the compare/update operation; these processes are repeatedly executed for all voxel slices St.

In the FIG. 24 embodiment, the passing position calculating parts 312 and 313 are provided for each back-projection line, by which passing position calculations for all the back-projection lines can be conducted in parallel and it is no longer necessary that the calculation of the passing positions of the back-projection lines passing through the voxel slice be repeated by the number of times equal to the number of all back-projection lines. Thus, the processing time can be reduced substantially.

NINTH EMBODIMENT

FIG. 26 illustrates in block form a ninth embodiment of the 3D information extracting apparatus, according to the present invention. Usually, the aforementioned CAMs possess a parallel addition function as well as the aforementioned parallel search function. In this embodiment, the pair of the basic back-projection line information storage part 34 and the passing position calculating part 312 and the pair of the voting information storage part 32M and the passing position calculating part 313, described above in respect of the FIG. 24 embodiment, are formed by CAMs 34CM and 32CM, respectively. In either of the CAMs 34CM and 32CM one word is assigned to the storage area of information about one back-projection line.

That is, in this embodiment, the means for storing the information about the basic back-projection line $L_s$ and the means for storing the voting information are each a means that has a content addressable memory with each one of addressable words assigned to the information corresponding to one of the back-projection lines, and the means for calculating the passing positions of the back-projection lines in parallel is implemented as a means for simultaneously executing the passing position calculation process for all the back-projection lines in all the images used.

Though not shown in FIG. 26, the basic back-projection line information storage CAM 34CM comprises, as is the case with FIG. 25A, the passing position field 4C for storing the passing world coordinates $(x_r, y_r)$ and the direction vectors $(\Delta x, \Delta y)$ of the basic back-projection lines, the maximum point position field 4AB for storing the maximum values $V_M$ and the maximum point coordinates $(X_M, Y_M, Z_M)$, and the count storing field 4D.

The voting information storage CAM 32CM comprises, as is the case with FIG. 25B, the passing position storing field 2AB for storing the passing world coordinates $(x_r, y_r)$ and direction vectors $(\Delta x, \Delta y)$ of the reference back-projection lines. The basic back-projection line information storing CAM 34CM and the voting information storing CAM 32CM use their parallel addition functions as the passing position calculating parts 312 and 313, respectively, and simultaneously perform the additive operation of Eq. (3) for all the back-projection lines. The parallel addition method itself is known in the art, and hence will not be described in detail. With the configuration of this embodiment, the passing position calculating process for all the back-projection lines can be executed in parallel only through utilization of the parallel addition function of the CAMs without providing passing position calculating parts of the same number as that of back-projection lines separately of the storage parts 34 and 32M and without using a special parallel processor or similar device. Thus, the amount of hardware required in this embodiment can be made smaller than in the FIG. 24 embodiment.

TENTH EMBODIMENT

Figure 27:
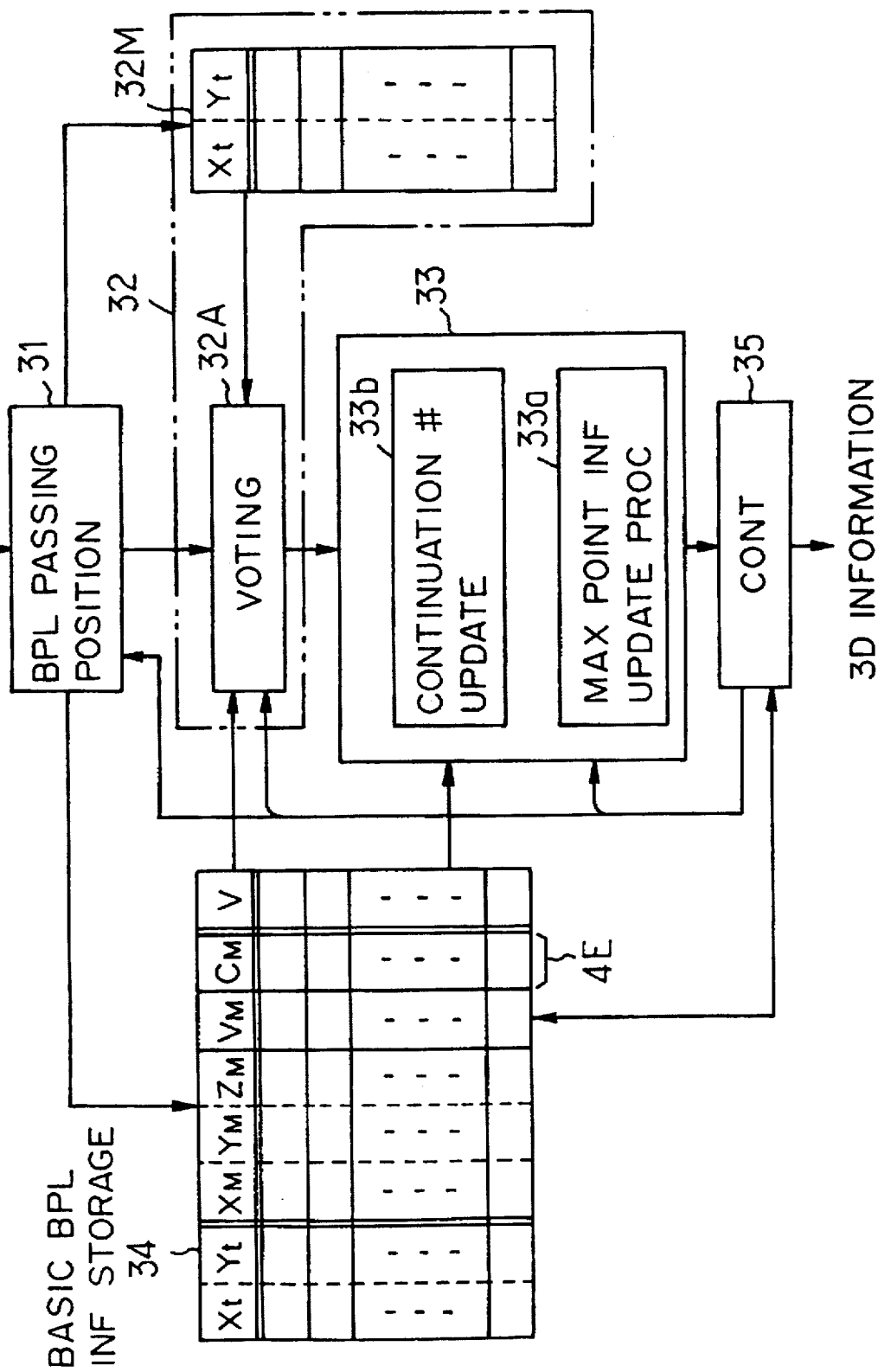
FIG. 27 is a block diagram illustrating a 3D information extracting apparatus according to a tenth embodiment of the present invention.

FIG. 27 is a block diagram illustrating a tenth embodiment of the present invention. While in the above-described embodiments the maximum point information $(X_M, Y_M, Z_M, V_M)$ is updated when the voting score V for the basic back-projection line is larger than the maximum value VM in the past voxel slices, this scheme is not preferable, because if the voting score V happens to be equal to the past maximum value $V_M$ over a plurality of voxel slices, the position of the first one of the successive maximum values $V_M$ is always detected as the position of the 3D feature point. This embodiment is intended to solve this problem.

This embodiment is basically identical in construction with the FIG. 19 embodiment but differs therefrom in that the compare/update processing part 33 in FIG. 19 is formed by a maximum point information updating part 33a and a continuation number updating part 33b and that the basic back-projection line information storage part 34 further comprises a field 4E for storing the maximum value continuation numbers $C_M$. Accordingly, no description will be given of the passing position calculating part 31 and the voting processing part 32.

The maximum point information updating part 33a compares the voting score V and the maximum value $V_M$ and, if $V>V_M$, writes the voting score V as a new maximum value $V_M$ in the field 4B of the basic back-projection line information storage part 34 to update the previous maximum value $V_M$, while at the same time it writes the voxel coordinate $(X_r, Y_r)$ and the coordinate $Z_r$=t of the voxel slice at that time as a new maximum point coordinate in the field 4A, whereby updating the maximum point coordinate $(X_M, Y_M, Z_M)$ stored therein. At this time, the continuation number updating part 33b writes "1" in the field 4E of the continuation number $C_M$ of the position of the maximum point (initialization). When $V=V_M$, the continuation number updating part 33b adds "1" to the value of the continuation number $C_M$ in the field 4E of the storage part 34. In this case, the maximum point information updating part 33a does not update the maximum value $V_M$ and the maximum point coordinate $(X_M, Y_M, Z_M)$. When $V<V_M$, either updating process is not carried out.

Upon completion of the above-described process for all the voxel slices, the control part 35 reads out the information $(X_M, Y_M, Z_M)$ about each basic back-projection line and the continuation number $C_M$ to calculate 3D feature points. The control part 35 needs only to correct the voxel coordinates $(X_M, Y_M, Z_M)$ of the maximum-point positions on the basis of the continuation numbers $C_M$ and output the corrected coordinates. As an example of the correction method, if the same maximum value $V_M$ is repeated, the world coordinate at the center of its continuation width (the voxel number) $C_M$ in the z-axis direction is calculated as $t_m = z_m = Z_M + C_M/2$, and it is substituted into Eq. (2) representing the corresponding basic back-projection line to calculate a world coordinate $(x_m, y_m)$. If necessary, it is transformed into the voxel coordinate $(X_M, Y_M, Z_M)$.

As described above, even when the maximum value $V_M$ of the voting score continues to be the same on the back-projection line, the continuation number $C_M$ of the maximum value $V_M$ at the maximum-point position can be obtained in the information about the basic back-projection line $L_s$ with simple processing, so that the center voxel position can be calculated. Hence, the 3D information extraction performance can be enhanced, besides this can be done only by adding to the basic back-projection line information storage part 34 the field 4E for storing the continuation number $C_M$ of the maximum value at the maximum-point position, and the amount of hardware required is very small. In addition, the processing time hardly increases because only the time for updating the continuation number $C_M$ of the maximum value at the maximum-point position is added.

While in the above the maximum point information $(X_M, Y_M, Z_M, V_M)$ is updated when $V_M < V$, the updating may also be performed when $V_M \geq V$, in which case the last voxel position of the maximum value VM remaining unchanged is detected as the maximum position $(X_M, Y_M, Z_M)$. Accordingly, the position traced back $C_M/2$ from the detected maximum position needs only to be calculated as the position of the 3D feature point.

ELEVENTH EMBODIMENT

Figure 28A:
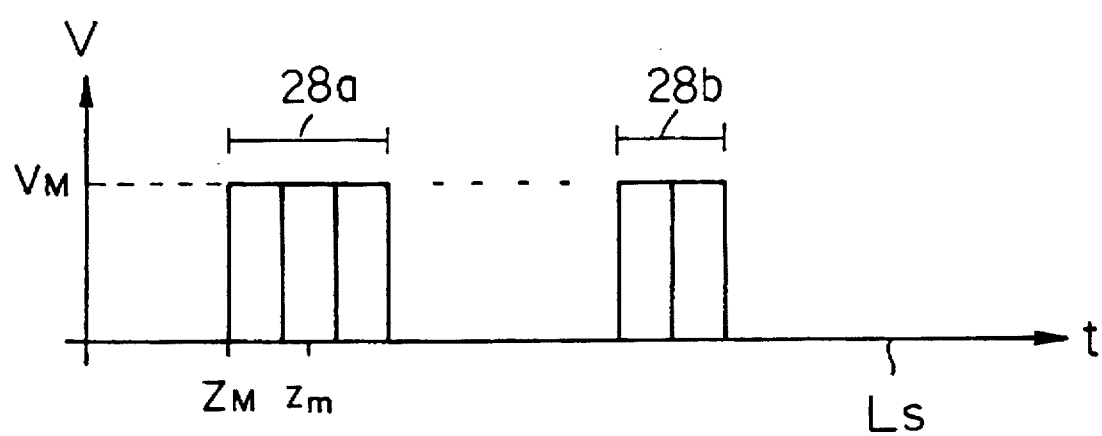
FIG. 28A is a graph showing an example in which the same maximum values $V_M$ exist at different positions on the same basic back-projection line.
Figure 28B:
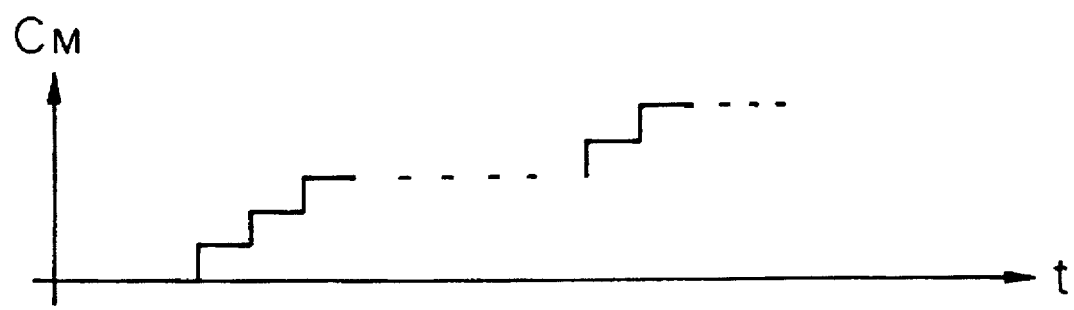
FIG. 28B is a graph showing changes in the number CM of maximum values $V_M$ that appear one after another.

In the embodiment of FIGS. 27, when the same maximum value $V_M$ continues, for example, three times in the z-axis direction with respect to the basic back-projection line L, as indicated by an area 28a in FIG. 28A, its length is detected as $C_M=3$, so that by deciding its central position $z_m=Z_m+1.5$ to be the position of the world coordinate of the 3D feature point in the z-axis direction, the extraction precision of the 3D feature point is increased. However, voxels of the same maximum value $V_M$ may sometimes be detected on the same basic back-projection line $L_s$ at a position different from the area 28a as indicated by an area 28b in FIG. 28A. In this case, in the FIG. 27 embodiment the maximum point information $(X_M, Y_M, Z_M, V_M)$ is not updated in the area 28b and the maximum point information at the position $Z_M$ in the area 28a is held, but the continuation value $C_M$ of the maximum value $V_M$ is further incremented in the area 28b as indicated in FIG. 28B and, as a result, it becomes $C_M=5$. Consequently, it is decided from the results of the processing that the continuation number of the maximum value $V_M$ in the area 28a is $C_M=5$, and its intermediate point $z_m=Z_M+5/2$ is decided as the z-axis coordinate value of the 3D feature point; hence, the precision of the extracted position of the 3D feature point is not improved. The precision rather degrades as the area 28b becomes longer. It is the embodiment of FIG. 29 that is intended to solve this problem.

Figure 29:
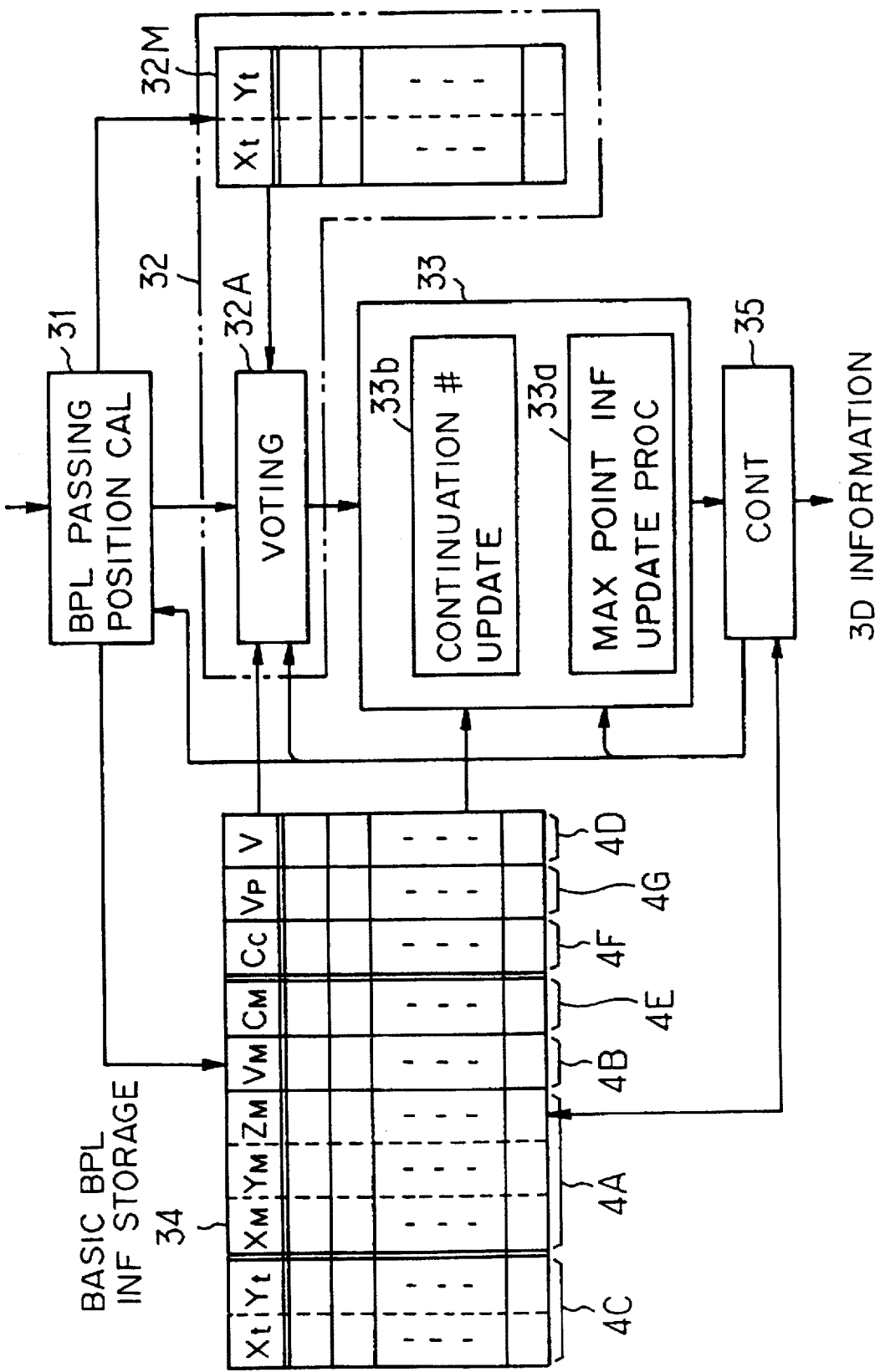
FIG. 29 is a block diagram illustrating a 3D information extracting apparatus according to an eleventh embodiment of the present invention.

The FIG. 29 embodiment is basically identical in construction with the FIG. 27 embodiment but differs therefrom in that the basic back-projection line information storage part 34 further comprises a field 4F for storing the continuation number $C_c$ of the voting score and a field 4G for storing the voting score $V_P$ in the immediately preceding voxel slice $S_{t-1}$.

As in the above, upon completion of the voting in the voxel slice St, the maximum point information updating part 33a compares the maximum value $V_M$ and the voting score V and, if $V \geq V_M$, uses the voting score V as a new maximum value $V_M$ to update the maximum value $V_M$ stored in the field 4B and uses the voxel coordinate $(X_t, Y_t)$ and the coordinate Z=t of the voxel slice at that time as the maximum point coordinate $(X_M, Y_M, Z_M)$ to update the maximum point coordinate stored in the field 4A. When $V < V_M$, no updating is performed. On the other hand, the continuation number updating part 33b compares the voting score V on the basic back-projection line $L_s$ in the immediately preceding voxel slice $S_{t-1}$, stored in the basic back-projection line information storage part 34, and the current voting score V on the same basic back-projection projection line Ls. If $V_P=V$, the updating part 33b adds "1" to the voting score continuation number $C_c$ and, if $V_P < V$, initializes the continuation number $C_c$ to "1". When $V_P > V$, if $V_M > V_P$, the updating part 33b initializes the continuation number $C_c$ to "1" and, if $V_M = V_P$, initializes the continuation number $C_c$ in the field 4F after writing the number $C_c$ as the continuation number $C_M$ in the field 4E of the storage part 34. Finally, the updating part 33b updates the field 4G using the current voting score V as the value $V_P$. Following this, the apparatus proceeds to the processing in the next voxel slice $S_{t+1}$.

Upon completion of the voting in all the voxel slices, the control part 35 needs only to read out of the storage part 34 the maximum-point position coordinate $(X_M, Y_M, Z_M)$ concerning the basic back-projection line and the continuation number $C_M$ and correct the voxel coordinate $(X_M, Y_M, Z_M)$ of the maximum-point position on the basis of the maximum value continuation number $C_M$ as in the case of FIG. 27. In this embodiment, however, when there exists on the basic back-projection line only one area where the same maximum value $V_M$ continues, the resulting maximum-point position $(X_M, Y_M, Z_M)$ is the position of the last voxel in that maximum value continuation area. When two or more maximum value continuation areas exist, the last voxel position of the last one of the maximum value continuation areas is obtained as the maximum-point position $(X_M, Y_M, Z_M)$. With the correcting method in this embodiment, for example, when the same maximum value $V_M$ continues for consecutive voxels as explained in FIG. 27, the central position of the consecutive voxels is calculated as the feature point.

By the above operation, when there exist on the same basic back-projection line $L_s$ two voxel areas where the voting score V become maximum as indicated by 28a and 28b in FIG. 28A and the maximum values $V_M$ in these area differ from each other, the maximum-point position $(X_M, Y_M, Z_M)$ of the larger maximum value $V_M$ and its continuation number $C_M$ are correctly obtained as in the case of FIG. 26. When the maximum value $V_M$ in the two areas 28a and 28b are equal, the maximum-point position $(X_M, Y_M, Z_M)$ in the second maximum value continuation area 28b and its continuation number $C_M$ are obtained in this embodiment.

TWELFTH EMBODIMENT

In the embodiment of FIG. 29, to perform updating of the maximum point information $(X_M, Y_M, Z_M, V_M)$ when $V_M \leq V$, the same maximum value $V_M$ is updated in its continuation area for each voxel when the same maximum value $V_M$ continues $(V=V_M)$, and as the result of this, the maximum point information at the last voxel in that area is held in the storage part 34. With the arrangement depicted in FIG. 30, however, the maximum point information $(X_M, Y_M, Z_M, V_M)$ at the first voxel in the maximum value continuation area can he held hy updating the maximum value $V_M$ when $V_M \leq V$, as is the case with the embodiment of FIG. 27. This embodiment is substantially identical in construction with the FIG. 29 embodiment but differs from the latter in that the basic back-projection line information storage part 34 further comprises a field 4H where to set a flag F indicating the updating of the maximum point information.

In this embodiment, after the voting in the voxel slice $S_t$, the maximum information updating part 33a compares the maximum value $V_M$ on each basic back-projection line in the past and the current voting score V and, if $V_M < V$, updates the maximum point information $(X_M, Y_M, Z_M, V_M)$ in the storage part 34 with the voting score V and its position $(X_t, Y_t, Z_t)$ and set F=1 in the updating flag field 4H. The continuation number updating part 33b compares the previous voting score $V_P$ held in the field 4G of the storage part 34 and the current voting score V; if $V_P < V$, the continuation number $C_c$ is initialized to "1"; if $V_P = V$, the continuation number $C_c$ in the field 4F of the storage part 34 is incremented by one; when $V_P > V$, if $V_M = V_P$ and F=1, the continuation number $C_c$ at that time is written as the maximum continuation number $C_M$ in the field 4E of the storage part 34, followed by the initializing of the continuation number $C_c$ to "1" and the updating the flag to F=0, and if $V_M=V_P$ and F=0, the continuation number $C_c$ is initialized to "1." After the above processing in the voxel slice St, the previous voting score $V_P$ in the field 4G of the storage part 34 is updated with the current voting score V, followed by the processing in the next voxel slice $S_{t+1}$.

According to this embodiment, when two or more maximum value $V_M$ continuation areas exist on the same basic back-projection line but at different positions, the maximum point information $(X_M, Y_M, Z_M, V_M)$ at the first voxel position in the first area and the continuation number $C_c$ of the maximum value $V_M$ are obtained.

Figure 30:
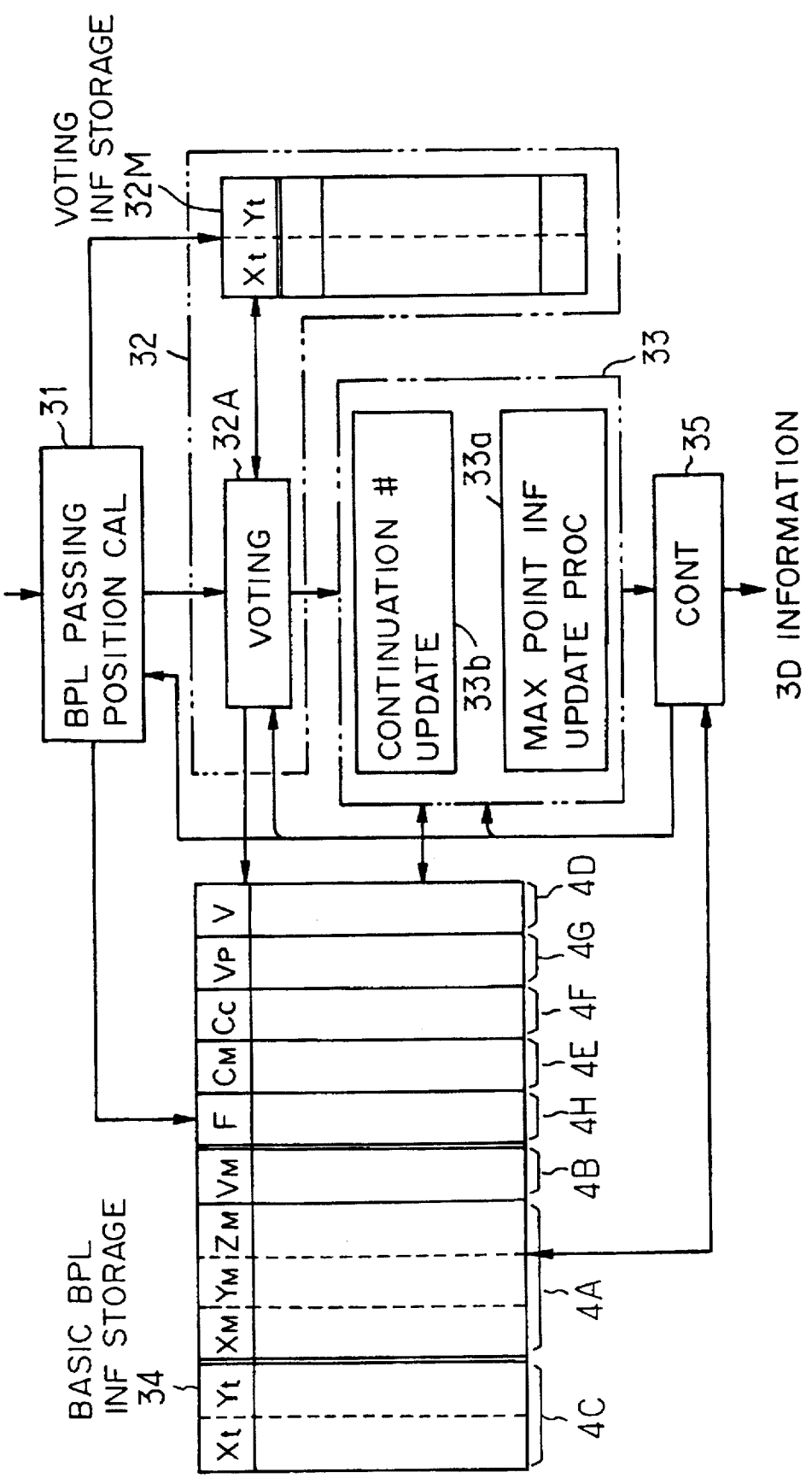
FIG. 30 is a block diagram illustrating a 3D information extracting apparatus according to a twelfth embodiment of the present invention.

In the embodiments of FIGS. 27, 29 and 30, a filtering effect may also be produced along each basic back-projection line L, by performing an addition or similar operation through the use of the voting score $V_P$ in the immediately preceding voxel slice $S_{t-1}$ and the voting score V in the current voxel slice $S_t$ and using the resulting value as the voting score. Alternatively, it is possible to use, as the voting score, the value obtained by the operation which brings about the filtering effect through the use of voting score V in the current voxel slice and the voting scores V in a plurality of previous voxel slices. Further, the maximum value $V_M$ may be prevented from remaining unchanged over a plurality of voxel slices by implementing an effective filtering on the basic back-projection line $L_s$.

As referred to above, the continuation number CM of the voting score $V_M$ at the maximum-point position can be added to the basic back-projection line information and even when the same maximum value $V_M$ continues on the basic back-projection line, the central voxel position can be detected, so that the 3D information extraction precision can be enhanced only by introducing simple processing. This can be implemented simply by the additional provision of the storage fields for the continuation number $C_c$ of the voting score V, the maximum value continuation number $C_M$ at the maximum-point position and the voting score VP in the previous voxel slice in the basic back-projection line information storage part 34. Thus, an increase in the amount of hardware by this scheme is very slight.

THIRTEENTH EMBODIMENT

Figure 31:
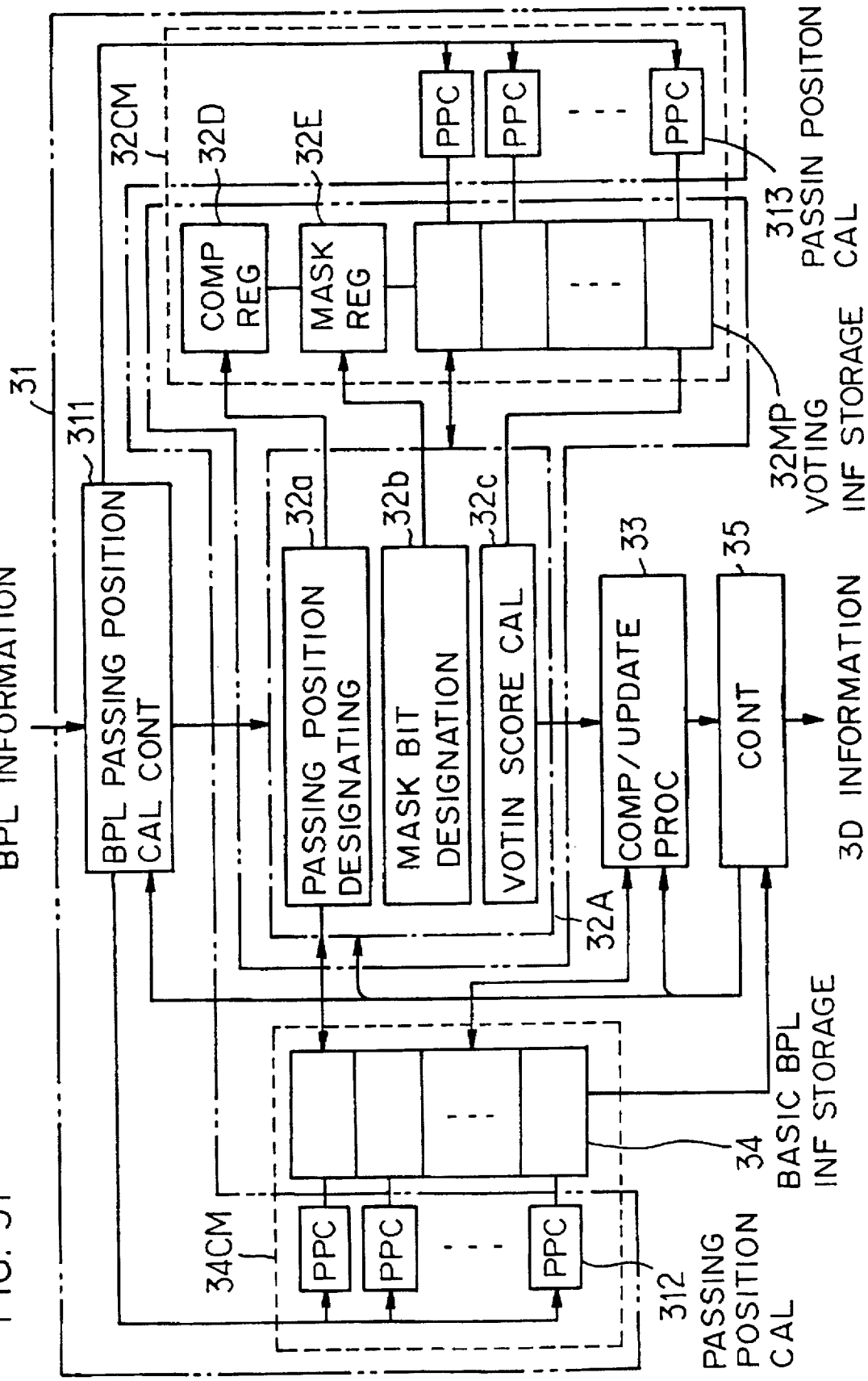
FIG. 31 is a block diagram illustrating a 3D information extracting apparatus according to a thirteenth embodiment of the present invention.

FIG. 31 is a block diagram illustrating a thirteenth embodiment of the 3D information extracting apparatus according to the present invention. This embodiment is basically identical in construction with the FIG. 26 embodiment and similarly employs the CAM 34CM as basic back-projection line information storage means and the CAM 32CM as voting information storage means, but this embodiment has its features not only in that the CAMs 34CM and 32CM are used to calculate the back-projection line passing positions but also in that the CAM 32CM is used to detect, by parallel search, all reference back-projection lines passing through the same position as the basic back-projection line passing position. As in the embodiment of FIG. 22, the voting section 32A has a passing position designating part 32a, a mask hit designating part 32h and a voting score calculating part 32c, and the reference back-projection line information CAM 34CM has a storage part 32MP, a passing position calculating part 313, a comparison pattern register 32D and a mask register 32E. The mask bit designating part 32b of the voting section 32A sets in the mask register 32E a mask pattern which has "0s" at a plurality of predetermined low-order bit positions where to mask the basic back-projection line passing world coordinate values $x_r, y_t$ except the integer parts and has "1s" at all bit positions of the integer parts. The passing position designating part 32a sets in a comparison pattern register 72 the coordinate values $x_r, y_t$ of each basic back-projection line passing world coordinate $(x_r, y_t)$ read out of the storage part 34. Accordingly, the CAM 32CM searches in parallel the storage part 32MP for the reference back-projection line passing world coordinates $(x_r, y_t)$ which have the integer parts which agrees with the integer parts of the coordinate values $x_r, y_t$ set in the comparison pattern register 32D and, as described previously with respect to FIG. 22, outputs the hit flags HF corresponding to the detected coordinates $(x_r, y_t)$. The voting calculating part 32c counts all the output hit flags HF to obtain the voting score V.

In the embodiment of FIG. 31, there are written in the storage part 32MP of the CAM 32CM the passing world coordinates $(x_r, y_t)$ of all reference back-projection lines through the voxel slice $S_t$ from all the reference images. In order to count the hit flags HF that can be output simultaneously in correspondence with all the coordinates, it is necessary to scan hit flag output terminals corresponding to all the coordinates; when the number of reference back-projection lines is extremely large, the counting time becomes undesirably long. To avoid this, it is possible to arrange such that storage areas corresponding to the numbers allocated to the reference images, respectively, are defined in the CAM 32CM and the passing world coordinates of all the reference back-projection lines from each reference image are written into the corresponding one of the storage areas. The CAM is capable of outputting a single hit flag SH from any storage area when even one hit flag HF is raised in that storage area. The number of reference back-projection lines from the same reference image that pass through the same voxel is usually zero or one in the most cases and rarely exceeds two. Hence, the number of storage areas where even one hit flag is raised can be counted by counting the number of single hit flags SH, and it can be decided that reference back-projection lines of the same number as at least the count number are passing through each specified voxel. The construction of this embodiment needs only to count the output flag number by scanning the single hit flag output terminals corresponding to a maximum of R-1 reference images, and hence permits significant reduction of the counting time required. No description will be given of the other processes since they are the same as in the FIG. 26 embodiment.

According to the FIG. 31 embodiment, since the parallel search function of the CAM is used to search all the back-projection lines in parallel for the reference back-projection lines $L_r$ that pass the same position as does the basic back-projection line $L_s$, there is no need of repeating the search of each basic back-projection line by the number of times equal to the number of all reference back-projection lines, and consequently, the search processing time in the voting can be shortened.

FOURTEENTH EMBODIMENT

Figure 32:
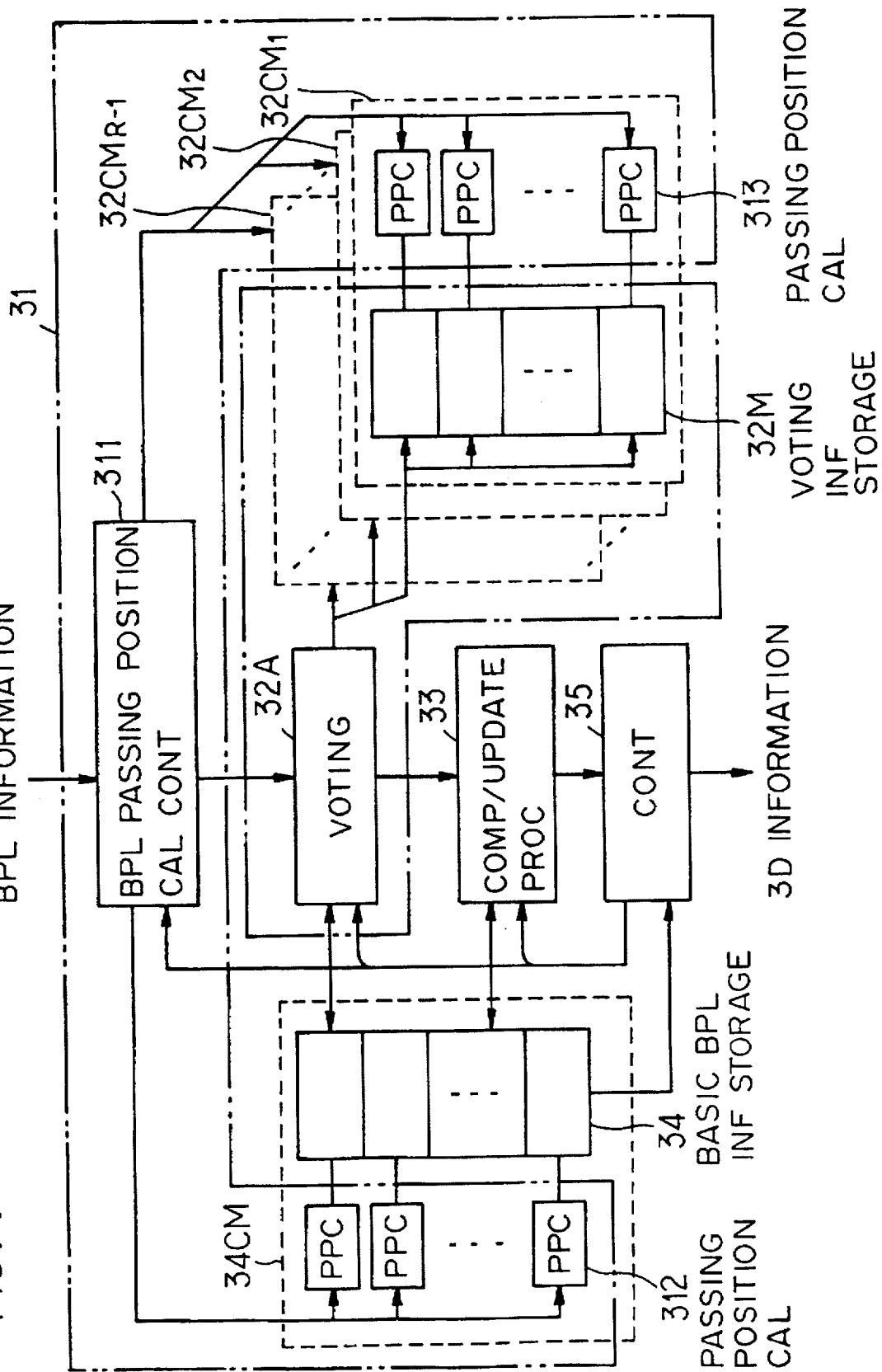
FIG. 32 is a block diagram illustrating a 3D information extracting apparatus according to a fourteenth embodiment of the present invention.

FIG. 32 is a block diagram illustrating a fourteenth embodiment of the present invention, in which R-1 CAMs $32CM_1$ to $32CM_{r-1}$ are provided corresponding to all of the R-1 reference images in the FIG. 31 embodiment as in the case of FIG. 22. For the sake of brevity, however, the comparison pattern registers 32D, the mask registers 32E, the ORing parts 32F and the output register 32G are not shown in FG. 32. The passing position designating part 32a, the mask bit designating part 32b and the voting score calculating part 32c of the voting section 32A are not shown either.

As described previously, the CAMS 32CM$_1$ to 32CM$_{R-1}$ each output a single hit flag SH when a hit flag is raised in at least any one of the words in the storage part 32MP. Accordingly, when the hit flag HF is raised in one of the CAMs 32CM$_1$ to 32CM$_{R-1}$ corresponding to the respective reference images, in connection with at least one reference back-projection line passing world coordinate $(x_t, y_t)$, the CAM corresponding to that reference image outputs the single hit flag SH="1", so that it is enough only to count the single hit flags of the same number as that of all the reference images. In such a case, if the number of reference images is set to R-1, the voting section 32A can easily be implemented by a decoder or counter which inputs an address of R-1 bits.

In this case, even when hit flags HF are raised for a plurality of reference back-projection lines in the CAM corresponding to the same reference image, the hit flags are counted one; however, only the maximum value $V_M$ of the voting score V is limited to the number R-1 of the images used and voting can be executed.

According to the 3D information extracting apparatus of FIG. 32, since the CAMs for storing the passing world coordinates of the reference back-projection lines $L_r$ are provided independently corresponding to the individual reference images, the parallel search in the voting can be simultaneously executed by the CAMs 32CM$_1$ to 32CM$_{R-1}$ corresponding to the respective reference images. Further, since the counting of the number of the reference back-projection line passing world coordinates $(x_t, y_t)$ detected by the search described above with respect to FIG. 31 can be implemented simply by counting the flags at only R-1 single hit flag output terminals of the R-1 (usually the number R of images is 3 to 5) CAMs, the voting time can be further shortened.

FIFTEENTH EMBODIMENT

Figure 33:
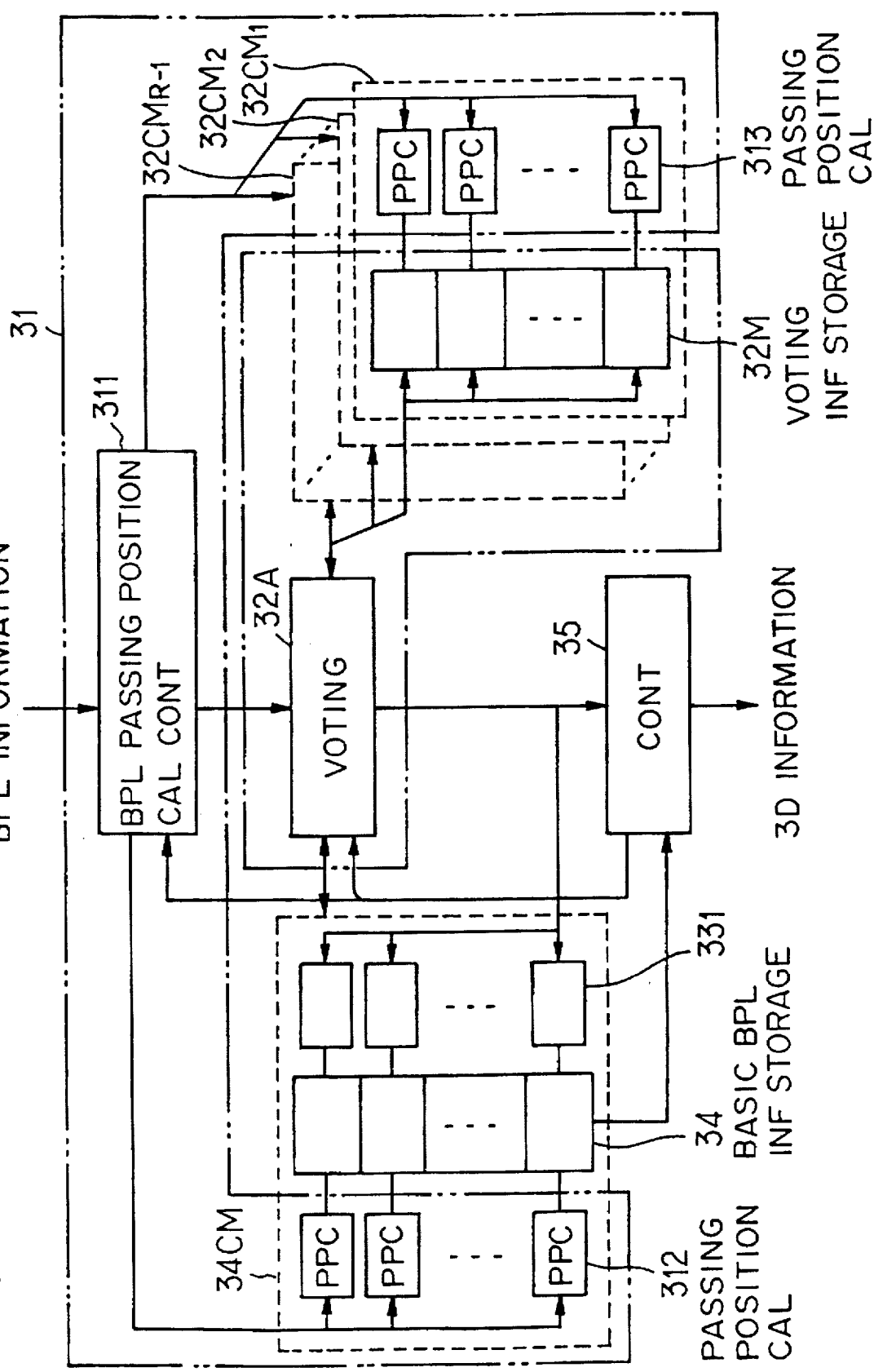
FIG. 33 is a block diagram illustrating a 3D information extracting apparatus according to a fifteenth embodiment of the present invention.

FIG. 33 illustrates in block form a fifteenth embodiment of the 3D information extracting apparatus according to the present invention. This embodiment is adapted so that the process of comparing the voting score V obtained in the voting processing part 32 and the maximum value $V_M$ on the basic back-projection line L, and the process of updating the maximum point $(X_M, Y_M, Z_M, V_M)$ information on the basis of the comparison result are executed in parallel to all the back-projection lines of the basic images through utilization of the parallel processing function of the CAM 34CM for basic back-projection line information storage use in FIGS. 26, 31 and 32. The parallel comparison/update processing is shown as a comparison/update processing part 331 in the CAM 34CM in correspondence with each basic back-projection line; therefore, such a dedicated comparison/update processing part 33 as in FIG. 32 is not provided in this embodiment.

In this embodiment, upon each completion the voting for the voxel designated by the passing world coordinate $(x_t, y_t)$ of each basic back-projection line in the storage part 34, the voting processing part 32 writes the voting score V in the field 4D in FIG. 25A for every basic back-projection line. After this, the comparison/update processing part 331 in the CAM 34CM makes a check to see if V>$V_M$ in parallel to all the basic back-projection lines and, if so, writes the voting score V as a new maximum value $V_M$ in the field 4B and updates the maximum point coordinate field 4A with the voxel coordinate $(X_M, Y_M, Z_M)$ calculated from the current world coordinates $(x_t, y_6, t)$. When not V>$V_M$, the updating is not performed. By this, the comparison/update process for all the basic back-projection lines is implemented in parallel.

According to this embodiment, the process of updating the information about the basic back-projection lines L, on the basis of the voting scores V counted in the voting part can be executed in parallel to all the basic back-projection lines L, through utilization of the parallel processing function of the CAM, without using any separate comparator or similar hardware. Hence, the processing time can be shortened and the amount of hardware used can be reduced.

The various embodiments of the 3D information extracting apparatus according to the present invention may be adapted to use a plurality of basic images. This will lessen the influence of occlusion of the 3D object, making it possible to prevent true feature points from being left undetected. That is, when two feature points in a 3D space viewed from one basic image overlap, they cannot be distinguished by the use of one basic image, but by using two more basic images, the two feature points are viewed at different angles, and hence can be distinguished.

Incidentally, in the embodiments of FIGS. 20, 32 and 33, ordinary memories such as RAMs may be used in place of CAMs. It will be apparent that many modifications may be effected without departing from the scope of the novel concepts of the present invention.

What is claimed is:

1. A 3D information extracting apparatus for extracting 3-dimensional information about feature points on an object by projecting corresponding feature points in a plurality of images of said object, taken at different visual angles, back into a 3-dimensional space of a predetermined size, divided by a plurality of voxels into equally spaced cross sections defining voxel slices therebetween, and by calculating 3-dimensional positions on which back-projection lines concentrate, said apparatus comprising:

(a) basic back-projection line information storage means which, letting at least one of said plurality of images be defined as a basic image and each back-projection line from said basic image as a basic back-projection line, has areas each for storing maximum point information about said each basic back-projection line, said maximum point information containing a maximum value of a voting score on said each basic back-projection line in the past and the voxel position where said maximum value was obtained;

(b) voting means which counts, for each basic back-projection line, the number of back-projection lines projected back from the other images and passing through voxels through which said each basic back-projection line passes, and calculates a voting score corresponding to the count value;

(c) compare/update means which compares, for each back-projection line, said voting score calculated by said voting means with said maximum value of said maximum point information stored in said area of said basic back-projection line information storage means corresponding to said each basic back-projection line and, if the former is larger than the latter, updates said maximum point information in said area of said basic back-projection line information storage means with new maximum point information consisting of said voting score and the voxel position where said voting score is obtained; and (d) control means which controls said voting means and said compare/update means to repeat processing of obtaining said voting score and processing of comparing/updating said maximum point information for each voxel on said each basic back-projection line in said 3-dimensional space and, after completion of said processing, reads out of said area of said basic back-projection line information storage means said voxel position where the maximum value of voting score is obtained and outputs it as said 3-dimensional information of said feature points on said object.

2. The apparatus of claim 1, which further comprises back-projection line passing position calculating means for calculating passing positions of said back-projection lines passing through said 3-dimensional space in each voxel slice thereof and in which said voting means includes means for counting said back-projection lines from said other images passing through voxels corresponding to said calculated passing positions.

3. The apparatus of claim 1, wherein said compare/update means updates said maximum point information when said voting score is equal to said maximum value.

4. The apparatus of claim 2, wherein said voting means includes voting information storage means composed of areas each corresponding to one of all voxels forming a voxel slice of said 3-dimensional space, for storing as a voting score the number of back-projection lines passing through said each voxel and voting score update means which reads out said voting score stored in said area of said voting information storage means corresponding to the voxel of each of said passing positions calculated by said back-projection line passing position calculating means, then adds "1" to said read-out voting score and writes it again in the same area, and said control means includes means for clearing all the areas of said voting information storage means upon each completion of said processing by said voting means and said compare/update means for said each voxel slice of said 3-dimensional space.

5. The apparatus of claim 1, wherein said basic image is plural.

6. The apparatus of claim 2, wherein, letting said other images be defined as reference images and said back-projection lines coming therefrom as reference back-projection lines, said voting means includes voting information storage means which stores, as information associated with voting, passing position information about all of said reference back-projection lines calculated by said back-projection line passing position calculating means for each voxel slice of said 3-dimensional space, and reference back-projection line counting means which searches said voting information storage means for said reference back-projection line passing information corresponding to said passing position of said each basic back-projection line, then counts the number of detected information and calculates therefrom the number of reference back-projection lines passing through the voxel corresponding to said passing position of said each basic back-projection line.

7. The apparatus of claim 6, wherein said voting information storage means has stored therein, as said reference back-projection line passing position information, the coordinates of voxels corresponding to the passing positions of said all reference back-projection lines, and said reference back-projection line counting means searches said voting information storage means for the same coordinates as that of said voxel corresponding to said passing position of said each basic back-projection line and counts the detected number of said same coordinates.

8. The apparatus of claim 7, wherein said voting information storage means is a content addressable memory and the search by said reference back-projection line counting means is executed by a parallel processing function of said content addressable memory in parallel to all of said coordinates stored in said voting information storage means in correspondence with the passing positions of said all reference back-projection lines.

9. The apparatus of claim 6, wherein said voting information storage means includes a plurality of content addressable memories provided in a one-to-one correspondence with said reference images, for storing passing position information about the reference back-projection lines from said reference images, and said back-projection line counting means searches said plurality of content addressable memories in parallel and counts the detected outputs.

10. The apparatus of claim 6, wherein said back-projection line passing position calculating means has reference back-projection line passing position calculating means provided in a one-to-one correspondence with said all reference back-projection lines and includes a parallel processing means for causing said reference back-projection line passing position calculating means to perform processing in parallel for said all back-projection lines from all of said reference images.

11. The apparatus of claim 10, wherein said back-projection line passing position calculating means has basic back-projection line passing position calculating means provided in a one-to-one correspondence with said basic back-projection lines and includes a means for causing said basic back-projection line passing position calculating means to perform parallel processing for all of said basic back-projection lines from all of said basic images.

12. The apparatus of claim 10 or 11, wherein said passing position information about each back-projection line contains the world coordinate and direction vector of the passing position of said each back-projection line and said back-projection line passing position calculating means is a means which, after comparison/updating of said maximum point information for each voxel slice of said 3-dimensional space, adds said direction vector to said world coordinate of said passing position in said each voxel slice to obtain the world coordinate of the passing position in the next voxel slice of said 3-dimensional space.

13. The apparatus of claim 10 or 11, wherein said basic back-projection line information storage means and said voting information storage means each have a content addressable memory with one word assigned to information about each back-projection line, and said parallel processing means causes said passing position calculating means to perform parallel processing for all of said back-projection lines from all of said images by a parallel addition function of said content addressable memories of said basic back-projection line information storage means and said voting information storage means.

14. The apparatus of claim 13, wherein said back-projection line counting means searches said all reference back-projection lines in parallel for those of the same passing position by a parallel search function of said content addressable memory of said voting information storage means and counts the number of detected back-projection lines.

15. The apparatus of claim 6, wherein said back-projection line counting means counts, as said voting score, the number of all reference back-projection lines passing through the voxel through which said each basic back-projection line passes and voxels within predetermined neighboring voxels around said basic back-projection line passing voxel.

16. The apparatus of claim 15, wherein said voting information storage means has a content addressable memory with one word assigned to information about each back-projection line, and said back-projection line counting means detects and counts said reference back-projection lines passing through said basic back-projection line passing voxel and said voxels within said predetermined neighboring voxels around it by searching said all reference back-projection lines in parallel while making desired bits of a word representing the passing position of said each basic back-projection line by bit masking and parallel search functions of said content addressable memory of said voting information storage means.

17. The apparatus of claim 6, wherein said basic back-projection line information storage means has a maximum value continuation number storage field for storing a maximum value continuation number corresponding to each of said basic back-projection lines; said compare/update means has a means which, when said maximum value of said maximum point information agrees with said voting score, increments the content of said each maximum value continuation number storage field; and said control means has a means which, upon completion of processing for all voxel slices of said 3-dimensional space, corrects the 3-dimensional coordinate of said voxel position contained in said maximum point information on the basis of the continuation number read out from said each maximum value continuation storage field and outputs the corrected 3-dimensional coordinate as said 3-dimensional information.

18. The apparatus of claim 17, wherein said compare/update means includes a means which, when said maximum value begins to continue, detects and compares it with said maximum value continuation number stored in said maximum value continuation number storage field of said basic back-projection line information storage means and holds either one of said maximum continuation numbers and the corresponding maximum point information.

19. The apparatus of claim 13, wherein said compare/update means executes in parallel, by a parallel processing function of said basic back-projection line information storage means, the comparison between said voting score obtained for each of said basic back-projection line passing positions and the corresponding maximum value and the updating of said maximum point information on the basis of the results of comparison.

20. The apparatus of claim 6, 7, 10, or 15, wherein said basic image is plural.

21. The apparatus of claim 1, wherein an array of processing blocks are provided corresponding to an array of all the voxels forming said voxel slice and said processing blocks are each connected to adjacent ones of them;

wherein said voting means includes a first data packet storage part and a counting part provided in each of said processing blocks, and said first data packet storage part of each of said processing blocks holds information about each back-projection line passing through the corresponding voxel as a first data packet, said information about said each back-projection line containing the world coordinate of the position where said each back-projection line passes said corresponding voxel and the direction vector of said each back-projection line, and said counting part of said each processing block counts the number of all first data packets written in said first data packet storage part of said each processing block and generates a voting score corresponding to the count value;

wherein said basic back-projection line information storage means has, as a second data packet storage part provided in said each processing block, a storage area for storing as a second data packet said maximum point information about said each basic back-projection line passing through the voxel corresponding to said each processing block;

wherein said compare/update means has a second data packet updating part provided in said each processing block, and said second data packet updating part of said each processing block compares the voting score generated by said counting part of said each processing block and the maximum value of said maximum point information stored in said second data packet storage part of said each processing part and, if the former is larger than the latter, updates said maximum point information in said second data packet storage part with said voting score and the position of said voxel corresponding to said each processing block;

wherein said each processing block further includes: a data packet receiving part which writes said first data packet inputted thereinto in said first data packet storage part and said second data packet in said second data packet storage part; a first data packet updating part which, after said operation of said second data packet updating part, adds the passing position world coordinate of each first data packet in said first data packet storage part to the direction vector of the corresponding back-projection line to generate a passing position world coordinate in the next voxel slice of said 3-dimensional space and combines it with said direction vector to generate an updated first data packet; and a data packet transfer part which, when the back-projection line corresponding to said updated first data packet is said basic back-projection line, transfers said updated first data packet, together with said second data packet, to the processing block corresponding to the passing position world coordinate of said basic back-projection line; and wherein said control means includes: initial data input means which inputs into said first data packet storage block of said each processing part, as an initial data packet, the initial passing position world coordinate of said back-projection line passing through said voxel corresponding to said each processing block and the direction vector of said back-projection line; a transfer control part which instructs the operations of said counting part and said second data packet updating part of said each processing part; and a second data packet readout part which, after repeating the processing by said each processing part in each voxel slice of said 3-dimensional space, reads out said maximum point information from said second data packet storage parts of all of said processing blocks and outputs it as said 3-dimensional information about feature points of said object.

22. The apparatus of claim 21, wherein said transfer control part of said control means controls said all processing blocks so that said first data packets of said back-projection lines of said plurality of images are transferred among them in the same transfer cycle for the same image over a plurality of transfer cycles.

23. The apparatus of claim 22, wherein said first data packet storage part of said each processing part has a plurality of pre-assigned storage areas for storing said first data packets about said back-projection lines in correspondence with said plurality of images; said data packet receiving part and said data packet transfer part constitute a horizontal input/output part and a vertical input/output part; the processing blocks of each row of said processing block array are interconnected via their horizontal input/output parts and the processing blocks of each column of said processing block array are interconnected via their vertical input/output parts; and when in each first data packet transfer cycle either one of said horizontal input/output part and said vertical input/output part of said each processing block transfers said first data packet stored in one of said plurality of pre-assigned storage areas of said first data packet storage part, the other transfers said first data packet stored in that storage are selected by said either one input/output part.

24. The apparatus of claim 21, 22, or 23, wherein said basic image is plural.

25. A 3-dimensional information extracting method for extracting feature points on an object by projecting said feature points in a plurality of images of said object, taken at different visual angles, back into a 3-dimensional space of a predetermined size, divided by a plurality of voxels into equally spaced cross sections defining voxel slices therebetween, and by calculating 3-dimensional positions on which back-projection lines concentrate, said method comprising the steps of:

(a) calculating passing positions of back-projection lines passing through a selected one of said equally spaced voxel slices of said 3-dimensional space;

(b) letting at least one of said plurality of images defined as a basic image and each back-projection line from said basic image as a basic back-projection line, counting, on the basis of said calculated passing positions, back-projection lines projected back from the other images and passing through that one of said voxels through which each of said basic back-projection lines passes, and calculating a voting score corresponding to the count value;

(c) referring to maximum point information containing a voting score of a maximum value in the past and the voxel position corresponding thereto and stored in basic back-projection line information storage means in correspondence with each basic back-projection line, comparing said voting score obtained in said step (b) and said maximum value and, if said voting score is larger than said maximum value, updating the corresponding maximum point information stored in said basic back-projection line information storage means with new maximum point information containing said voting score and the voxel position where it was obtained; and (d) repeating the processing of said steps (a), (b) and (c) for all voxels on said each basic back-projection line in said 3-dimensional space and thereafter outputting from said basic back-projection line information storage means, as 3-dimensional information of a feature point on said object, said voxel position where said voting score was obtained.

26. The method of claim 25, wherein said step (d) completes processing for all of said back-projection lines by repeating the processing of said steps (a), (b) and (c) for all of said voxels on all of said basic back-projection lines.

27. The method of claim 25, wherein said step (d) completes processing for all of said back-projection lines by repeating said steps (a), (b) and (c) for all of said basic back-projection lines in all voxel slices of said 3-dimensional space.

28. The method of claim 27, wherein voting score information storage means is provided which has storage areas in a one-to-one correspondence with all of said voxels forming or defining one voxel slice of said 3-dimensional space; said step (b) includes processing of generating a voting score in said storage area of said voting information storage means corresponding to the passing position of said each basic back-projection line calculated in said step (a), by adding 1 to the contents of said storage area; said step (c) includes processing of comparing said voting score read out of said storage area of said voting information storage means corresponding to the voxel of the passing position of said each basic back-projection line and said maximum value; and said step (d) includes processing of clearing all storage areas of said voting score storage means upon each completion of said compare/update processing of said step (c) for each voxel slice of said 3-dimensional space.

29. The method of claim 27, wherein letting images other than said basic image be defined as reference images and back-projection lines therefrom as reference back-projection lines, there is provided voting information storage means for storing, as information associated with voting, passing position information of all of said reference back-projection lines calculated in said each voxel slice of said 3-dimensional space, and said step (b) includes processing of searching said voting information storage means for said reference back-projection line passing position information corresponding to the passing position of said each basic back-projection line, counting the detected information and calculating therefrom said voting score corresponding to said each basic back-projection line.

30. The method of claim 25, wherein an array of processing blocks is provided corresponding to an array of all of said voxels forming one voxel slice of said 3-dimensional space, and each of said processing blocks has a first data packet storage part for storing, as a first data packet, the passing position and direction vector of each back-projection line passing through the voxel corresponding to said each processing block and a second data packet storage part for storing, as a second data packet, maximum point information of said each basic back-projection line passing through said corresponding voxel, said second data packet storage part forming part of said basic back-projection line information storage means;

wherein said step (a) includes, in common to all of said processing blocks, (a-1) processing of adding said passing position of said first data packet in said first data packet storage part with the corresponding direction vector to obtain an updated first data packet having the passing position of said each back-projection line in the next voxel slice of said 3-dimensional space and (a-2) processing of sending said updated first data packet to the processing block specified by said passing position, together with said second data packet if said first data packet is for said basic back-projection line, and storing the first data packet and said second data packet received from another processing block in said first and second data packet storage parts, respectively;

wherein said step (b) includes, in common to all of said processing blocks, processing of counting all of said first data packets in said first data packet storage part and calculating the count value as a voting score for the voxel corresponding to said each processing block; and where said step (c) includes processing of comparing said voting score obtained by said step (b) and the maximum value in the past among said second data packets stored in said second data packet storage part and, if the former is larger than the latter, updating said second data packet corresponding to said maximum value with said voting score and the passing position in the first data packet stored in said first data packet storage part corresponding to said basic back-projection.

31. The method of claim 30, wherein said first data packet storage part of said each processing block has storage areas pre-assigned thereto corresponding to said plurality of images, respectively, each processing block has a horizontal input/output part and a vertical input/output part, said processing blocks of each row are sequentially connected via their horizontal input/output parts and said processing block of each column are sequentially connected via their vertical input/output parts; and wherein said step (a-2) includes, in common to all of said processing blocks, (a-2-1) processing in which one of said horizontal and vertical input/output parts selects one of the storage areas of said first data packet storage part and sends its stored first data packet and writes in said selected storage area said first data packet received from another processing block in the horizontal direction and (a-2-2) processing in which the other of said horizontal and vertical input/output parts selects the storage area selected by said one of said horizontal and vertical input/output parts and sends its stored first data packet in the vertical direction and writes in said selected storage area said first data packet received from another processing block in the vertical direction, said steps (a-1-1) and (a-1-2) being executed in parallel for each storage area of said first data packet storage part.

* * * * *